US011689816B2

(12) United States Patent
Sakurabu et al.

(10) Patent No.: US 11,689,816 B2
(45) Date of Patent: Jun. 27, 2023

(54) IMAGING APPARATUS, OPERATION METHOD OF IMAGING APPARATUS, AND PROGRAM

(71) Applicant: FUJIFILM CORPORATION, Tokyo (JP)

(72) Inventors: Hitoshi Sakurabu, Saitama (JP); Ryo Hasegawa, Saitama (JP); Tomoyuki Kawai, Saitama (JP); Makoto Kobayashi, Saitama (JP); Kazufumi Sugawara, Saitama (JP)

(73) Assignee: FUJIFILM CORPORATION, Tokyo (JP)

( * ) Notice: Subject to any disclaimer, the term of this patent is extended or adjusted under 35 U.S.C. 154(b) by 0 days.

(21) Appl. No.: 17/666,591

(22) Filed: Feb. 8, 2022

(65) Prior Publication Data

US 2022/0166923 A1 May 26, 2022

Related U.S. Application Data

(63) Continuation of application No. PCT/JP2020/025833, filed on Jul. 1, 2020.

(30) Foreign Application Priority Data

Aug. 14, 2019 (JP) .............................. JP2019-148877

(51) Int. Cl.
H04N 23/80 (2023.01)
G06V 40/16 (2022.01)
(Continued)

(52) U.S. Cl.
CPC ............. *H04N 23/80* (2023.01); *G06V 10/25* (2022.01); *G06V 40/161* (2022.01); *G06V 40/18* (2022.01);
(Continued)

(58) Field of Classification Search
CPC .... H04N 23/635; H04N 23/632; H04N 23/80; H04N 23/815; G06V 10/22; G06V 10/235; G06V 10/25
See application file for complete search history.

(56) References Cited

U.S. PATENT DOCUMENTS 9,082,235 B2 * 7/2015 Lau ...................... G06V 40/171
9,652,663 B2 * 5/2017 Lau ...................... G06V 40/168
(Continued)

FOREIGN PATENT DOCUMENTS

CN 112818933 A * 5/2021
JP 2008-22517 A 1/2008
(Continued)

OTHER PUBLICATIONS

International Search Report issued in International Application No. PCT/JP2020/025833 dated Sep. 24, 2020.
(Continued)

*Primary Examiner* — John Villecco
(74) *Attorney, Agent, or Firm* — Solaris Intellectual Property Group, PLLC

(57) ABSTRACT

An imaging apparatus includes a storage portion that stores image data obtained by imaging, and a processing portion that processes the image data, in which the processing portion performs processing of reducing the image data, performs first detection processing of detecting a specific subject image showing a specific subject from a reduced image indicated by reduced image data obtained by reducing the image data, and in a case where the specific subject image is not detected by the first detection processing, performs second detection processing on pre-reduction image data that is the image data before reduction stored in the storage portion.

19 Claims, 43 Drawing Sheets

(51) Int. Cl.
*G06V 40/18* (2022.01)
*H04N 23/63* (2023.01)
*G06V 10/25* (2022.01)
*H04N 23/611* (2023.01)

(52) U.S. Cl.
CPC ........... *H04N 23/611* (2023.01); *H04N 23/63* (2023.01); *H04N 23/632* (2023.01)

(56) References Cited

U.S. PATENT DOCUMENTS

| | | | |
|---|---|---|---|
| 10,440,252 B2* | 10/2019 | Fukuda | H04N 23/675 |
| 10,699,126 B2* | 6/2020 | Karyodisa | G06V 40/167 |
| 11,438,504 B2* | 9/2022 | Hasegawa | H04N 25/50 |
| 11,546,561 B2* | 1/2023 | Kobayashi | H04N 5/772 |
| 2007/0285533 A1 | 12/2007 | Furuya et al. | |
| 2012/0062598 A1 | 3/2012 | Furuya et al. | |
| 2013/0015946 A1* | 1/2013 | Lau | G06V 40/172 340/5.2 |
| 2015/0093032 A1 | 4/2015 | Nakao | |
| 2015/0269731 A1* | 9/2015 | Liu | G06V 30/2504 382/103 |
| 2015/0310259 A1* | 10/2015 | Lau | G06V 40/169 382/118 |
| 2016/0125221 A1* | 5/2016 | Kim | G06T 7/0012 382/117 |
| 2019/0034734 A1* | 1/2019 | Yen | G06F 18/2413 |
| 2019/0213420 A1* | 7/2019 | Karyodisa | G06V 20/41 |
| 2022/0174225 A1* | 6/2022 | Hasegawa | G03B 19/07 |
| 2022/0174233 A1* | 6/2022 | Sugawara | H04N 23/682 |
| 2022/0294983 A1* | 9/2022 | Hasegawa | H04N 25/40 |
| 2022/0366721 A1* | 11/2022 | Kosugi | G06V 10/75 |
| 2022/0366722 A1* | 11/2022 | Kosugi | G06V 40/167 |

FOREIGN PATENT DOCUMENTS

| | | | | |
|---|---|---|---|---|
| JP | 2008109485 A | * | 5/2008 | |
| JP | 2010041435 A | * | 2/2010 | ......... H04N 5/23219 |
| JP | 2010068128 A | * | 3/2010 | ......... G06K 9/00221 |
| JP | 2011043921 A | * | 3/2011 | |
| JP | 2015-70426 A | | 4/2015 | |
| JP | 2016-219949 A | | 12/2016 | |
| JP | 2018-56944 A | | 4/2018 | |
| TR | 201722665 A2 | * | 7/2019 | |

OTHER PUBLICATIONS

Written Opinion of the ISA issued in International Application No. PCT/JP2020/025833 dated Sep. 24, 2020.

* cited by examiner

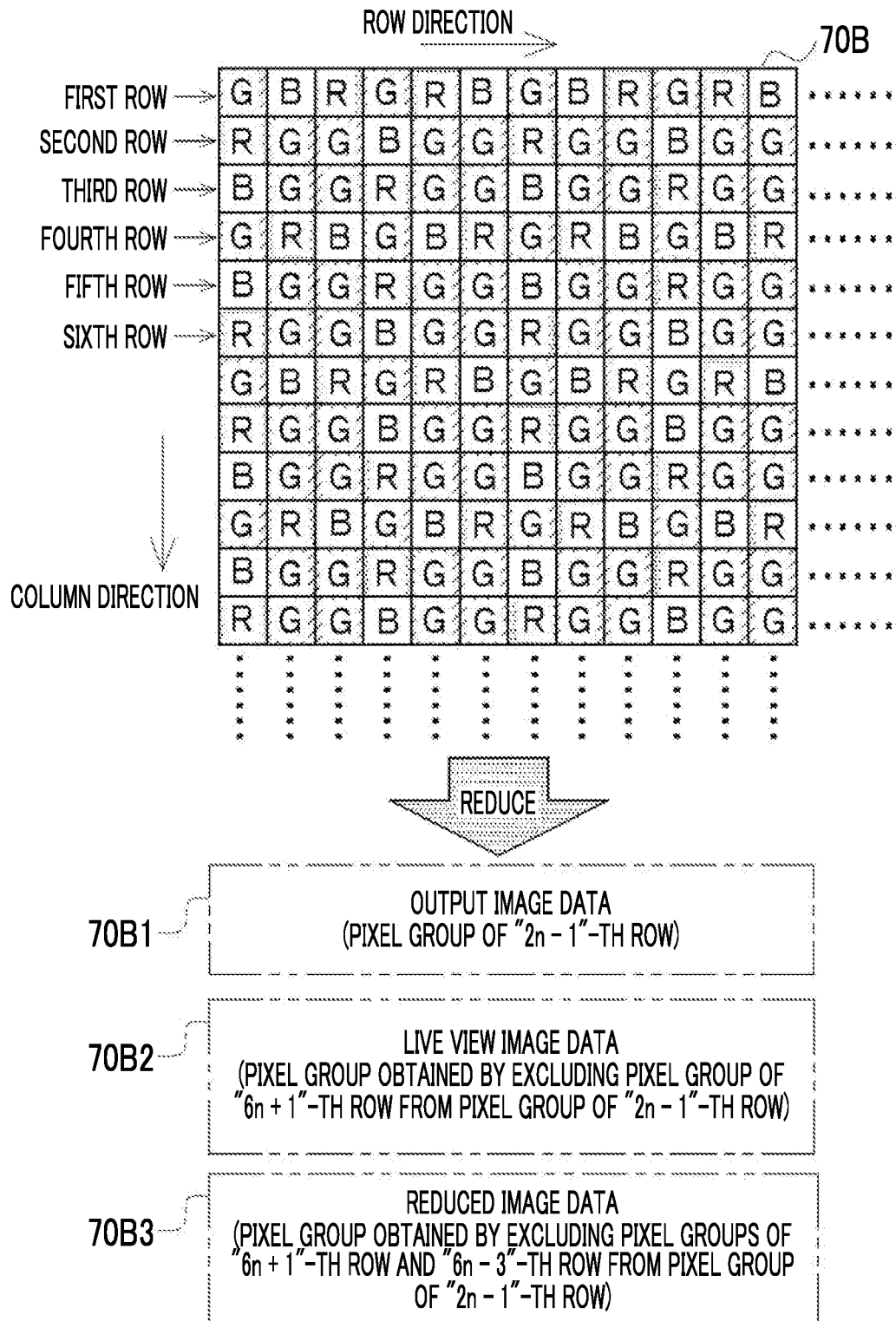

[LIVE VIEW IMAGE IN CASE WHERE FIRST
DETECTION PROCESSING RESULTS IN SUCCESS]

[LIVE VIEW IMAGE IN CASE WHERE FIRST DETECTION PROCESSING RESULTS
IN FAILURE, AND SECOND DETECTION PROCESSING RESULTS IN SUCCESS]

[LIVE VIEW IMAGE IN CASE WHERE FIRST DETECTION PROCESSING AND SECOND DETECTION PROCESSING RESULT IN FAILURE]

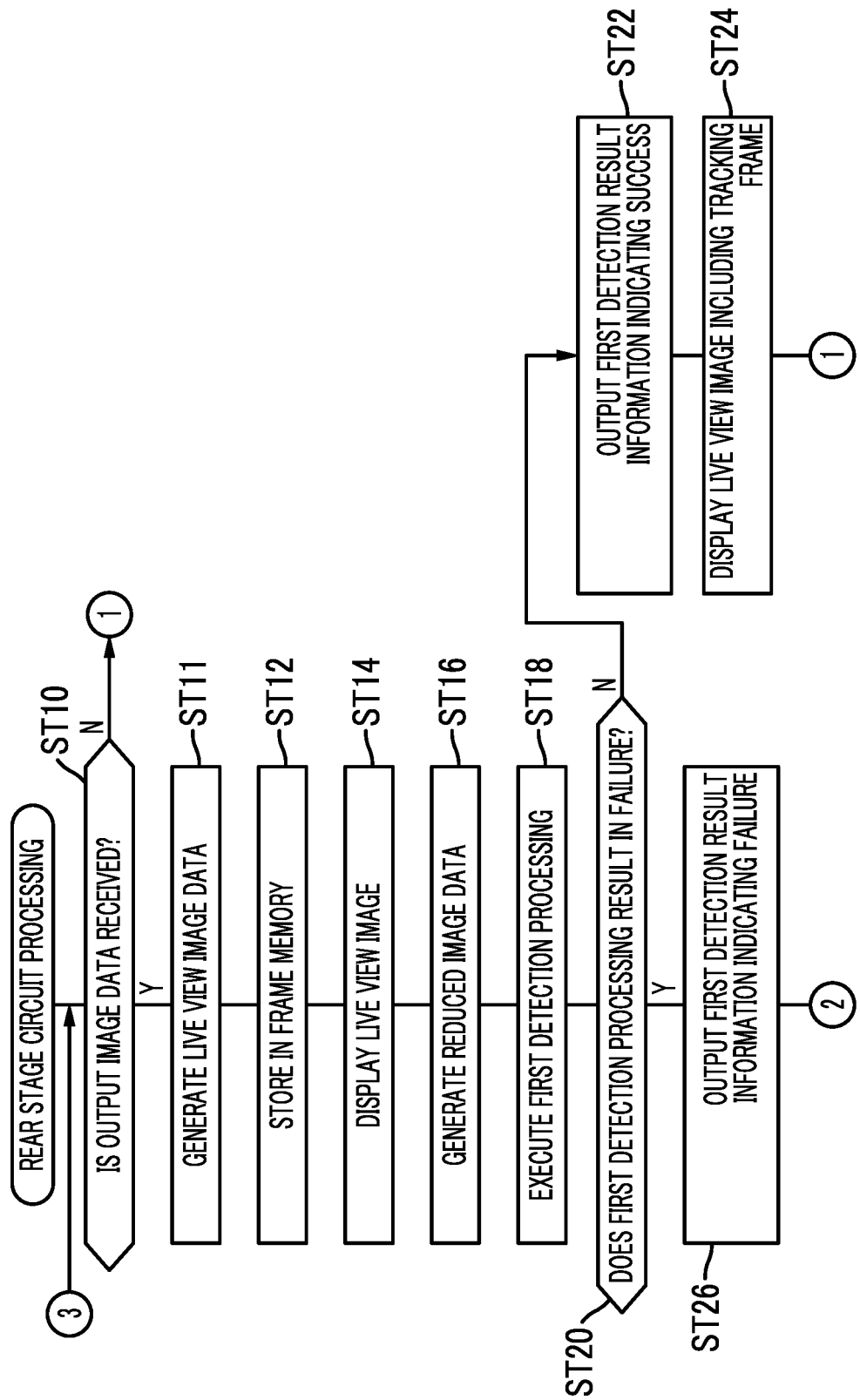

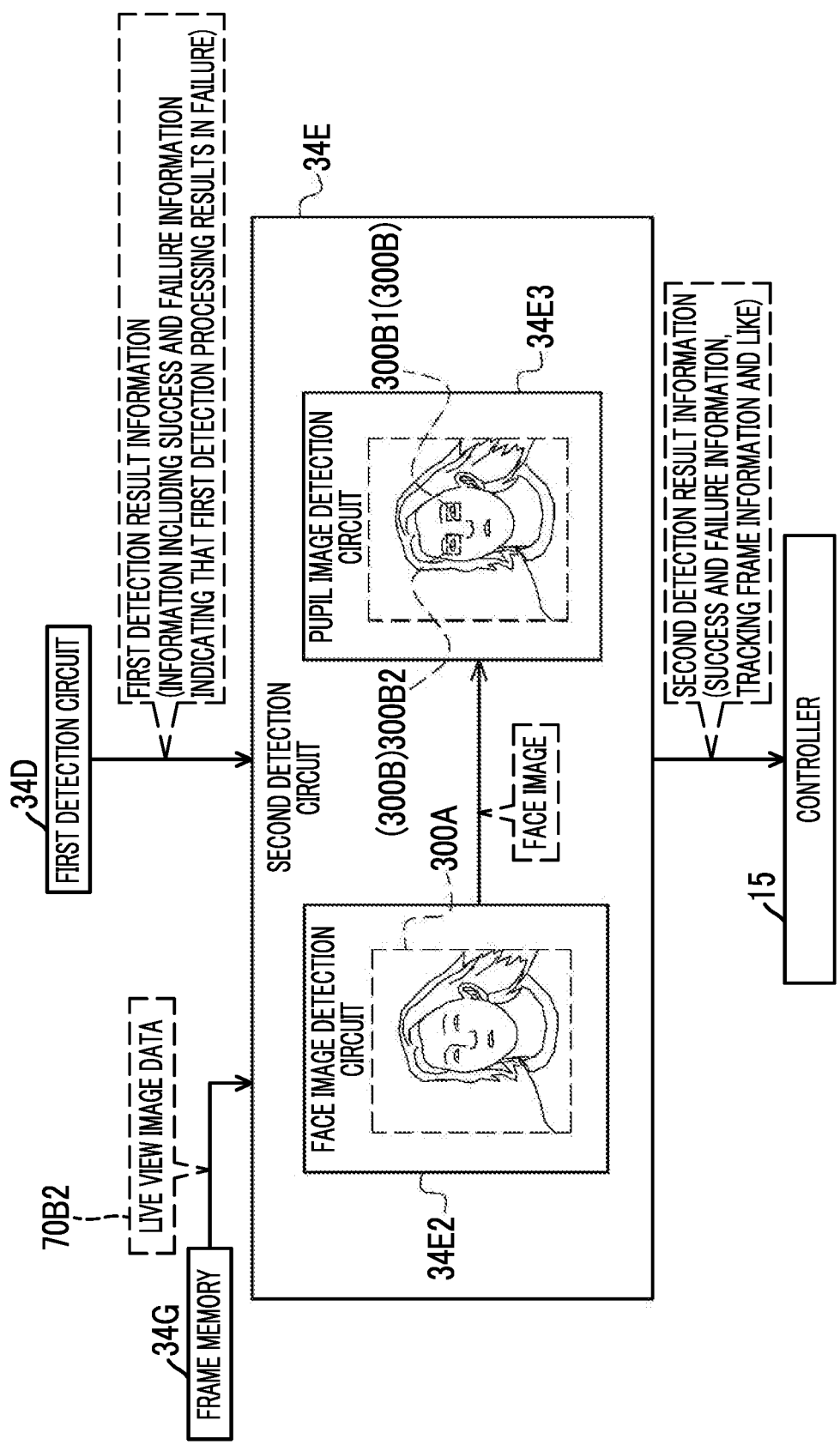

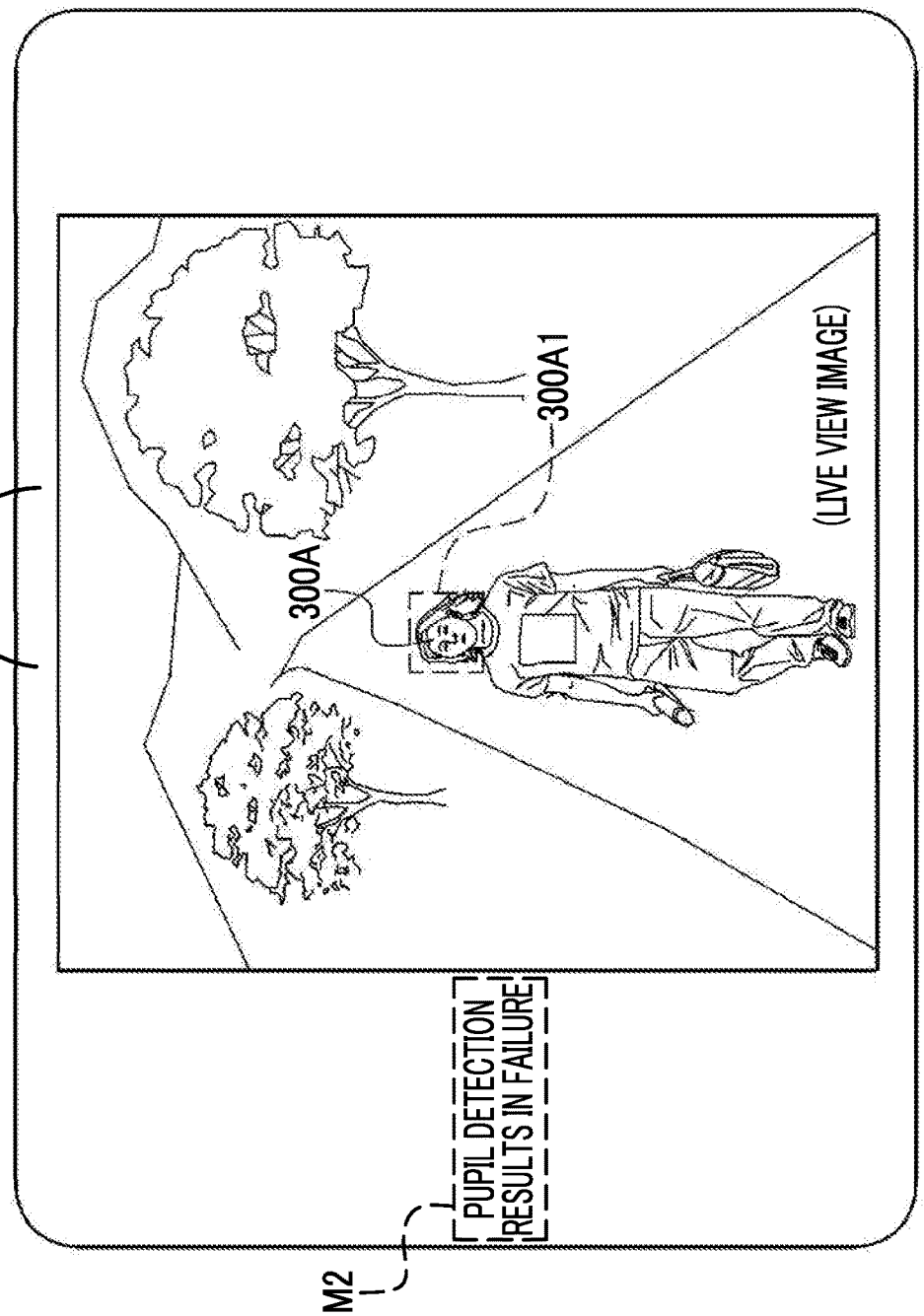

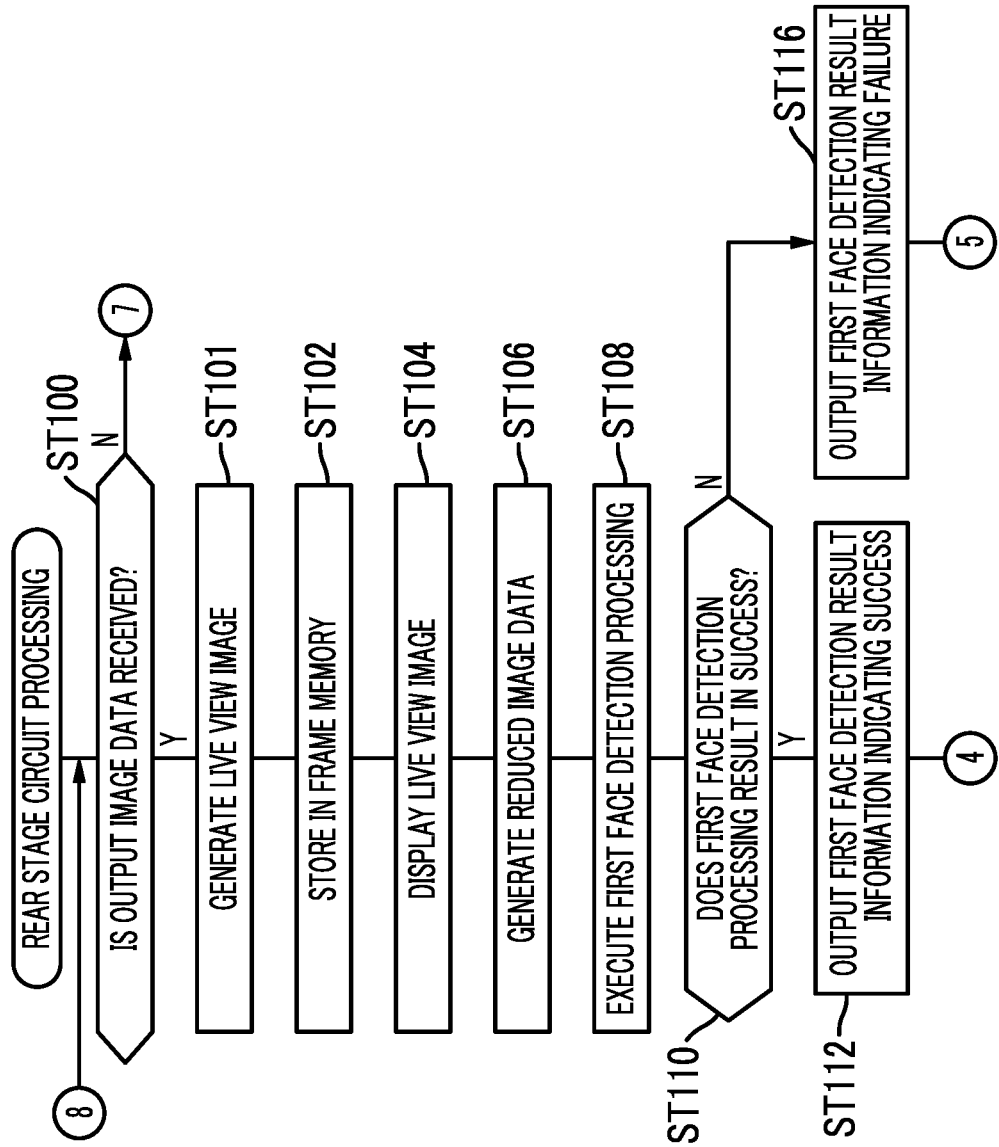

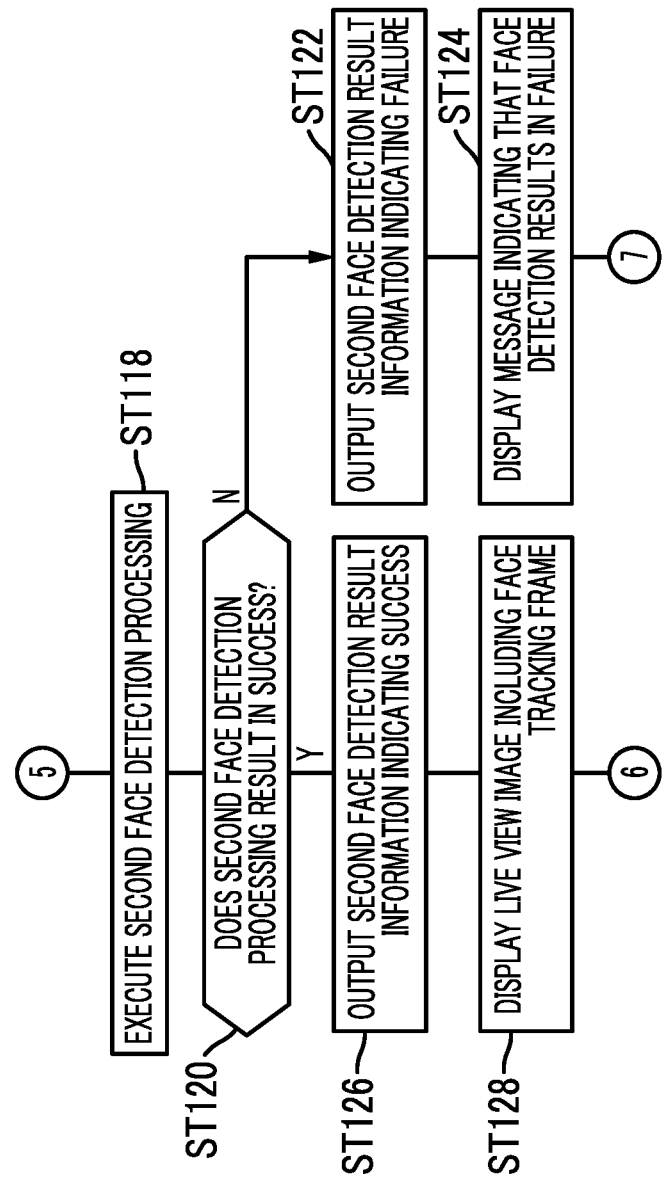

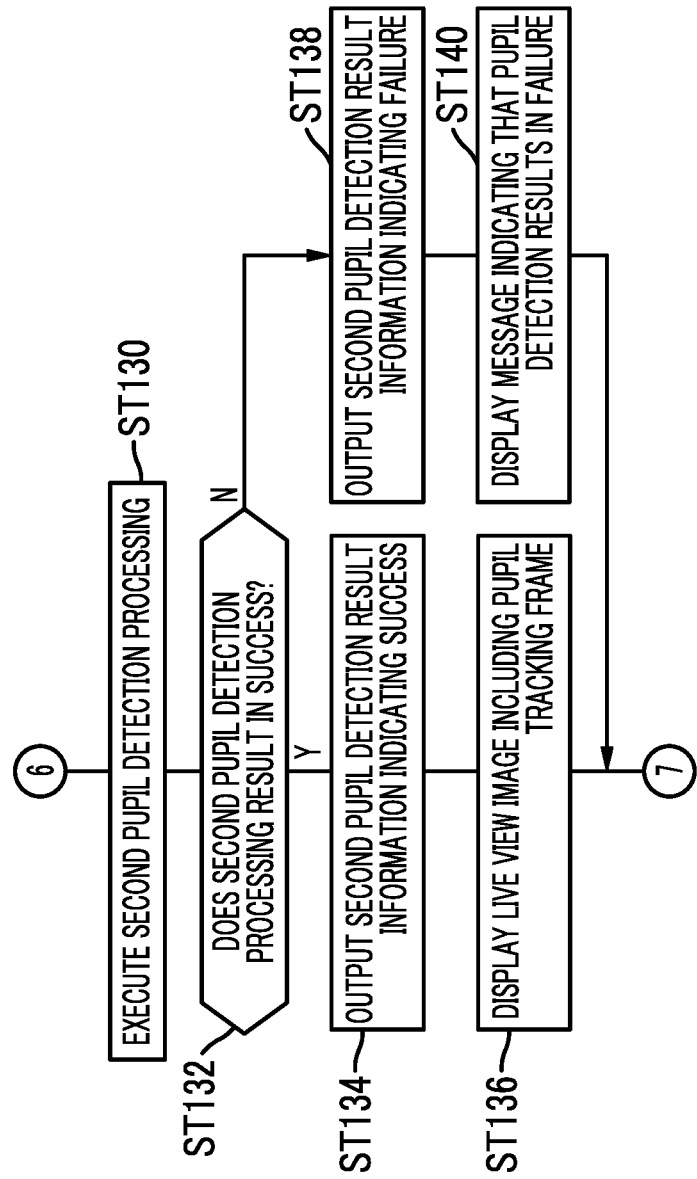

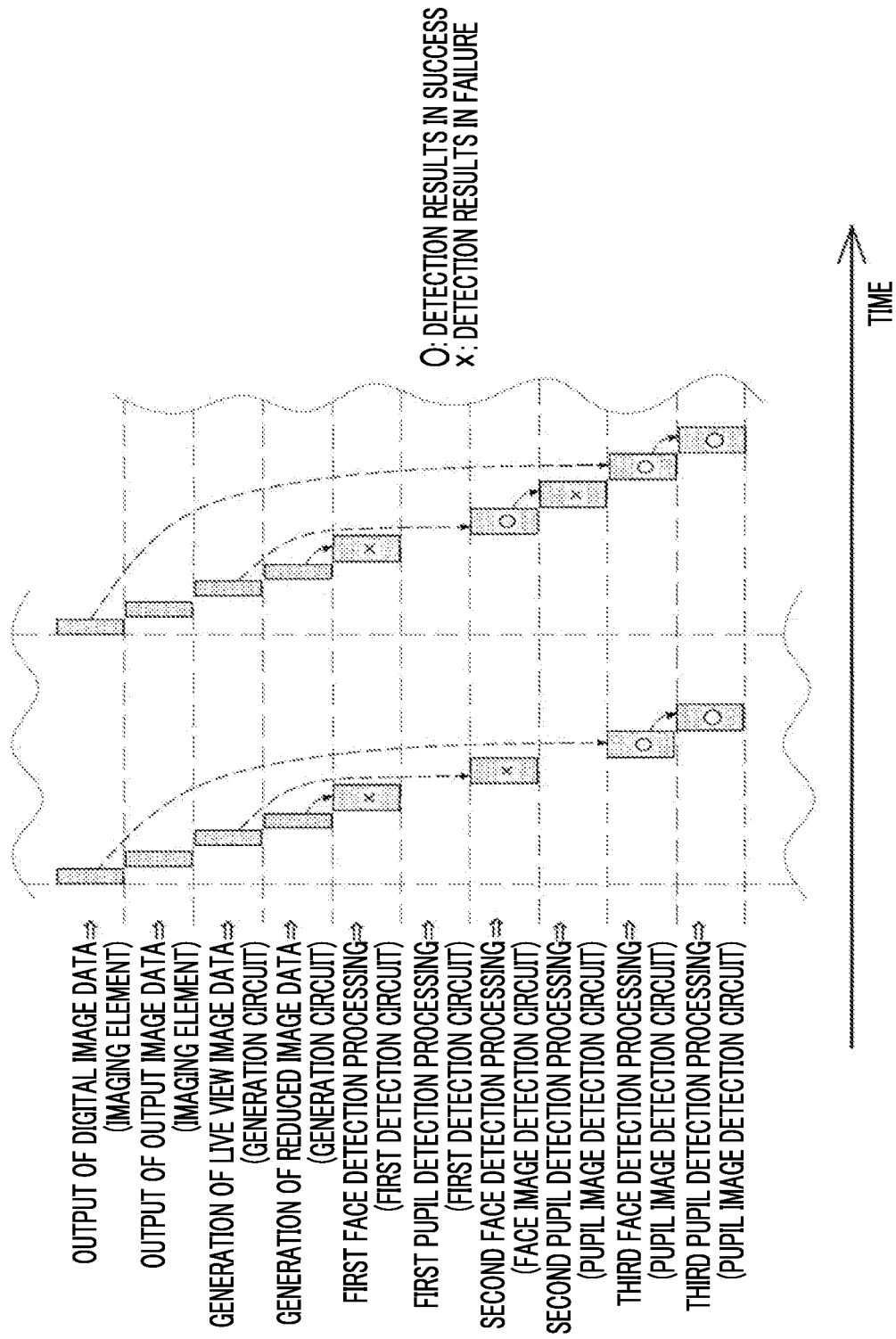

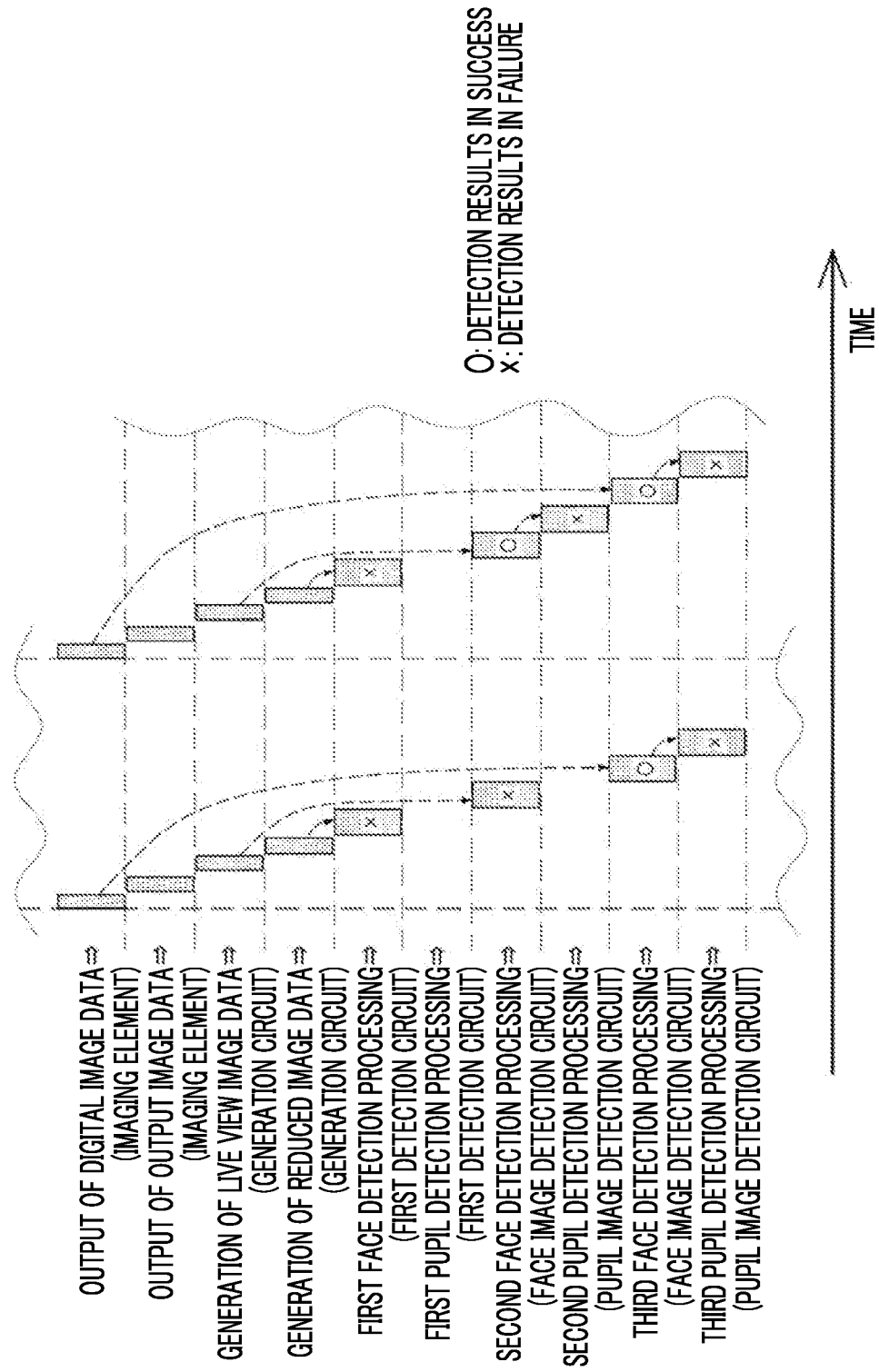

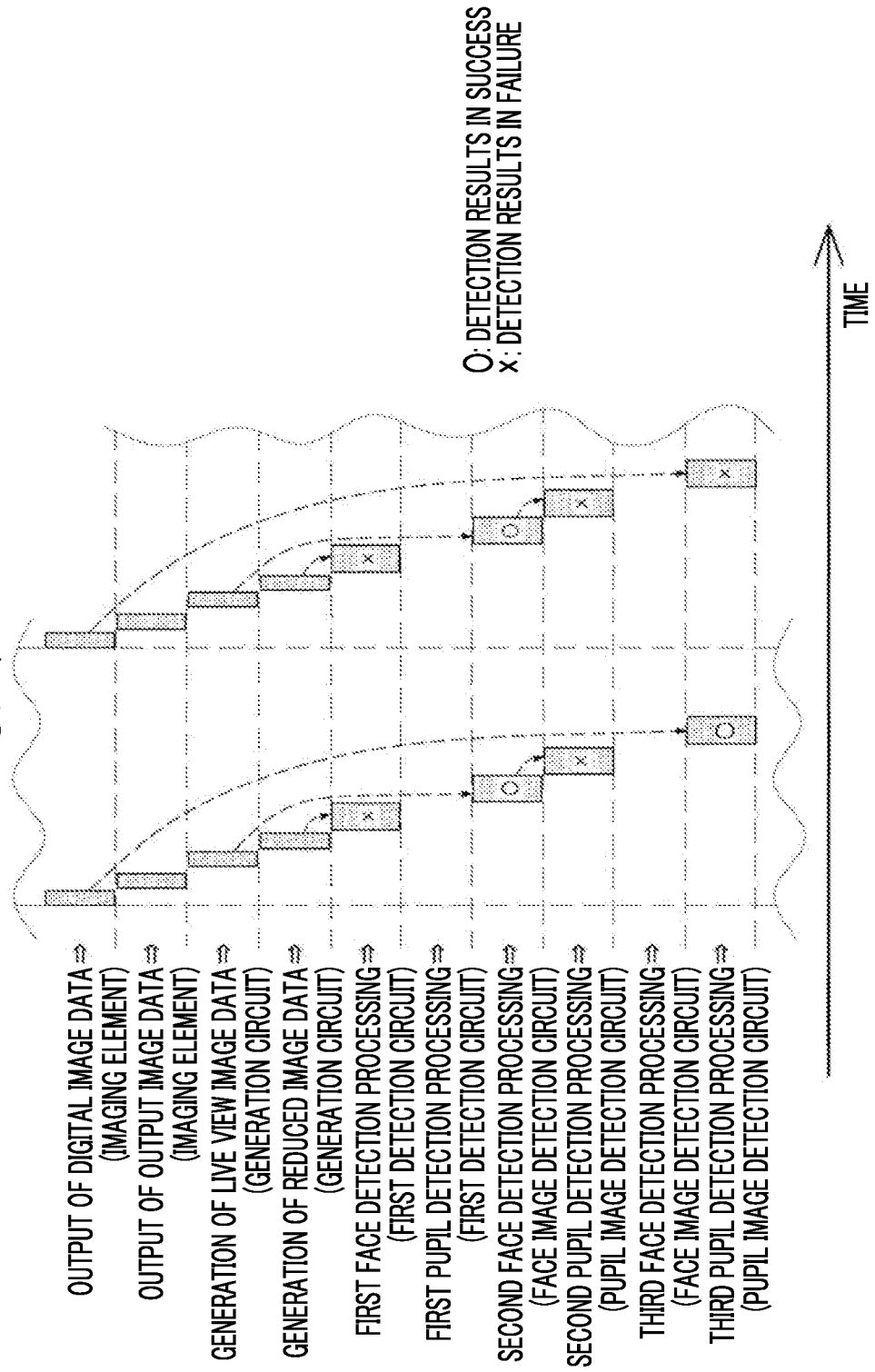

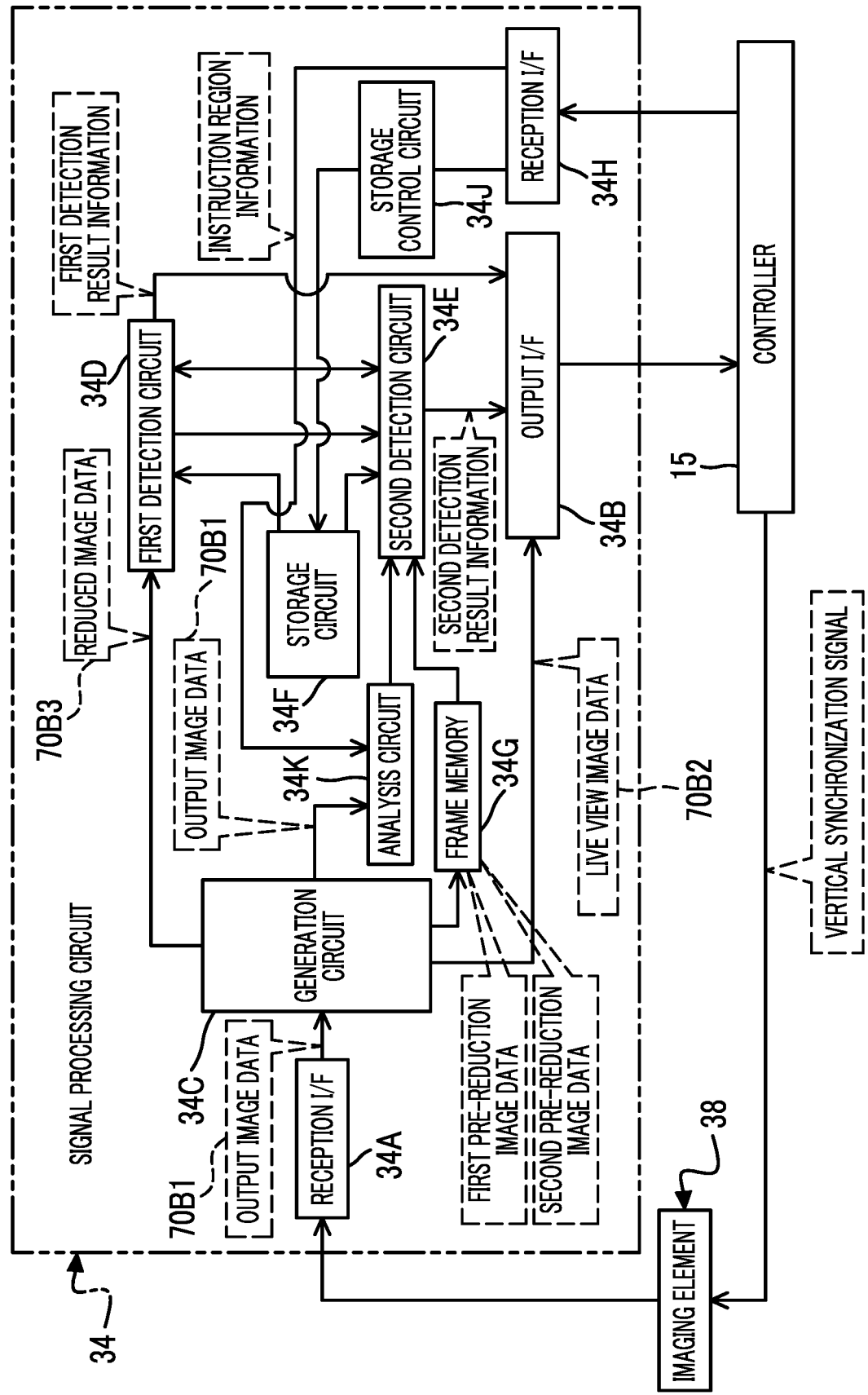

IMAGING APPARATUS, OPERATION METHOD OF IMAGING APPARATUS, AND PROGRAM

CROSS-REFERENCE TO RELATED APPLICATIONS

This application is a continuation application of International Application No. PCT/JP2020/025833, filed Jul. 1, 2020, the disclosure of which is incorporated herein by reference in its entirety. Further, this application claims priority from Japanese Patent Application No. 2019-148877, filed Aug. 14, 2019, the disclosure of which is incorporated herein by reference in its entirety.

BACKGROUND

1. Technical Field

The technology of the present disclosure relates to an imaging apparatus, an operation method of an imaging apparatus, and a program.

2. Related Art

JP2018-056944A discloses an imaging apparatus comprising an imaging element, a generation portion, and a detection portion. In the imaging apparatus disclosed in JP2018-056944A, the imaging element includes a plurality of imaging regions in which a plurality of pixels that generate signals based on photoelectrically converted electric charges are arranged, and a signal line that is arranged for each imaging region and outputs the signals generated by the pixels. The generation portion generates an image of an imaged subject using the signals of first pixels output to the signal line of a first imaging region from the pixels arranged in the first imaging region. The detection portion detects the subject using the signals of second pixels of a larger number than the first pixels output to the signal line of the second imaging region from the pixels arranged in the second imaging region different from the first imaging region.

In the imaging apparatus disclosed in JP2018-056944A, the generation portion generates the image of the imaged subject using the signals of the first pixels that are output to the signal line of the first imaging region by thinning out the pixels arranged in the first imaging region. In addition, the detection portion detects the subject using the signals of the second pixels of the larger number than the first pixels that are output to the signal line of the second imaging region by thinning out the pixels arranged in the second imaging region.

JP2016-219949A discloses an imaging apparatus including an imaging section comprising an imaging element that outputs an image corresponding to a subject by imaging the subject. The imaging apparatus disclosed in JP2016-219949A includes a reading section, a determination section, and a control section. The reading section obtains a first image by reading out a specific pixel group in the imaging element as a first reading operation and obtains a second image by reading out a pixel group different from the specific pixel group as a second reading operation. The determination section determines a predetermined subject region in the first image obtained by the first reading operation as a subject region of interest. The control section sets the second image obtained by the second reading operation as an image comprising the subject region of interest by controlling the reading section in accordance with the subject region of interest obtained by the determination section. In addition, in the imaging apparatus disclosed in JP2016-219949A, the number of pixels in the second image is larger than the number of pixels of the subject region of interest in the first image.

SUMMARY

One embodiment according to the technology of the present disclosure provides an imaging apparatus, an operation method of an imaging apparatus, and a program that can implement reduction of a processing load and high-accuracy detection, compared to a case of performing detection processing using only pre-reduction image data at all times.

A first aspect according to the technology of the present disclosure is an imaging apparatus comprising a storage portion that stores image data obtained by imaging, and a processing portion that processes the image data, in which the processing portion performs processing of reducing the image data, performs first detection processing of detecting a specific subject image showing a specific subject from a reduced image indicated by reduced image data obtained by reducing the image data, and in a case where the specific subject image is not detected by the first detection processing, performs second detection processing on pre-reduction image data that is the image data before reduction stored in the storage portion.

A second aspect according to the technology of the present disclosure is the imaging apparatus according to the first aspect, in which the processing portion performs the second detection processing on partial region image data indicating a partial region that is a partial region in an image indicated by the pre-reduction image data and corresponds to a position of the specific subject image detected by the first detection processing in a frame previous to a frame in which the second detection processing is performed.

A third aspect according to the technology of the present disclosure is the imaging apparatus according to the second aspect, in which the partial region is a region of the specific subject for which an instruction is issued, in the image indicated by the pre-reduction image data.

A fourth aspect according to the technology of the present disclosure is the imaging apparatus according to any one of the first to third aspects, in which in a case where the specific subject image is detected by the first detection processing, the processing portion stores specific subject image region data indicating a region corresponding to a position of the specific subject image in the pre-reduction image data in the storage portion.

A fifth aspect according to the technology of the present disclosure is the imaging apparatus according to the fourth aspect, in which in a case where the specific subject image is detected by the first detection processing, the processing portion performs the second detection processing on the specific subject image region data stored in the storage portion.

A sixth aspect according to the technology of the present disclosure is the imaging apparatus according to any one of the first to fifth aspects, in which the processing portion generates a plurality of types of the pre-reduction image data from the image data and stores the generated plurality of types of pre-reduction image data in the storage portion for each predetermined period.

A seventh aspect according to the technology of the present disclosure is the imaging apparatus according to the sixth aspect, in which the processing portion analyzes the image data for each predetermined period before performing the second detection processing and performs the second detection processing on the pre-reduction image data that is decided for each predetermined period in accordance with an analysis result among the plurality of types of pre-reduction image data stored in the storage portion.

An eighth aspect according to the technology of the present disclosure is the imaging apparatus according to the seventh aspect, in which the processing portion analyzes a contrast of an instruction region image from the image data for each predetermined period before performing the second detection processing and performs the second detection processing on the pre-reduction image data that is decided for each predetermined period in accordance with the analysis result among the plurality of types of pre-reduction image data stored in the storage portion.

A ninth aspect according to the technology of the present disclosure is the imaging apparatus according to any one of the first to eighth aspects, in which the second detection processing is processing of detecting at least one of the specific subject image or a small subject image showing a smaller subject than the specific subject from an image indicated by the pre-reduction image data.

A tenth aspect according to the technology of the present disclosure is the imaging apparatus according to the ninth aspect, in which the specific subject image is a face image showing a face, and the small subject image is a pupil image showing a pupil.

An eleventh aspect according to the technology of the present disclosure is the imaging apparatus according to any one of the first to tenth aspects, in which the specific subject image is a moving object image showing a moving object for which an instruction is issued, in an image indicated by the image data.

A twelfth aspect according to the technology of the present disclosure is the imaging apparatus according to any one of the first to eleventh aspects, in which the pre-reduction image data is display image data.

A thirteenth aspect according to the technology of the present disclosure is the imaging apparatus according to any one of the first to eleventh aspects, further comprising an imaging element, in which the imaging element incorporates the storage portion.

A fourteenth aspect according to the technology of the present disclosure is the imaging apparatus according to the thirteenth aspect, in which the imaging element incorporates the processing portion.

A fifteenth aspect according to the technology of the present disclosure is the imaging apparatus according to the thirteenth or fourteenth aspect, in which the imaging element is an imaging element in which at least a photoelectric conversion element and the storage portion are formed in one chip.

A sixteenth aspect according to the technology of the present disclosure is the imaging apparatus according to the fifteenth aspect, in which the imaging element is a laminated imaging element in which the photoelectric conversion element is laminated with the storage portion.

A seventeenth aspect according to the technology of the present disclosure is the imaging apparatus according to any one of the first to sixteenth aspects, further comprising a control portion that performs a control for displaying at least one of a detection result of the first detection processing or a detection result of the second detection processing on a display device.

An eighteenth aspect according to the technology of the present disclosure is the imaging apparatus according to any one of the first to seventeenth aspects, in which the processing portion performs the second detection processing on a plurality of pieces of the pre-reduction image data having different resolutions in a stepwise manner from the pre-reduction image data having a low resolution to the pre-reduction image data having a high resolution.

A nineteenth aspect according to the technology of the present disclosure is an operation method of an imaging apparatus, the operation method comprising storing image data obtained by imaging in a storage portion, performing processing of reducing the image data, performing first detection processing of detecting a specific subject image showing a specific subject from a reduced image indicated by reduced image data obtained by reducing the image data, and performing, in a case where the specific subject image is not detected by the first detection processing, second detection processing on pre-reduction image data that is the image data before reduction stored in the storage portion.

A twentieth aspect according to the technology of the present disclosure is a program causing a computer to execute a process comprising storing image data obtained by imaging in a storage portion, performing processing of reducing the image data, performing first detection processing of detecting a specific subject image showing a specific subject from a reduced image indicated by reduced image data obtained by reducing the image data, and performing, in a case where the specific subject image is not detected by the first detection processing, second detection processing on pre-reduction image data that is the image data before reduction stored in the storage portion.

BRIEF DESCRIPTION OF THE DRAWINGS

Exemplary embodiments of the technology of the disclosure will be described in detail based on the following figures, wherein:

FIG. 12 is a conceptual diagram illustrating a configuration example of digital image data obtained by imaging using the imaging apparatus according to the first to fourth embodiments and a plurality of types of image data obtained by reducing the digital image data;

FIG. 15A is a flowchart illustrating an example of a flow of rear stage circuit processing according to the first embodiment;

FIG. 17 is a conceptual diagram for describing an example of a processing content of a second detection circuit included in the imaging apparatus according to the second embodiment;

FIG. 18C is a screen diagram illustrating an example of a display aspect of the display in a case where detection of the face image results in a success by the first detection circuit or the second detection circuit included in the imaging apparatus according to the second embodiment, and detection of the pupil image results in a failure;

FIG. 20A is a flowchart illustrating an example of a flow of rear stage circuit processing according to the second embodiment;

FIG. 20B is a continuation of the flowchart illustrated in FIG. 20A;

FIG. 20C is a continuation of the flowchart illustrated in FIG. 20B;

FIG. 26A is a time chart illustrating an example of a processing content in the imaging apparatus according to the third embodiment;

FIG. 26B is a time chart illustrating an example of the processing content in the imaging apparatus according to the third embodiment;

FIG. 27 is a time chart illustrating a first modification example of the processing content in the imaging apparatus according to the third embodiment;

FIG. 29 is a conceptual diagram illustrating an example of a configuration of the signal processing circuit and an edge part included in the imaging apparatus according to the fourth embodiment;

DETAILED DESCRIPTION

Hereinafter, an example of embodiments of an imaging apparatus according to the embodiment of the technology of the present disclosure will be described in accordance with the appended drawings.

First, words used in the following description will be described.

The abbreviation CPU stands for "Central Processing Unit". The abbreviation GPU stands for "Graphics Processing Unit". The abbreviation RAM stands for "Random Access Memory". The abbreviation ROM stands for "Read Only Memory". The abbreviation DRAM stands for "Dynamic Random Access Memory". The abbreviation SRAM stands for "Static Random Access Memory". The abbreviation LSI stands for "Large-Scale Integrated circuit". The abbreviation ASIC stands for "Application Specific Integrated Circuit". The abbreviation PLD stands for "Programmable Logic Device". The abbreviation FPGA stands for "Field-Programmable Gate Array". The abbreviation SoC stands for "System-on-a-chip". The abbreviation SSD stands for "Solid State Drive". The abbreviation USB stands for "Universal Serial Bus". The abbreviation HDD stands for "Hard Disk Drive". The abbreviation EEPROM stands for "Electrically Erasable and Programmable Read Only Memory". The abbreviation CCD stands for "Charge Coupled Device". The abbreviation CMOS stands for "Complementary Metal Oxide Semiconductor". The abbreviation EL stands for "Electro-Luminescence". The abbreviation A/D stands for "Analog/Digital". The abbreviation I/F stands for "Interface". The abbreviation UI stands for "User Interface". The abbreviation LVDS stands for "Low Voltage Differential Signaling". The abbreviation PCIe stands for "Peripheral Component Interconnect Express". The abbreviation SATA stands for "Serial Advanced Technology Attachment". The abbreviation SLVS-EC stands for "Scalable Low Signaling with Embedded Clock". The abbreviation MIPI (registered trademark) stands for "Mobile Industry Processor Interface". The abbreviation fps stands for "frame per second". The abbreviation FIFO stands for "First in First out". The abbreviation FHD stands for "Full High Definition". The abbreviation VGA stands for "Video Graphics Array".

First Embodiment

Figure 1:
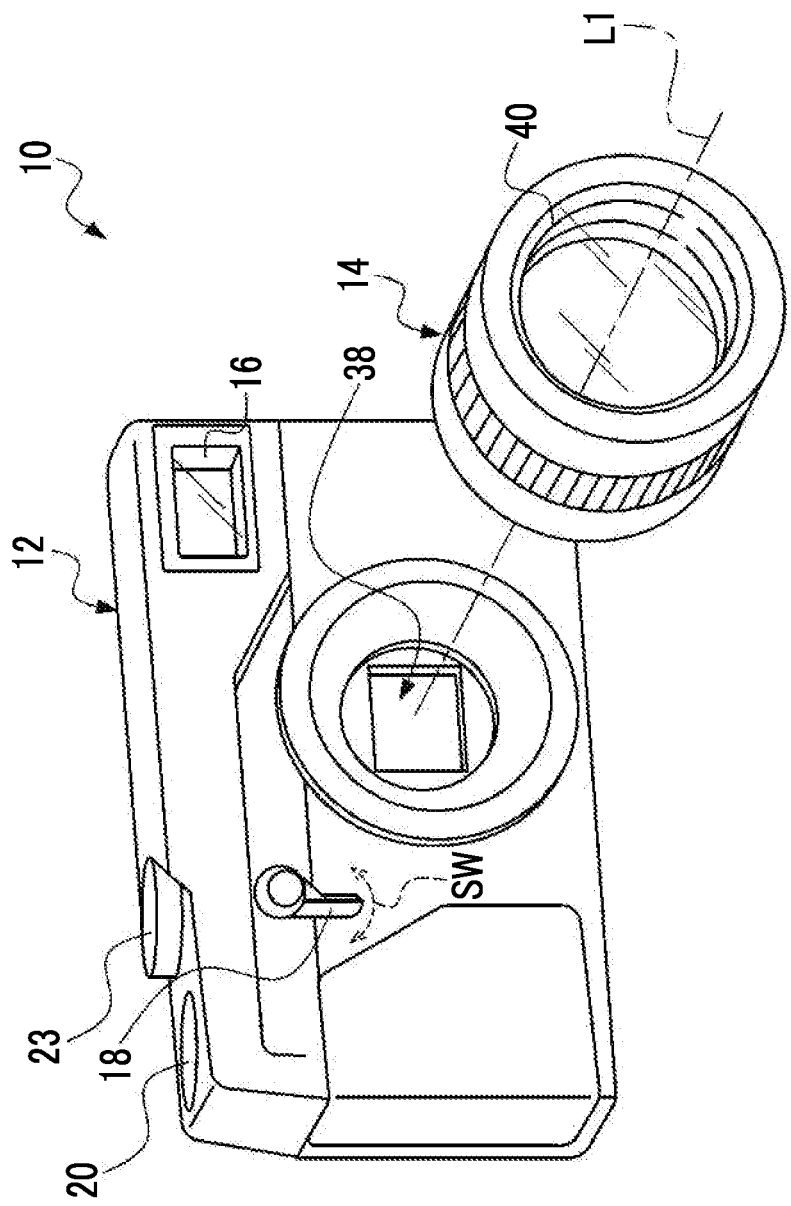
FIG. 1 is a perspective view illustrating an example of an exterior of an imaging apparatus according to first to fourth embodiments.

As illustrated in FIG. 1 as an example, an imaging apparatus 10 is a digital camera of an interchangeable lens type that does not include a reflex mirror. The imaging apparatus 10 comprises an imaging apparatus main body 12 and an interchangeable lens 14 that is interchangeably mounted on the imaging apparatus main body 12. Here, while the digital camera of the interchangeable lens type that does not include the reflex mirror is exemplified as an example of the imaging apparatus 10, the technology of the present disclosure is not limited thereto. The imaging apparatus 10 may be a digital camera of other types such as a fixed lens digital camera.

An imaging element 38 is disposed in the imaging apparatus main body 12. In a case where the interchangeable lens 14 is mounted on the imaging apparatus main body 12, subject light that shows a subject is transmitted through the interchangeable lens 14, and an image of the subject light is formed on the imaging element 38. Image data (for example, refer to FIG. 4 and FIG. 5) that indicates an image of the subject is generated by the imaging element 38.

A hybrid finder (registered trademark) 16 is disposed in the imaging apparatus main body 12. For example, the hybrid finder 16 here refers to a finder in which an optical viewfinder (hereinafter, referred to as the OVF) and an electronic viewfinder (hereinafter, referred to as the EVF) are selectively used. The abbreviation OVF stands for "optical viewfinder". In addition, the abbreviation EVF stands for "electronic viewfinder".

A finder switching lever 18 is disposed on a front surface of the imaging apparatus main body 12. An optical image visible by the OVF and a live view image that is an electronic image visible by the EVF are switched by rotationally moving the finder switching lever 18 in a direction of arrow SW. The "live view image" here refers to a display motion picture image based on the image data obtained by imaging using the imaging element 38. The live view image is generally referred to as a live preview image. A release button 20 and a dial 23 are disposed on an upper surface of the imaging apparatus main body 12. The dial 23 operates in a case of setting an operation mode of an imaging system, an operation mode of a playback system, and the like. Accordingly, an imaging mode and a playback mode are selectively set as an operation mode in the imaging apparatus 10.

The release button 20 functions as an imaging preparation instruction portion and an imaging instruction portion, and a push operation of two stages of an imaging preparation instruction state and an imaging instruction state can be detected. For example, the imaging preparation instruction state refers to a state where a push is performed to an intermediate position (half push position) from a standby position, and the imaging instruction state refers to a state where a push is performed to a final push position (full push position) exceeding the intermediate position. Hereinafter, the "state where a push is performed to the half push position from the standby position" will be referred to as a "half push state", and the "state where a push is performed to the full push position from the standby position" will be referred to as a "full push state".

Figure 2:
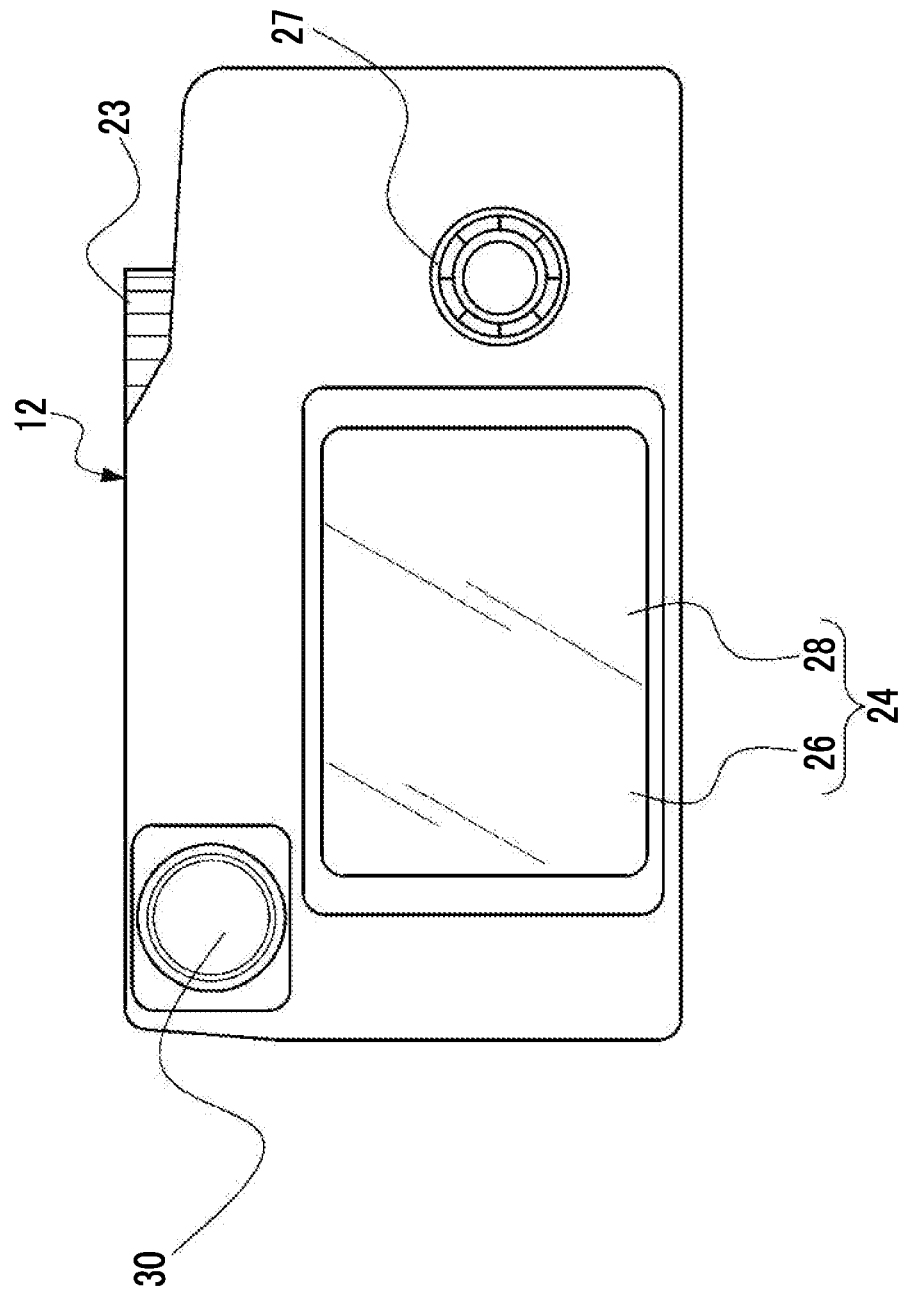
FIG. 2 is a rear view illustrating an example of the exterior on a rear surface side of the imaging apparatus illustrated in FIG. 1.

As illustrated in FIG. 2 as an example, a touch panel display 24, an instruction key 27, and a finder eyepiece portion 30 are disposed on a rear surface of the imaging apparatus main body 12.

Figure 4:
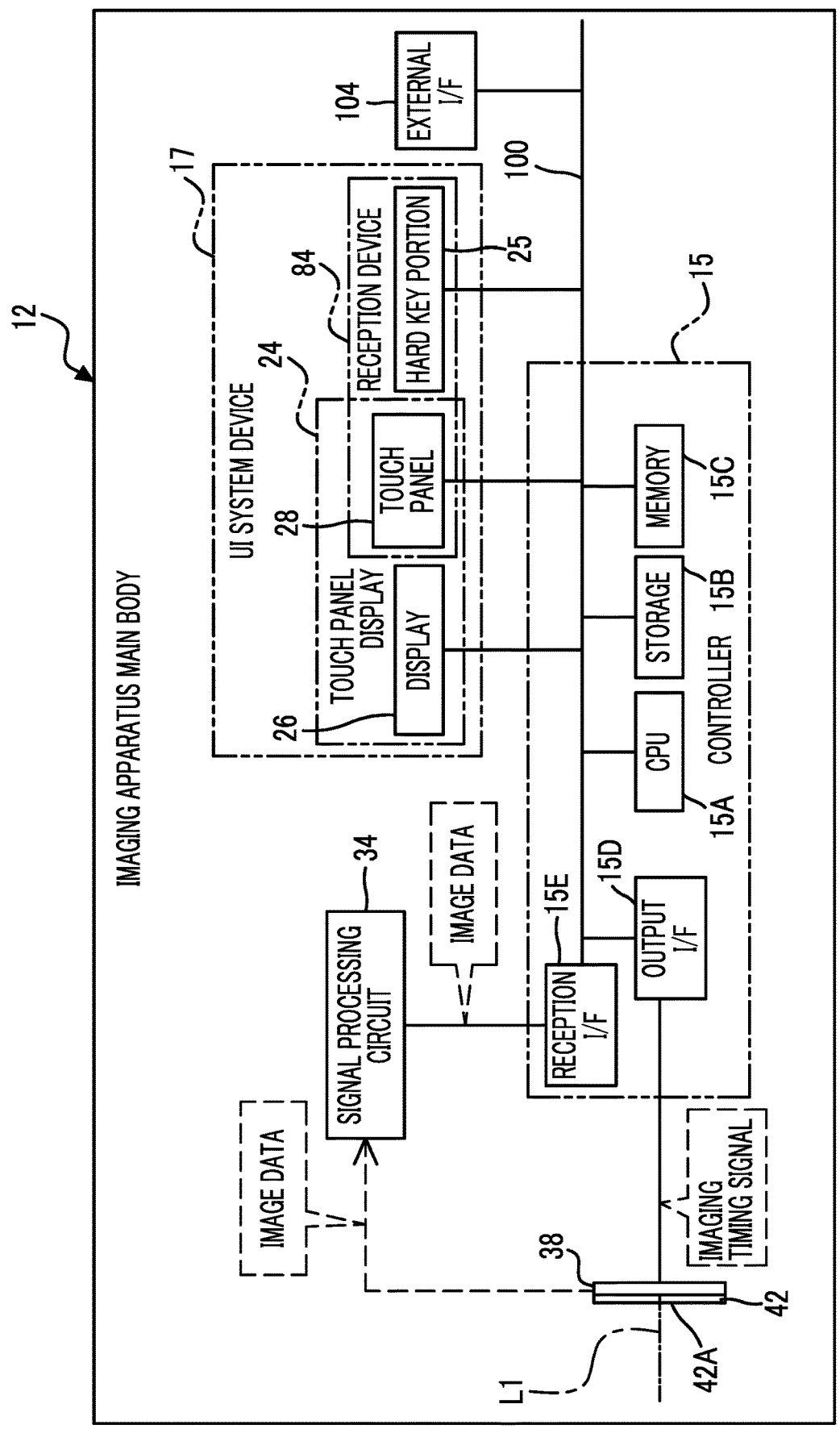
FIG. 4 is a block diagram illustrating an example of a hardware configuration of an electric system of an imaging apparatus main body included in the imaging apparatus according to the first to fourth embodiments.

The touch panel display 24 comprises a display 26 and a touch panel 28 (refer to FIG. 4). An organic EL display is exemplified as an example of the display 26. Instead of the organic EL display, the display 26 may be a display of other types such as a liquid crystal display or an inorganic EL display.

The display 26 and the EVF are an example of a "display device" according to the embodiments of the technology of the present disclosure. Display of the EVF is equivalent to display of the display 26 and thus, will not be described below. However, in the present specification, display on the display 26 can be substituted with display on the EVF.

The display 26 displays images, text information, and the like. The display 26 is used for displaying the live view image obtained by consecutive imaging in a case where the imaging apparatus 10 is in the imaging mode. In addition, the display 26 is used for displaying a still picture image obtained by imaging in a case where an imaging instruction for the still picture image is provided. Furthermore, the display 26 is used for displaying a playback image and displaying a menu screen and the like in a case where the imaging apparatus 10 is in the playback mode.

The touch panel 28 is a transmissive touch panel and is overlaid on a surface of a display region of the display 26. The touch panel 28 receives an instruction from a user by detecting a contact of an instruction object such as a finger or a stylus pen.

Here, while an out-cell touch panel display in which the touch panel 28 is overlaid on the surface of the display region of the display 26 is exemplified as an example of the touch panel display 24, the out-cell touch panel display is merely an example. For example, an on-cell or in-cell touch panel display can also be applied as the touch panel display 24.

The instruction key 27 receives various instructions. For example, the "various instructions" here refer to various instructions such as an instruction to display a menu screen on which various menus can be selected, an instruction to select one or a plurality of menus, an instruction to confirm a selected content, an instruction to delete the selected content, zoom in, zoom out, and frame advance.

Figure 3:
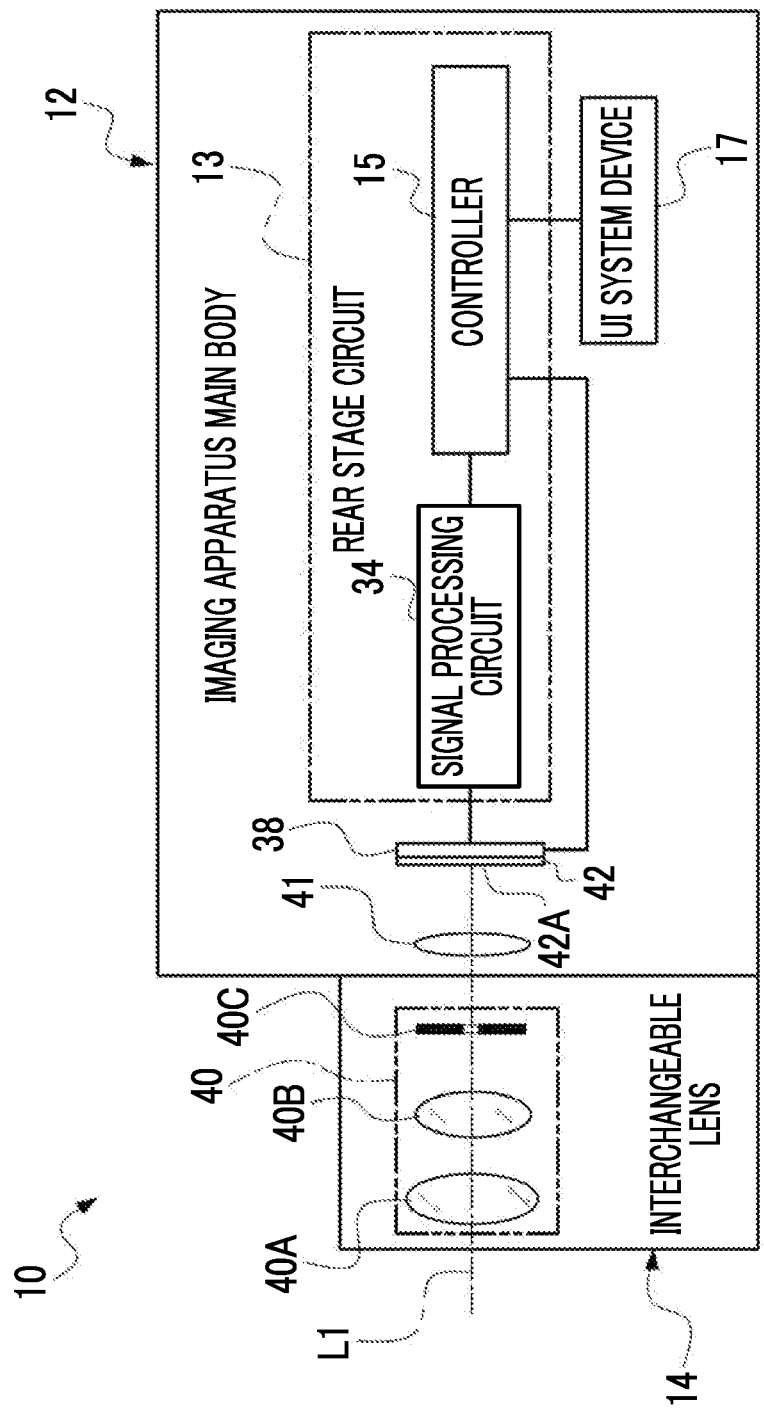
FIG. 3 is a block diagram illustrating an example of a configuration of the imaging apparatus according to the first to fourth embodiments.

As illustrated in FIG. 3 as an example, the interchangeable lens 14 includes an imaging lens 40. The imaging lens 40 comprises an objective lens 40A, a focus lens 40B, and a stop 40C. The objective lens 40A, the focus lens 40B, and the stop 40C are arranged in an order of the objective lens 40A, the focus lens 40B, and the stop 40C along an optical axis L1 from a subject side (object side) to an imaging apparatus main body 12 side (image side). The focus lens 40B and the stop 40C operate by receiving motive power from a driving source (not illustrated) such as a motor. That is, the focus lens 40B moves along the optical axis L1 in response to the provided motive power. In addition, the stop 40C adjusts exposure by operating in response to the provided motive power.

The imaging apparatus main body 12 comprises a rear stage circuit 13, a UI system device 17, a mechanical shutter 41, and the imaging element 38. The rear stage circuit 13 is a circuit positioned on a rear stage of the imaging element 38. The rear stage circuit 13 includes a controller 15 and a signal processing circuit 34. The controller 15 is connected to the UI system device 17, the signal processing circuit 34, and the imaging element 38 and controls the entire electric system of the imaging apparatus 10.

The imaging element 38 comprises a photoelectric conversion element 42 having a light receiving surface 42A. In the present embodiment, the imaging element 38 is a CMOS image sensor. In addition, while the CMOS image sensor is illustrated here as the imaging element 38, the technology of the present disclosure is not limited thereto. For example, the technology of the present disclosure is also established in a case where the imaging element 38 is an image sensor of other types such as a CCD image sensor.

The mechanical shutter 41 operates by receiving motive power from a driving source (not illustrated) such as a motor. In a case where the interchangeable lens 14 is mounted on the imaging apparatus main body 12, the subject light showing the subject is transmitted through the imaging lens 40, and the image of the subject light is formed on the light receiving surface 42A through the mechanical shutter 41.

The UI system device 17 is a device that presents information to the user or receives the instruction from the user. The controller 15 acquires various types of information from the UI system device 17 and controls the UI system device 17.

The imaging element 38 is connected to the controller 15 and generates the image data indicating the image of the subject by imaging the subject under control of the controller 15.

The imaging element 38 is connected to the signal processing circuit 34. The signal processing circuit 34 is an LSI, specifically, a device including an ASIC and an FPGA. The controller 15 acquires various types of information from the signal processing circuit 34 and controls the imaging element 38. The imaging element 38 outputs the image data generated by the photoelectric conversion element 42 to the signal processing circuit 34 under control of the controller 15.

The signal processing circuit 34 is an example of a "processing portion (signal processing circuit)" according to the embodiments of the technology of the present disclosure. The signal processing circuit 34 is a circuit that processes the image data. Specifically, the signal processing circuit 34 performs various types of signal processing on the image data input from the imaging element 38. The various types of signal processing performed by the signal processing circuit 34 include well-known signal processing such as white balance adjustment, sharpness adjustment, gamma correction, color space conversion processing, and color difference correction.

The various types of signal processing performed by the signal processing circuit 34 may be performed in a distributed manner by the signal processing circuit 34 and the imaging element 38. That is, at least a part of the various types of signal processing performed by the signal processing circuit 34 may be performed by a processing circuit 110 of the imaging element 38.

In the present embodiment, while the device including the ASIC and the FPGA is illustrated as the signal processing circuit 34, the technology of the present disclosure is not limited thereto. For example, the signal processing circuit 34 may be a device including an ASIC, an FPGA, or a PLD, a device including an FPGA and a PLD, or a device including an ASIC and a PLD.

In addition, the signal processing circuit 34 may be a computer including a CPU, a storage, and a memory. Here, the storage refers to a non-volatile storage device. A flash memory is exemplified as an example of the non-volatile storage device. However, the technology of the present disclosure is not limited thereto. An EEPROM, an HDD, and/or an SSD or the like may be used. In addition, the memory temporarily stores various types of information and is used as a work memory. A RAM is exemplified as an example of the memory. However, the technology of the present disclosure is not limited thereto. A storage device of other types may be used. The number of CPUs included in the computer may be singular or plural. In addition, a GPU may be used instead of the CPU. In addition, the signal processing circuit 34 may be implemented by a combination of a hardware configuration and a software configuration.

As illustrated in FIG. 4 as an example, the controller 15 comprises a CPU 15A, a storage 15B, a memory 15C, an output I/F 15D, and a reception I/F 15E. The CPU 15A is an example of a "control portion (processor)" according to the embodiments of the technology of the present disclosure. The CPU 15A, the storage 15B, the memory 15C, the output I/F 15D, and the reception I/F 15E are connected through a bus 100.

In the example illustrated in FIG. 4, while one bus is illustrated as the bus 100 for convenience of illustration, a plurality of buses may be used. The bus 100 may be a serial bus or may be a parallel bus including a data bus, an address bus, a control bus, and the like.

The storage 15B stores various parameters and various programs. The storage 15B is a non-volatile storage device. Here, a flash memory is employed as an example of the storage 15B. The flash memory is merely an example. Instead of the flash memory or together with the flash memory, an EEPROM, an HDD, and/or an SSD or the like may be applied as the storage 15B. In addition, the memory 15C temporarily stores various types of information and is used as a work memory. A RAM is exemplified as an example of the memory 15C. However, the technology of the present disclosure is not limited thereto. A storage device of other types may be used.

The storage 15B stores various programs. The CPU 15A reads out a necessary program from the storage 15B and executes the read program on the memory 15C. The CPU 15A controls the entire imaging apparatus 10 in accordance with the program executed on the memory 15C.

The output I/F 15D is connected to the imaging element 38. The CPU 15A controls the imaging element 38 through the output I/F 15D. For example, the CPU 15A controls a timing of imaging performed by the imaging element 38 by supplying an imaging timing signal for defining the timing of imaging to the imaging element 38 through the output I/F 15D.

The reception I/F 15E is connected to the signal processing circuit 34. The image data on which the various types of signal processing are performed by the signal processing circuit 34 is output to the reception I/F 15E by the signal processing circuit 34. The reception I/F 15E receives the image data output from the signal processing circuit 34 and transfers the received image data to the CPU 15A.

An external I/F 104 is connected to the bus 100. The external I/F 104 is a communication device configured with a circuit. Here, while the device configured with the circuit is illustrated as the external I/F 104, the device is merely an example. The external I/F 104 may be a device including an ASIC, an FPGA, and/or a PLD. In addition, the external I/F 104 may be implemented by a combination of a hardware configuration and a software configuration.

A USB interface is exemplified as an example of the external I/F 104. An external apparatus (not illustrated) such as a smart device, a personal computer, a server, a USB memory, a memory card, and/or a printer can be directly or indirectly connected to the USB interface. The external I/F 104 controls exchange of various types of information between the CPU 15A and the external apparatus.

The UI system device 17 comprises the touch panel display 24 and a reception device 84. The display 26 and the touch panel 28 are connected to the bus 100. Accordingly, the CPU 15A displays various types of information on the display 26 and operates in accordance with various instructions received by the touch panel 28.

The reception device 84 comprises a hard key portion 25. The hard key portion 25 includes a plurality of hard keys and includes the release button 20 (refer to FIG. 1), the dial 23 (refer to FIG. 1 and FIG. 2), and the instruction key 27 (refer to FIG. 2). The hard key portion 25 is connected to the bus 100, and the CPU 15A acquires an instruction received by the hard key portion 25 and operates in accordance with the acquired instruction.

Figure 5:
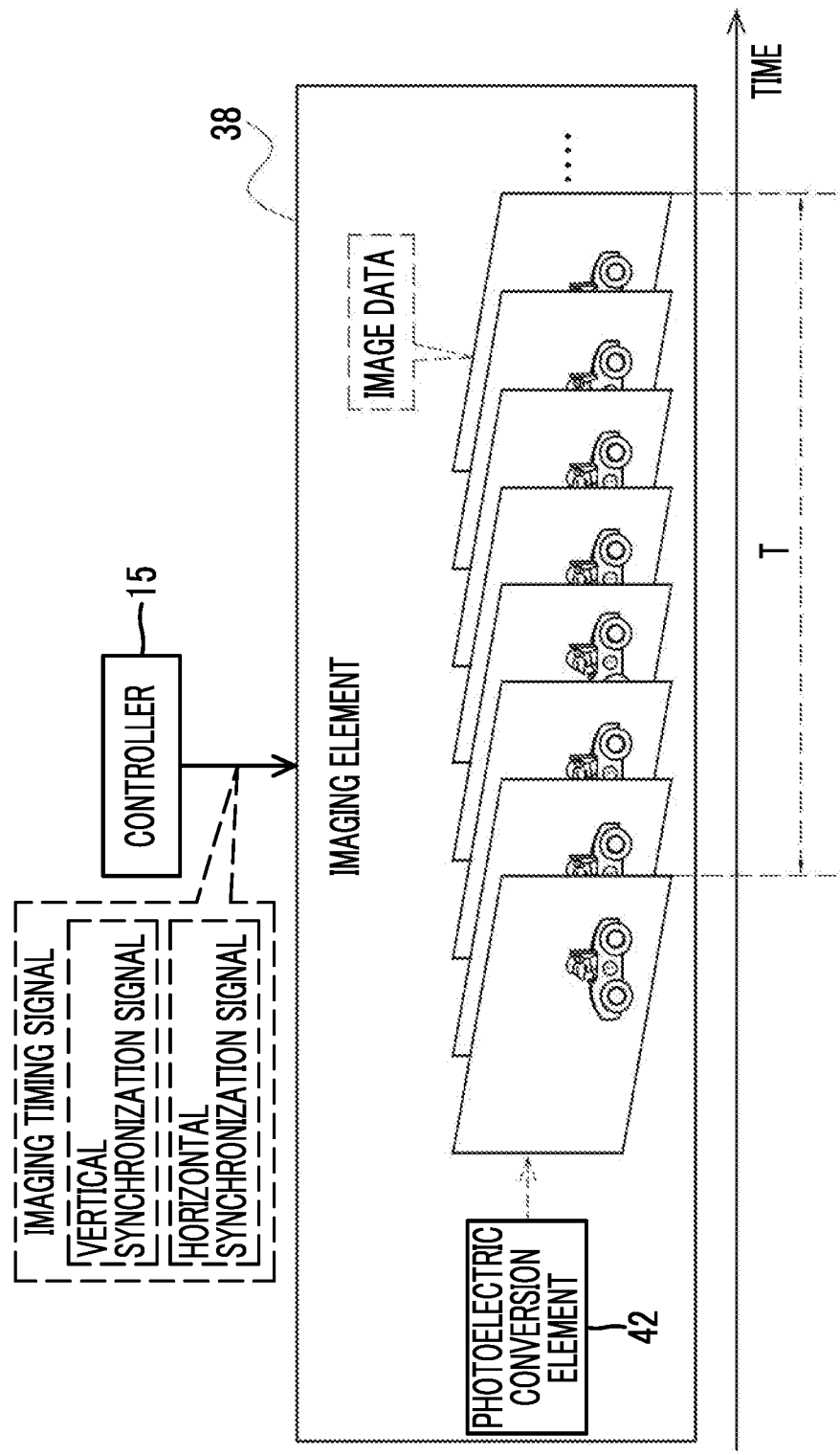
FIG. 5 is a conceptual diagram for describing a frame rate of an imaging element included in the imaging apparatus according to the first to fourth embodiments.

As illustrated in FIG. 5 as an example, the imaging timing signal is input into the imaging element 38 from the controller 15. The imaging timing signal includes a vertical synchronization signal and a horizontal synchronization signal. The vertical synchronization signal is a synchronization signal for defining a start timing of reading of the image data for each frame from the photoelectric conversion element 42. The horizontal synchronization signal is a synchronization signal for defining a start timing of reading of the image data for each horizontal line from the photoelectric conversion element 42. In the imaging element 38, the image data is read out from the photoelectric conversion element 42 in accordance with a frame rate decided in accordance with the vertical synchronization signal input from the controller 15.

In the example illustrated in FIG. 5, a frame rate at which eight frames are read out from the photoelectric conversion element 42 within a period T is illustrated as the frame rate of the imaging element 38. Here, 120 fps is exemplified as a specific example of the frame rate. However, the technology of the present disclosure is not limited thereto. A frame rate (for example, 240 fps) exceeding 120 fps may be used, or a frame rate (for example, 60 fps) less than 120 fps may be used.

Figure 6:
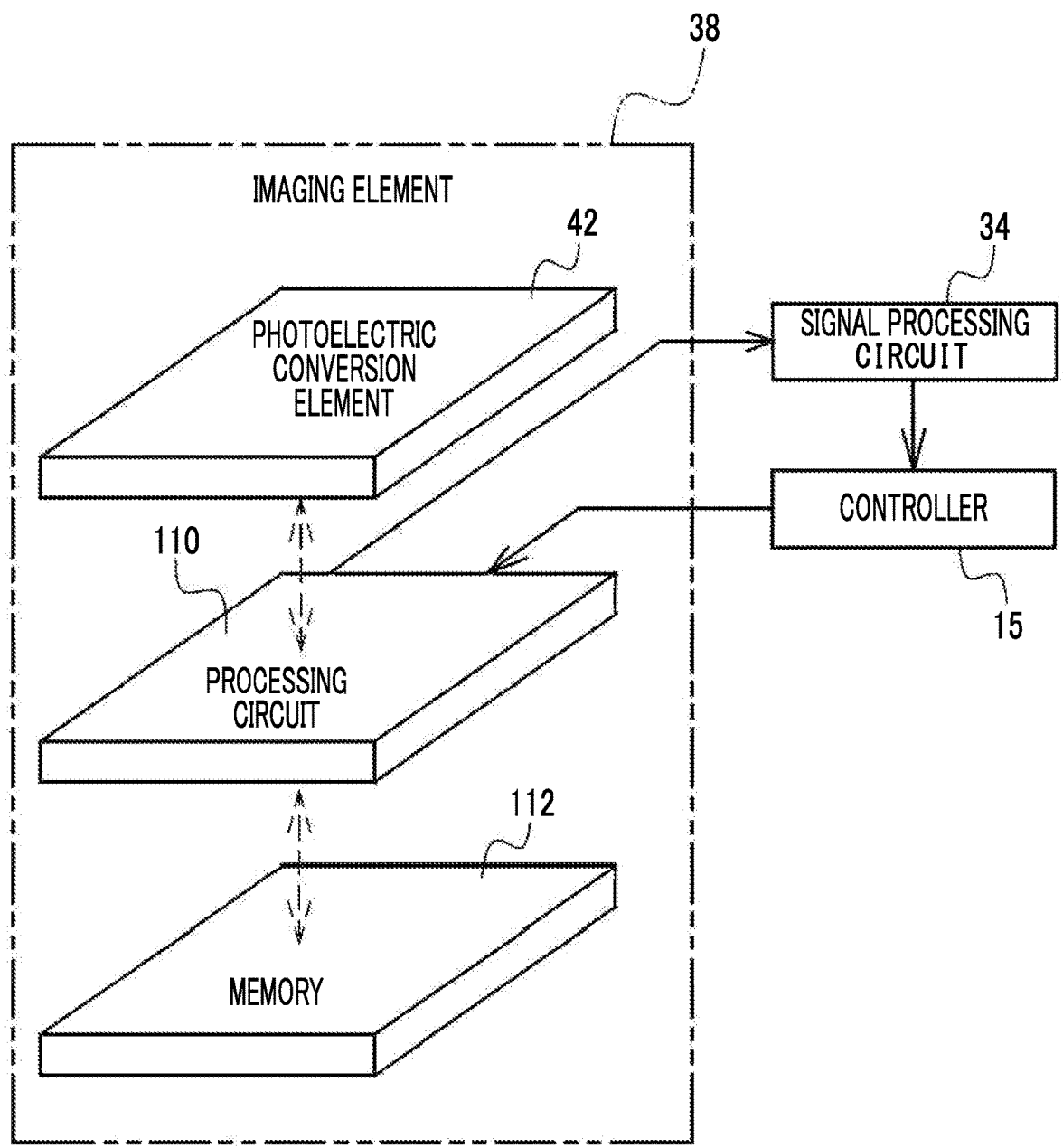
FIG. 6 is a conceptual diagram illustrating an example of a laminated structure of the imaging element included in the imaging apparatus according to the first to fourth embodiments.

As illustrated in FIG. 6 as an example, the imaging element 38 incorporates the photoelectric conversion element 42, the processing circuit 110, and a memory 112. The imaging element 38 is an imaging element in which the photoelectric conversion element 42, the processing circuit 110, and the memory 112 are formed in one chip. That is, the photoelectric conversion element 42, the processing circuit 110, and the memory 112 are formed in one package. In the imaging element 38, the photoelectric conversion element 42 is laminated with the processing circuit 110 and the memory 112. Specifically, the photoelectric conversion element 42 and the processing circuit 110 are electrically connected to each other by a bump (not illustrated) of copper or the like having conductivity. The processing circuit 110 and the memory 112 are also electrically connected to each other by a bump (not illustrated) of copper or the like having conductivity. While a three-layer structure of the photoelectric conversion element 42, the processing circuit 110, and the memory 112 is illustrated here, the technology of the present disclosure is not limited thereto. A two-layer structure of the photoelectric conversion element 42 and a memory layer in which the processing circuit 110 and the memory 112 are formed in one layer may be used. The imaging element 38 is an example of a "laminated imaging element" according to the embodiments of the technology of the present disclosure.

For example, the processing circuit 110 is an LSI. The memory 112 is a memory of which a writing timing and a reading timing are different. Here, a DRAM is employed as an example of the memory 112. The technology of the present disclosure is also established in a case where the memory 112 is a storage device of other types such as an SRAM.

The processing circuit 110 is a device including an ASIC and an FPGA and controls the entire imaging element 38 in accordance with an instruction of the controller 15. Here, while the device including the ASIC and the FPGA is illustrated as the signal processing circuit 110, the technology of the present disclosure is not limited thereto. For example, the processing circuit 110 may be a device including an ASIC, an FPGA, or a PLD, a device including an FPGA and a PLD, or a device including an ASIC and a PLD.

In addition, the processing circuit 110 may be a computer including a CPU, a storage, and a memory. The storage refers to a non-volatile storage device such as a flash memory. The memory temporarily stores various types of information and is used as a work memory. A RAM is exemplified as an example of the memory. However, the technology of the present disclosure is not limited thereto. A storage device of other types may be used. The number of CPUs included in the computer may be singular or plural. In addition, a GPU may be used instead of the CPU. In addition, the processing circuit 110 may be implemented by a combination of a hardware configuration and a software configuration.

The photoelectric conversion element 42 includes a plurality of photodiodes arranged in a matrix form. Photodiodes of "4896×3265" pixels are exemplified as an example of the plurality of photodiodes.

Color filters are arranged in each photodiode included in the photoelectric conversion element 42. The color filters include a G filter corresponding to green (G) that most contributes to obtaining a brightness signal, an R filter corresponding to red (R), and a B filter corresponding to blue (B).

The photoelectric conversion element 42 includes R pixels, G pixels, and B pixels. The R pixels are pixels corresponding to photodiodes in which the R filter is arranged. The G pixels are pixels corresponding to photodiodes in which the G filter is arranged. The B pixels are pixels corresponding to photodiodes in which the B filter is arranged. The R pixels, the G pixels, and the B pixels are arranged with predetermined periodicity in each of a row direction (horizontal direction) and a column direction (vertical direction). In the present embodiment, the R pixels, the G pixels, and the B pixels are arranged with periodicity corresponding to X-Trans (registered trademark) arrangement. While the X-Trans arrangement is illustrated here, the technology of the present disclosure is not limited thereto. Arrangement of the R pixels, the G pixels, and the B pixels may be Bayer arrangement or honeycomb arrangement.

The imaging element 38 has a so-called electronic shutter function and controls an electric charge accumulation time period of each photodiode in the photoelectric conversion element 42 by performing the electronic shutter function under control of the controller 15. The electric charge accumulation time period refers to a so-called shutter speed.

In the imaging element 38, imaging for the still picture image and imaging for the live view image are selectively performed using a rolling shutter method. The imaging for the still picture image is implemented by performing the electronic shutter function and operating the mechanical shutter 41. The imaging for the live view image is implemented by performing the electronic shutter function without operating the mechanical shutter 41. While imaging using the mechanical shutter 41 is illustrated here, the mechanical shutter 41 is not essential for implementing imaging. Even in a case where the mechanical shutter 41 is not present, the imaging for the live view image and the imaging for the still picture image are implemented by performing the electronic shutter function. In addition, while the rolling shutter method is illustrated here, the technology of the present disclosure is not limited thereto. A global shutter method may be applied instead of the rolling shutter method.

Figure 7:
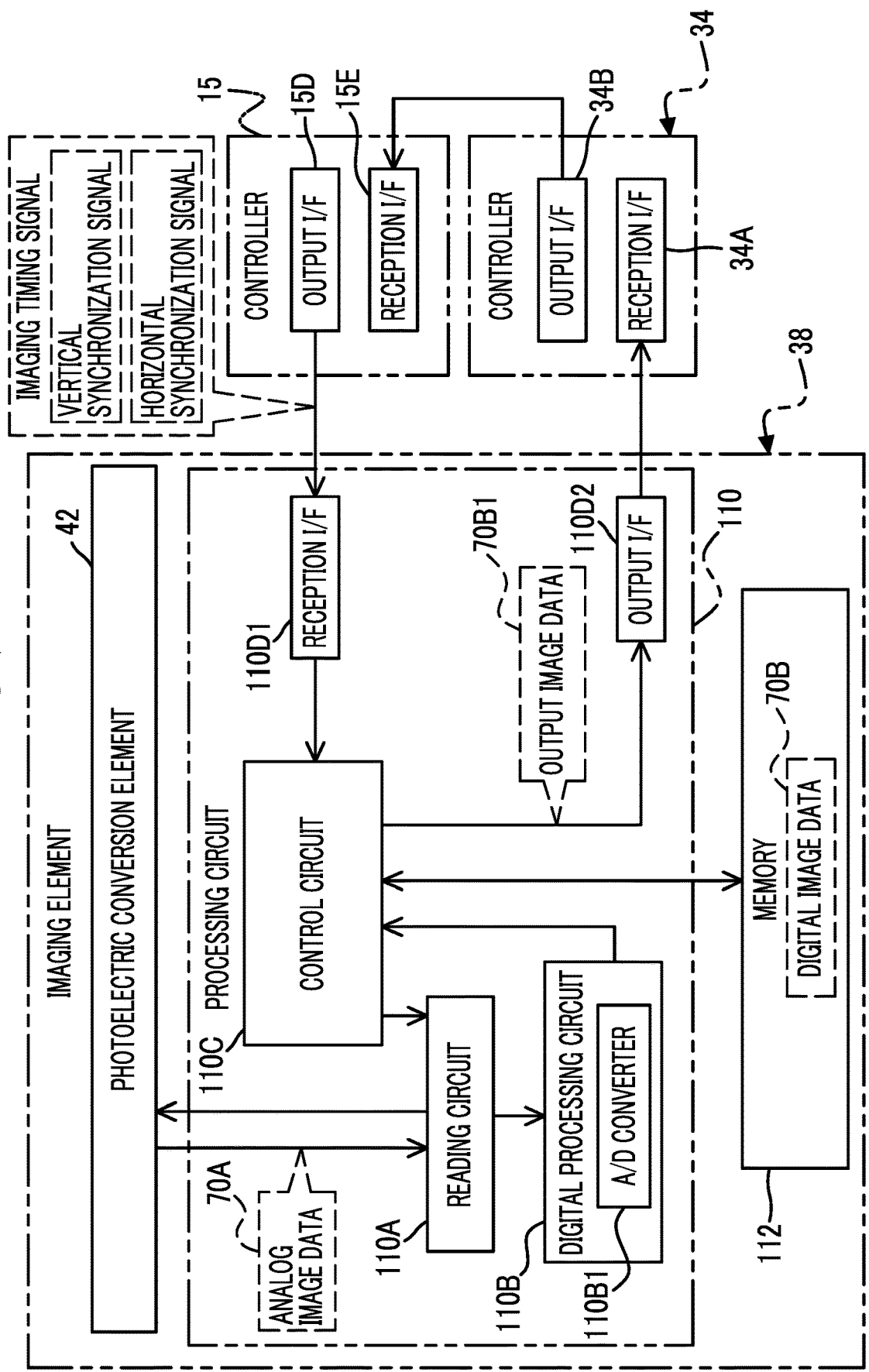
FIG. 7 is a block diagram illustrating an example of a hardware configuration of an electric system of the imaging element included in the imaging apparatus according to the first, second, and fourth embodiments.

As illustrated in FIG. 7 as an example, the processing circuit 110 comprises a reception I/F 110D1 and an output I/F 110D2. The output I/F 15D of the controller 15 is connected to the reception I/F 110D1 of the processing circuit 110 and outputs the imaging timing signal to the reception I/F 110D1. The reception I/F 110D1 receives the imaging timing signal output from the output I/F 15D.

The signal processing circuit 34 comprises a reception I/F 34A and an output I/F 34B. The reception I/F 34A is connected to the output I/F 110D2 of the imaging element 38. The output I/F 110D2 of the processing circuit 110 outputs various types of information such as the image data (hereinafter, simply referred to as the "various types of information") to the reception I/F 34A of the signal processing circuit 34. The reception I/F 34A receives the various types of information output from the output I/F 110D2. The signal processing circuit 34 performs signal processing as necessary on the various types of information received by the reception I/F 34A. The output I/F 34B is connected to the reception I/F 15E of the controller 15 and outputs the various types of information to the reception I/F 15E of the controller 15. The reception I/F 15E receives the various types of information output from the output I/F 34B.

In the imaging element 38, the processing circuit 110 comprises, in addition to the reception I/F 110D1 and the output I/F 110D2, a reading circuit 110A, a digital processing circuit 110B, and a control circuit 110C.

The reading circuit 110A is connected to each of the photoelectric conversion element 42, the digital processing circuit 110B, and the control circuit 110C. The digital processing circuit 110B is connected to the control circuit 110C. The control circuit 110C is connected to each of the memory 112, the reception I/F 110D1, and the output I/F 110D2.

As illustrated in FIG. 7 as an example, the image data is broadly divided into analog image data 70A and digital image data 70B. Hereinafter, for convenience of description, various types of image data such as the analog image data 70A, the digital image data 70B, output image data 70B1 (refer to FIG. 12) described later, live view image data 70B2 (refer to FIG. 12) described later, and reduced image data 70B3 (refer to FIG. 12) described later will be referred to as the "image data" without the reference signs unless otherwise necessary to distinguish therebetween.

Each of the reception I/F 110D1 and the output I/F 110D2 of the processing circuit 110 is a communication device configured with a circuit. In addition, each of the output I/F 15D and the reception I/F 15E of the controller 15 is a communication device configured with a circuit. Furthermore, each of the reception I/F 34A and the output I/F 34B of the signal processing circuit 34 is a communication device configured with a circuit.

The reception I/F 110D1 of the processing circuit 110 and the output I/F 15D of the controller 15 are connected in accordance with a PCIe connection standard. In addition, the output I/F 110D2 of the processing circuit 110 and the reception I/F 34A of the signal processing circuit 34 are connected in accordance with the PCIe connection standard. Furthermore, the output I/F 34B of the signal processing circuit 34 and the reception I/F 15E of the controller 15 are connected in accordance with the PCIe connection standard. Hereinafter, the reception I/F 110D1, the output I/F 110D2, the reception I/F 34A, the output I/F 34B, the reception I/F 15E, and the output I/F 15D will be referred to as a "communication I/F" without the reference signs unless otherwise necessary to distinguish therebetween.

Here, while the communication device configured with the circuit is employed as the communication I/F, the communication device is merely an example. The communication I/F may be a device including an ASIC, an FPGA, and/or a PLD. In addition, the communication I/F may be a computer including a CPU, a storage such as a flash memory, and a memory such as a RAM. In this case, the number of CPUs included in the computer may be singular or plural. A GPU may be used instead of the CPU. In addition, the communication I/F may be implemented by a combination of a hardware configuration and a software configuration.

The reception I/F 110D1 receives the imaging timing signal output from the output I/F 15D of the controller 15 and transfers the received imaging timing signal to the control circuit 110C.

The reading circuit 110A controls the photoelectric conversion element 42 and reads out the analog image data 70A from the photoelectric conversion element 42 under control of the control circuit 110C. Reading of the analog image data 70A from the photoelectric conversion element 42 is performed in accordance with the imaging timing signal which is input into the processing circuit 110 from the controller 15.

Specifically, first, the reception I/F 110D1 receives the imaging timing signal from the controller 15 and transfers the received imaging timing signal to the control circuit 110C. Next, the control circuit 110C transfers the imaging timing signal transferred from the reception I/F 110D1 to the reading circuit 110A. That is, the vertical synchronization signal and the horizontal synchronization signal are transferred to the reading circuit 110A. The reading circuit 110A starts reading out the analog image data 70A in units of frames from the photoelectric conversion element 42 in accordance with the vertical synchronization signal transferred from the control circuit 110C. In addition, the reading circuit 110A starts reading out the analog image data 70A in units of horizontal lines in accordance with the horizontal synchronization signal transferred from the control circuit 110C.

The reading circuit 110A performs analog signal processing on the analog image data 70A read out from the photoelectric conversion element 42. The analog signal processing includes well-known processing such as noise cancelation processing and analog gain processing. The noise cancelation processing is processing of canceling a noise caused by variations in characteristics between pixels included in the photoelectric conversion element 42. The analog gain processing is processing of applying a gain to the analog image data 70A. The analog image data 70A on which the analog signal processing is performed in such a manner is output to the digital processing circuit 110B by the reading circuit 110A.

The digital processing circuit 110B comprises an A/D converter 110B1. The A/D converter 110B1 performs A/D conversion on the analog image data 70A.

The digital processing circuit 110B performs digital signal processing on the analog image data 70A input from the reading circuit 110A. For example, the digital signal processing includes the A/D conversion performed by the A/D converter 110I, and digital gain processing.

The A/D converter 110B1 performs the A/D conversion on the analog image data 70A. Accordingly, the analog image data 70A is digitized, and the digital image data 70B is obtained as RAW data. The digital gain processing is performed on the digital image data 70B by the digital processing circuit 110B. The digital gain processing refers to processing of applying a gain to the digital image data 70B. The digital image data 70B obtained by performing the digital signal processing in such a manner is output to the control circuit 110C by the digital processing circuit 110B.

The memory 112 is a memory that can store the digital image data 70B of a plurality of frames. The control circuit 110C stores the digital image data 70B input from the digital processing circuit 110B in the memory 112. The memory 112 has a storage region in units of pixels. The digital image data 70B is stored in a corresponding storage region of the memory 112 in units of pixels by the control circuit 110C.

The control circuit 110C can randomly access the memory 112 and acquires the digital image data 70B from the memory 112 in accordance with the frame rate. The control circuit 110C reduces the digital image data 70B acquired from the memory 112 and outputs the output image data 70B1 obtained by reduction to the signal processing circuit 34 using the output I/F 110D2. Here, "reduction" refers to processing of decreasing a resolution of the image data. Processing of thinning out the pixels is exemplified as an example of the processing of decreasing the resolution.

In the signal processing circuit 34, the digital image data 70B input from the output I/F 110D2 is received by the reception I/F 34A, and the various types of signal processing are performed on the received digital image data 70B.

Figure 8:
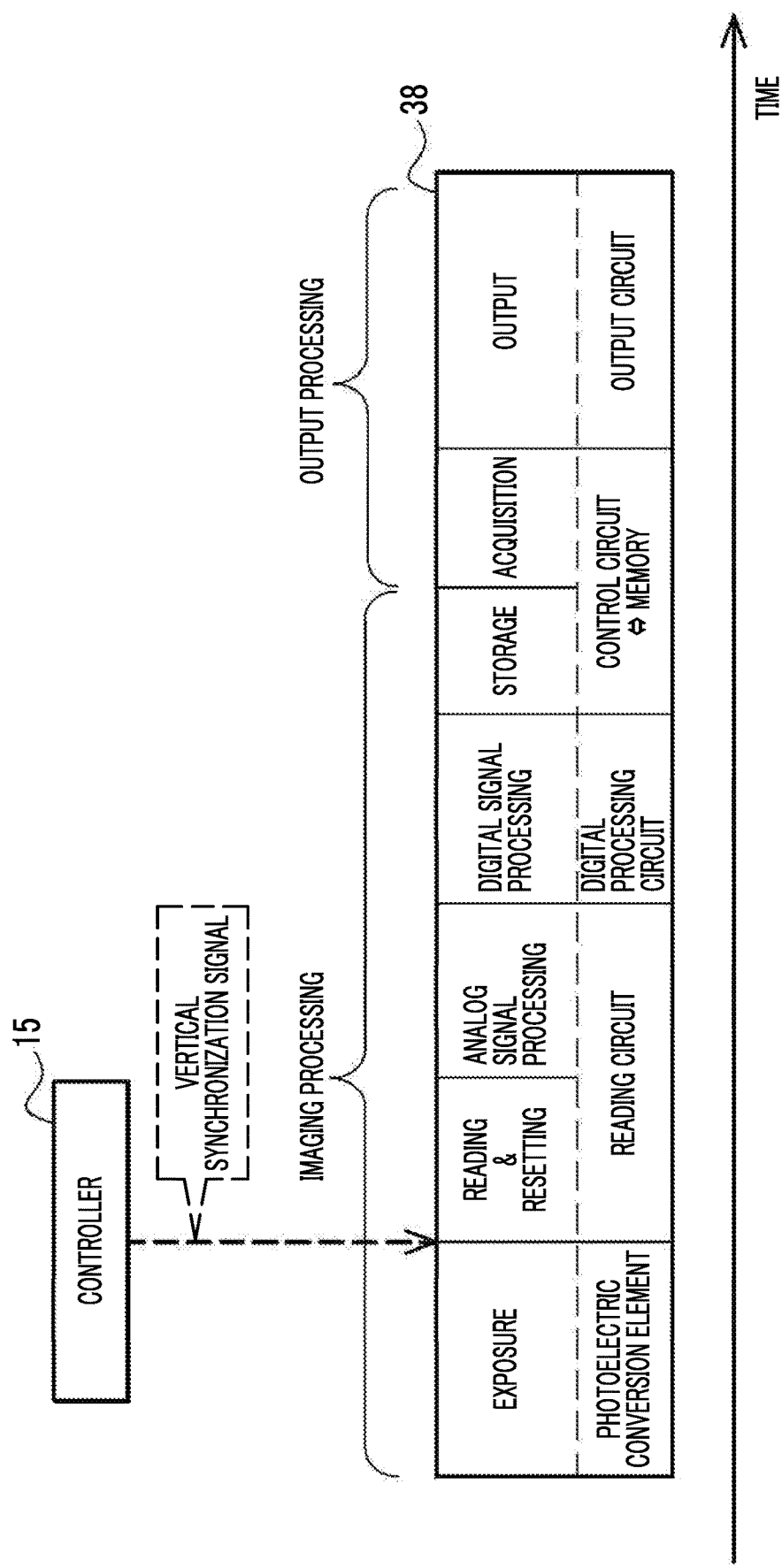
FIG. 8 is a conceptual diagram illustrating an example of contents of imaging processing and output processing performed by the imaging element according to the first to fourth embodiments.

As illustrated in FIG. 8 as an example, in the imaging element 38, processing including imaging processing and output processing is performed.

In the imaging processing, exposure, reading of the analog image data 70A, resetting of the photoelectric conversion element 42, the analog signal processing, the digital signal processing, and storage of the digital image data 70B are performed in this order.

In the imaging processing, first, the exposure is performed by the photoelectric conversion element 42. Reading of the analog image data 70A, resetting of the photoelectric conversion element 42, and the analog signal processing are performed by the reading circuit 110A. A period in which the exposure is performed by the photoelectric conversion element 42 is a period in which reading of the analog image data 70A and resetting of the photoelectric conversion element 42 are not performed. The digital signal processing is performed by the digital processing circuit 110B. The digital image data 70B obtained by performing the digital signal processing is stored in the memory 112 by the control circuit 110C.

In the output processing, acquisition of the digital image data 70B and output of the output image data 70B1 are performed. That is, in the output processing, first, the control circuit 110C acquires the digital image data 70B from the memory 112. The control circuit 110C generates the output image data 70B1 by reducing the digital image data 70B and outputs the generated output image data 70B1 to the signal processing circuit 34 through the output I/F 110D2.

Figure 9:
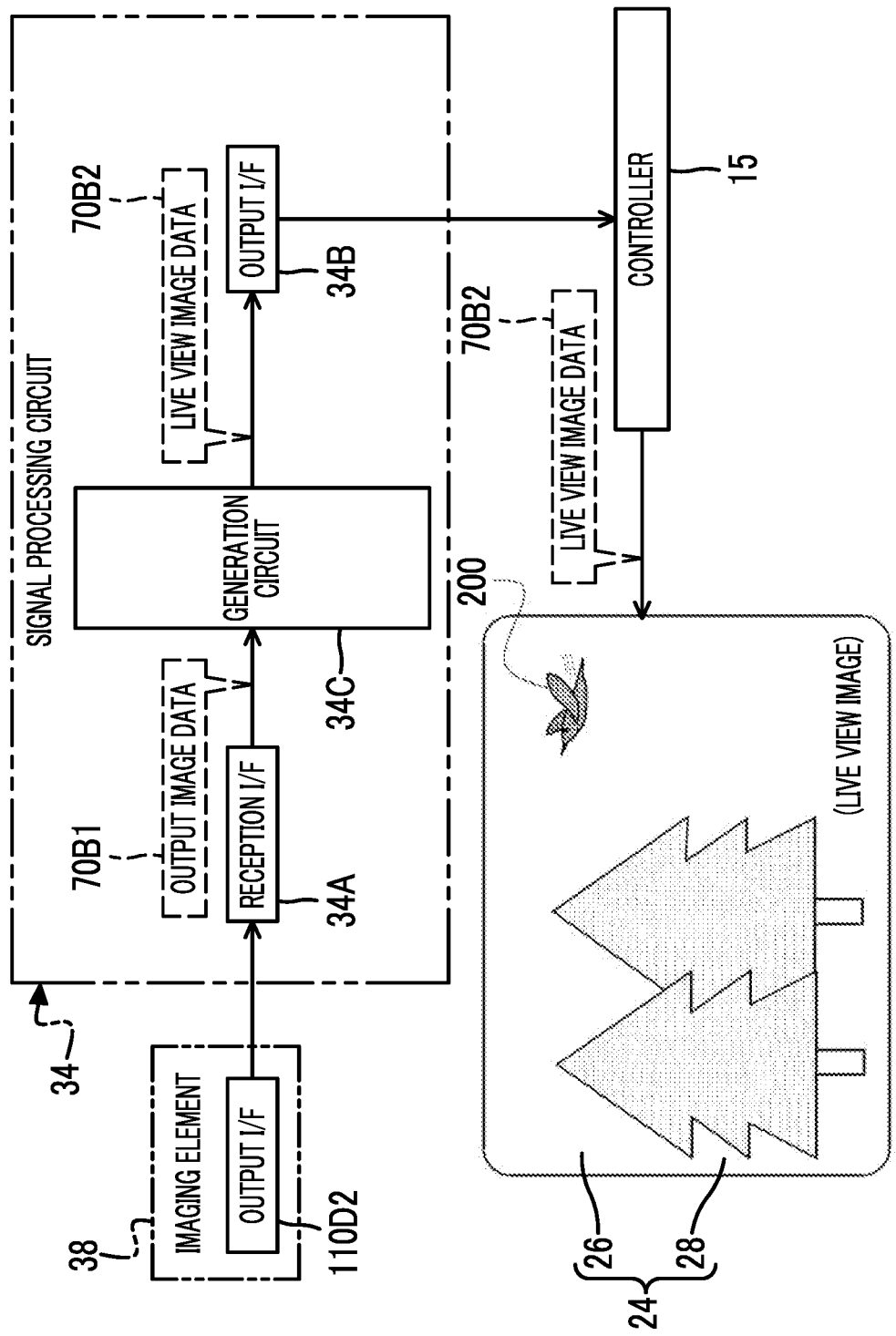
FIG. 9 is a conceptual diagram illustrating an example of a mutual relationship among the imaging element, a signal processing circuit, a controller, and a touch panel display included in the imaging apparatus according to the first to fourth embodiments.

As illustrated in FIG. 9 as an example, the signal processing circuit 34 comprises a generation circuit 34C. The reception I/F 34A and the output I/F 34B are connected to the generation circuit 34C. The output image data 70B1 output from the output I/F 110D2 of the imaging element 38 is received by the reception I/F 34A. The output image data 70B1 received by the reception I/F 34A is acquired by the generation circuit 34C. The generation circuit 34C generates live view image data 70B2 by reducing the output image data 70B1 acquired from the reception I/F 34A. The live view image data 70B2 is image data having a lower resolution than the output image data 70B1. The live view image data 70B2 is an example of "display image data" according to the embodiments of the technology of the present disclosure.

The generation circuit 34C outputs the generated live view image data 70B2 to the controller 15 through the output I/F 34B. The controller 15 receives the live view image data output from the output I/F 34B and displays the live view image indicated by the received live view image data 70B2 on the display 26. In the example illustrated in FIG. 9, an image including a specific subject image 200 that is an example of a "specific subject" and a "moving object" according to the embodiments of the technology of the present disclosure and shows a bird, and a background image showing a background of the bird is illustrated as the live view image. The background image includes an image showing a forest (in the example illustrated in FIG. 9, two trees). The specific subject image 200 is an example of a "moving object image" according to the embodiments of the technology of the present disclosure.

Figure 10:
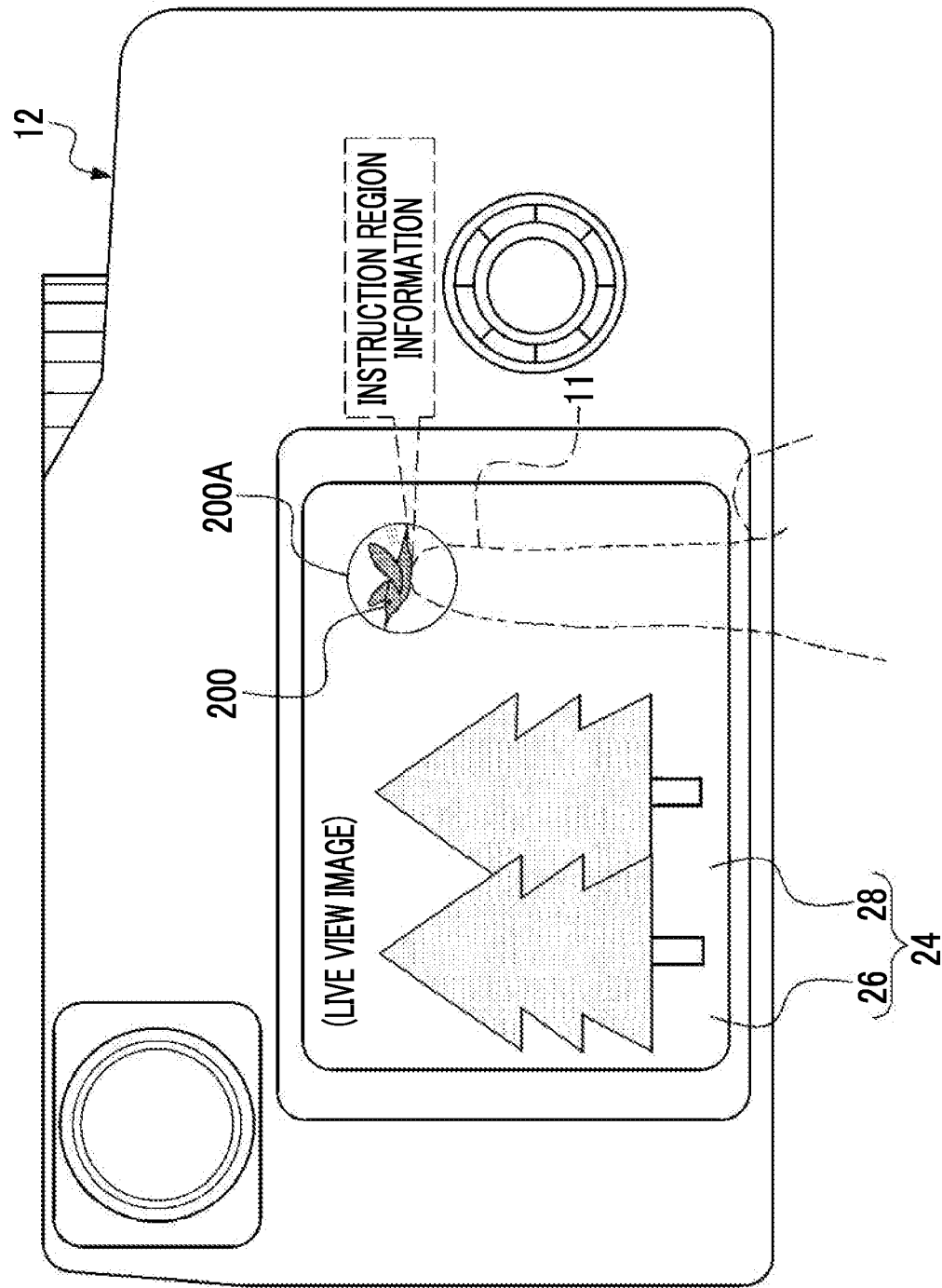
FIG. 10 is a conceptual diagram illustrating an example of use of the touch panel display included in the imaging apparatus according to the first to fourth embodiments.

As illustrated in FIG. 10 as an example, the touch panel 28 receives instruction region information. The instruction region information refers to information for issuing an instruction for a region 200A that is a partial closed region in the live view image. The region 200A is a region for which the instruction is issued by the user as a detection target region in which a first detection circuit 34D and a second detection circuit 34E (refer to FIG. 11) described later detect the specific subject image 200.

For example, the instruction region information is received by the touch panel 28 by performing a touch operation on the touch panel 28 with a finger 11 of the user. In this case, a circular region of a predetermined radius (for example, a few millimeters) centered at a position corresponding to a position of contact with the finger 11 on the touch panel 28 in the live view image is defined as the region 200A. Here, while the region 200A of a predetermined size and shape is decided by the touch operation performed on the touch panel 28, a method of defining the region 200A is not limited thereto. For example, the instruction region information may be received by the touch panel 28 by performing a swipe operation of drawing contours of a closed region on the touch panel 28. In this case, the closed region drawn by performing the swipe operation on the touch panel 28 in the live view image is defined as the region 200A.

In the example illustrated in FIG. 10, while the region 200A for which the instruction issued using the instruction region information received by the touch panel 28 is illustrated, the technology of the present disclosure is also established in a case where the instruction for the region 200A is not issued using the instruction region information. In this case, for example, a predetermined region in the live view image may be used as the detection target region of the first detection circuit 34D and the second detection circuit 34E (refer to FIG. 11). For example, the predetermined region refers to the entire region of the live view image or a preset partial region in the live view image.

The instruction region information is received by the touch panel 28 by operating the touch panel 28 with the finger 11 of the user. In the example illustrated in FIG. 10, while a circular region is illustrated as the region 200A, the circular region is merely an example. The shape of the region 200A may be other shapes such as a polygonal shape or may be a shape of a region of contact with the finger 11 in the touch panel 28. In addition, while the finger 11 is illustrated here, an instruction object such as a stylus pen detectable by the touch panel 28.

For example, touching the touch panel 28 with the finger 11 of the user displays contours (in the example illustrated in FIG. 10, a circular frame) of the region 200A at a touched position. The size of the region 200A may be fixed or may be adjustable. In a case where the size of the region 200A is adjustable, for example, the size of the region 200A is adjusted by a pinch-in operation and a pinch-out operation performed on the touch panel 28.

In the example illustrated in FIG. 10, while an aspect in which the specific subject image 200 is included in the region 200A (aspect in which the circular frame of the region 200A encloses the specific subject image 200) is illustrated, the technology of the present disclosure is not limited thereto. For example, an instruction for a partial closed region (for example, a region expected by the user as a movement destination of the specific subject image 200) in which the specific subject image 200 is not included yet in the live view image may be issued as the region 200A by the user through the touch panel 28 or the like. In the example illustrated in FIG. 10, the specific subject image 200 included in the region 200A is an example of a "moving object image showing a moving object for which an instruction is issued" according to the embodiments of the technology of the present disclosure.

Figure 11:
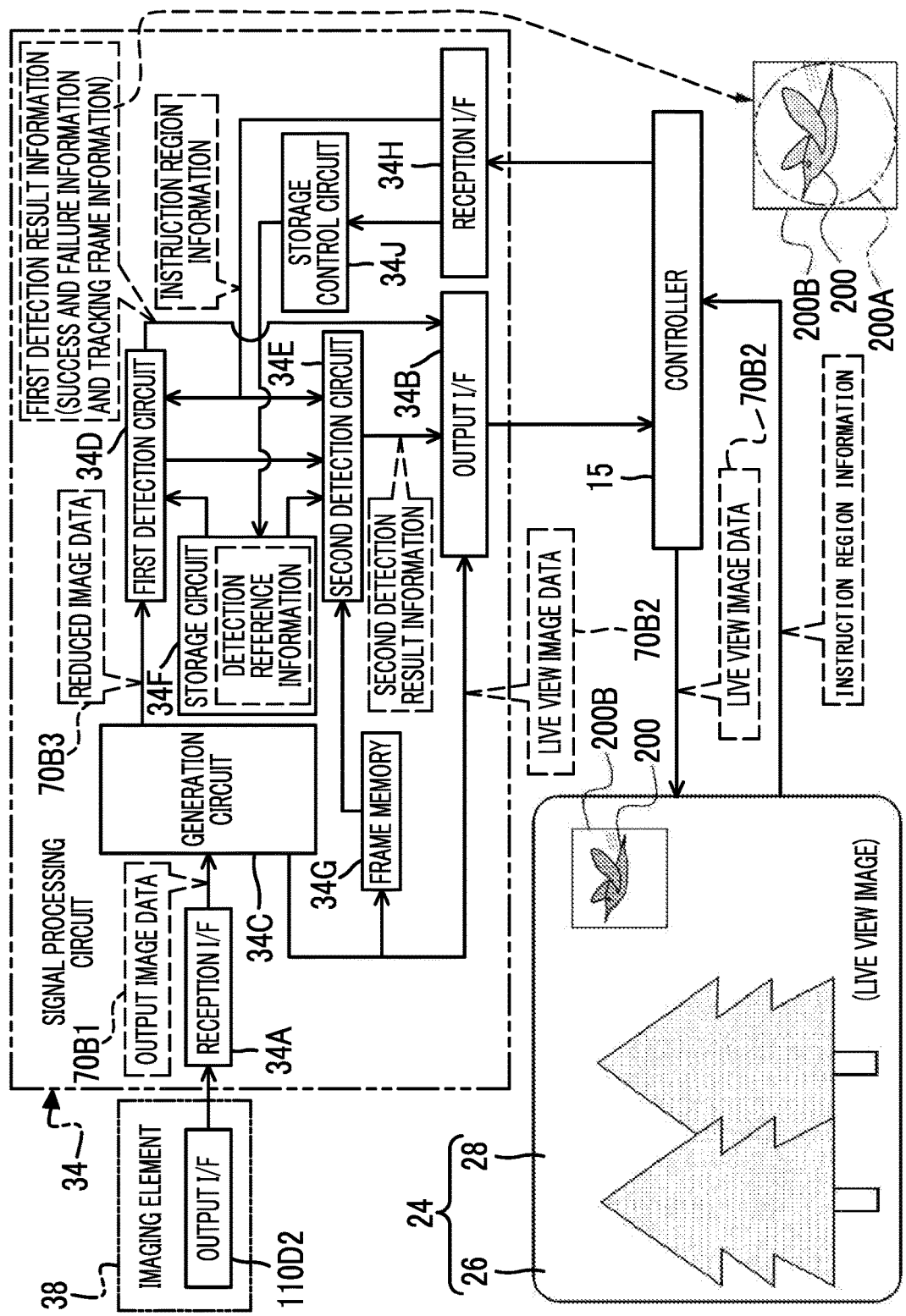
FIG. 11 is a conceptual diagram illustrating an example of a configuration of the signal processing circuit and an edge part included in the imaging apparatus according to the first and second embodiments.

As illustrated in FIG. 11 as an example, the signal processing circuit 34 comprises, in addition to the reception I/F 34A, the output I/F 34B, and the generation circuit 34C, the first detection circuit 34D, the second detection circuit 34E, a storage circuit 34F, a frame memory 34G, a reception I/F 34H, and a storage control circuit 34J. The frame memory 34G is an example of a "storage portion" according to the embodiments of the technology of the present disclosure.

The reception I/F 34H has the same configuration as the reception I/F 34A and is connected to the controller 15. The controller 15 acquires the instruction region information received by the touch panel 28 and outputs the acquired instruction region information to the reception I/F 34H of the signal processing circuit 34. The reception I/F 34H receives the instruction region information output from the controller 15. The instruction region information received by the reception I/F 34H is acquired by the first detection circuit 34D and the second detection circuit 34E.

Detection reference information is stored in the storage circuit 34F. The first detection circuit 34D and the second detection circuit 34E detect the specific subject image 200 from the image indicated by the image data by referring to the detection reference information. For example, a plurality of sample images (for example, sample images showing birds) required for detecting the specific subject image 200 from the image data and/or information (hereinafter, referred to as "feature amount information") indicating a feature amount obtained by analyzing each of the plurality of sample images is exemplified as the detection reference information. For example, information indicating frequency characteristics obtained by performing Fourier conversion on each of the plurality of sample images is exemplified as the feature amount information. The feature amount information can also be obtained by machine learning using a convolutional neural network.

The detection reference information may be stored in advance in the storage circuit 34F or may be stored in the storage circuit 34F by the storage control circuit 34J under control of the controller 15.

Here, in a case where the sample images are used as the detection reference information, the controller 15 acquires, as the sample images, an image (for example, an image showing a bird in the live view image) designated by the user through the touch panel 28 in a state where the live view image is displayed on the display 26. The technology of the present disclosure is not limited thereto. The controller 15 may acquire the sample images from the external apparatus through the external I/F 104 (refer to FIG. 4). The sample images acquired in such a manner are output to the signal processing circuit 34 by the controller 15.

The sample images output from the controller 15 are received by the reception I/F 34H. The storage control circuit 34J stores the sample images received by the reception I/F 34H in the storage circuit 34F.

Even in a case where the feature amount information is used as the detection reference information, the feature amount information is acquired by the controller 15 in the same manner as the sample images. The feature amount information acquired by the controller 15 is stored in the storage circuit 34F by the storage control circuit 34J under control of the controller 15.

The generation circuit 34C performs processing of reducing the live view image data 70B2 and outputs reduced image data 70B3 obtained by the processing to the first detection circuit 34D. The reduced image data 70B3 is image data having a lower resolution than the live view image data 70B2. Here, the live view image data 70B2 is an example of "pre-reduction image data that is image data before reduction" according to the embodiments of the technology of the present disclosure.

The generation circuit 34C outputs the live view image data 70B2 to the frame memory 34G and the output I/F 34B. The output I/F 34B outputs the live view image data 70B2 input from the generation circuit 34C to the controller 15.

The frame memory 34G stores the image data obtained by imaging. Specifically, the frame memory 34G is a memory using a FIFO method and stores the live view image data 70B2 in units of frames.

The first detection circuit 34D performs first detection processing. The first detection processing refers to processing of detecting the specific subject image 200 from an image (hereinafter, referred to as a "reduced image") indicated by the reduced image data 70B3 obtained by reducing the output image data 70B1 using the generation circuit 34C. In the first detection processing, the detection reference information of the storage circuit 34F is used. That is, the first detection circuit 34D detects the specific subject image 200 from the reduced image by referring to the detection reference information.

The first detection circuit 34D outputs first detection result information indicating a detection result of the first detection processing to the second detection circuit 34E and the output I/F 34B. The first detection result information includes first detection processing success and failure information indicating whether or not the first detection processing results in a success. In addition, in a case where the first detection processing results in a success, tracking frame information is included in the first detection result information. The tracking frame information refers to information indicating a tracking frame 200B. The tracking frame information included in the first detection result information also includes position specifying information (for example, coordinates) for specifying a position of the tracking frame 200B in the reduced image. The tracking frame 200B is a frame that tracks the specific subject image 200. In the example illustrated in FIG. 11, a rectangular frame that encloses the specific subject image 200 and encloses the region 200A is illustrated as the tracking frame 200B. Here, while the rectangular frame is illustrated as the tracking frame 200B, a frame having other shapes may be used. In addition, here, while the frame enclosing the specific subject image 200 and the region 200A is illustrated as the tracking frame 200B, the technology of the present disclosure is not limited thereto. The tracking frame 200B may be a frame that encloses only the specific subject image 200 out of the specific subject image 200 and the region 200A.

The second detection circuit 34E performs second detection processing on the live view image data 70B2 stored in the frame memory 34G. Specifically, in a case where the specific subject image 200 is not detected by executing the first detection processing using the first detection circuit 34D, the second detection circuit 34E acquires the live view image data 70B2 of one frame from the frame memory 34G and detects the specific subject image 200 from the live view image indicated by the acquired live view image data 70B2.

The second detection circuit 34E determines whether or not the specific subject image 200 is not detected by executing the first detection processing using the first detection circuit 34D, by referring to the first detection processing success and failure information included in the first detection result information input from the first detection circuit 34D. In a case where the specific subject image 200 is not detected by executing the first detection processing, that is, in a case where the first detection processing success and failure information is information indicating that the first detection processing does not result in a success, the second detection circuit 34E performs the second detection processing on the live view image data 70B2 stored in the frame memory 34G.

The second detection circuit 34E outputs second detection result information indicating a detection result of the second detection processing to the output I/F 34B. The second detection result information includes second detection processing success and failure information indicating whether or not the second detection processing results in a success. In addition, in a case where the second detection processing results in a success, the tracking frame information is included in the second detection result information. The tracking frame information included in the second detection result information also includes the position specifying information (for example, coordinates) for specifying the position of the tracking frame 200B in the live view image.

Hereinafter, for convenience of description, the first detection result information and the second detection result information will be referred to as "detection result information" unless otherwise necessary to distinguish therebetween. In addition, hereinafter, for convenience of description, the first detection processing and the second detection processing will be referred to as "detection processing" unless otherwise necessary to distinguish therebetween.

In a case where the first detection result information is input from the first detection circuit 34D, the output I/F 34B outputs the first detection result information to the controller 15. In a case where the second detection result information is input from the second detection circuit 34E, the output I/F 34B outputs the second detection result information to the controller 15. The controller 15 displays the detection result indicated by the detection result information input from the output I/F 34B, that is, the detection result of the detection processing, on the display 26. In the example illustrated in FIG. 11, the tracking frame 200B is displayed to enclose the specific subject image 200 in a superimposed manner on the live view image as the detection result of the detection processing.

FIG. 12 illustrates a conceptual diagram illustrating an example of a relationship among the digital image data 70B, the output image data 70B1, the live view image data 70B2, and the reduced image data 70B3. As illustrated in FIG. 12 as an example, the digital image data 70B is reduced into three pieces of image data of the output image data 70B1, the live view image data 70B2, and the reduced image data 70B3. In a case where n denotes an integer greater than or equal to 1, the output image data 70B1 is image data formed of a pixel group of a "2n−1"-th row of the digital image data 70B. In addition, the live view image data 70B2 is image data formed of a pixel group obtained by excluding a pixel group of a "6n+1"-th row from the pixel group of the "2n−1"-th row. Furthermore, the reduced image data 70B3 is image data formed of a pixel group obtained by excluding the pixel group of the "6n+1"-th row and a pixel group of a "6n−3"-th row from the pixel group of the "2n−1"-th row.

In such a manner, the output image data 70B1 is image data having a lower resolution than the digital image data 70B. The live view image data 70B2 is image data having a lower resolution than the output image data 70B1. The reduced image data 70B3 is image data having a lower resolution than the live view image data 70B2.

In FIG. 12, while an example in which the image data is reduced by thinning out the image data in units of horizontal lines is exemplified, the technology of the present disclosure is not limited thereto. For example, the image data may be reduced by thinning out the image data in units of vertical lines, or the image data may be reduced by thinning out the image data in units of horizontal lines and in units of vertical lines. Any method may be used as a method of reducing the image data.

Figure 13A:
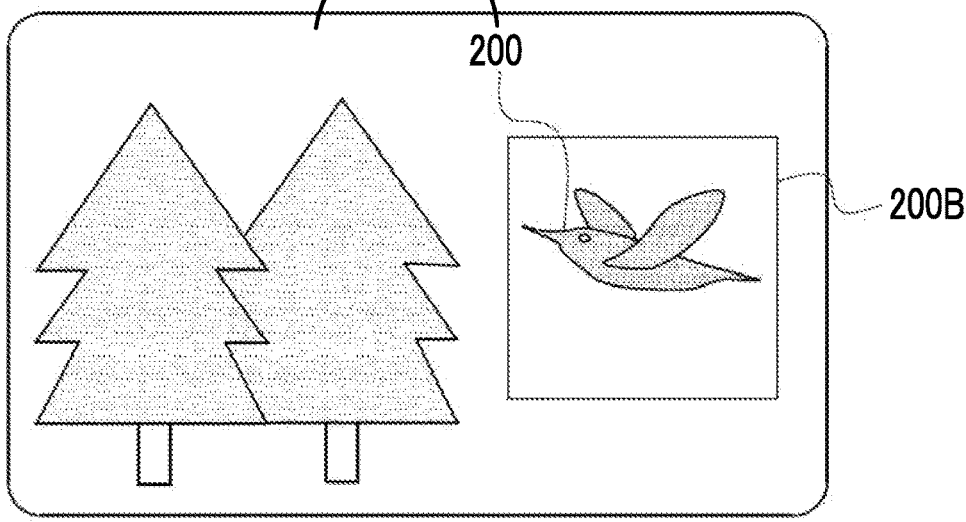
FIG. 13A is a screen diagram illustrating an example of an aspect in which a live view image in a case where first detection processing results in a success (in a case where a specific subject image is detected) is displayed on a display.
Figure 13B:
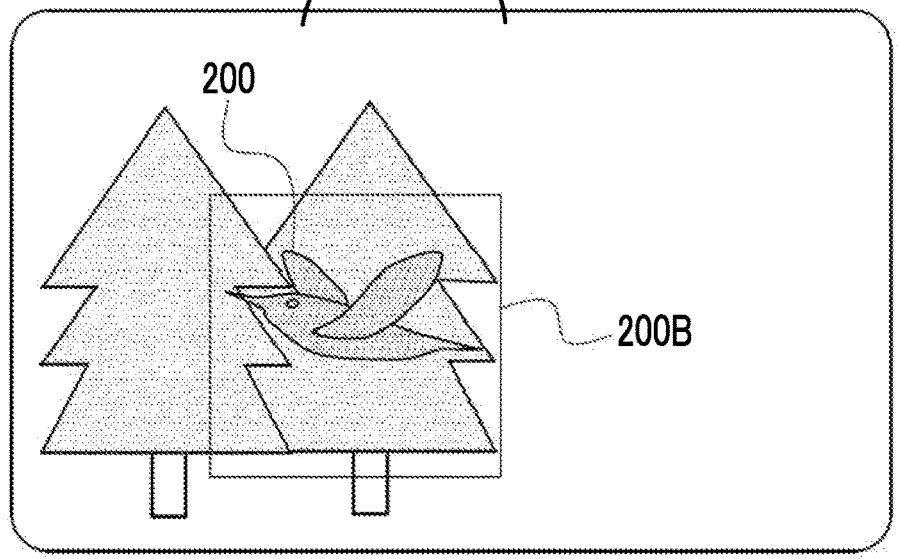
FIG. 13B is a screen diagram illustrating an example of an aspect in which the live view image in a case where the first detection processing results in a failure, and second detection processing results in a success (in a case where the specific subject image is not detected by the first detection processing and the specific subject image is detected by the second detection processing) is displayed on the display.
Figure 13C:
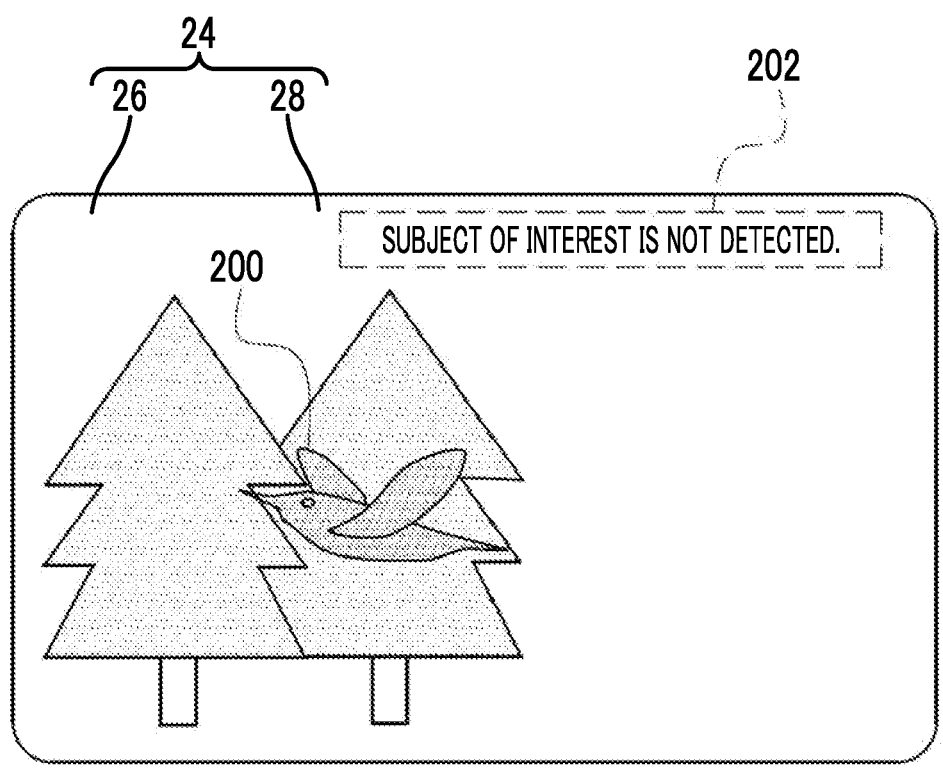
FIG. 13C is a screen diagram illustrating an example of an aspect in which the live view image in a case where the first detection processing and the second detection processing result in a failure (in a case where the specific subject image is not detected by the first detection processing and the second detection processing) is displayed on the display.

FIG. 13A illustrates a screen diagram illustrating an example of a display content of the display 26 in a case where the first detection processing results in a success. FIG. 13B illustrates a screen diagram illustrating an example of the display content of the display 26 in a case where the first detection processing results in a failure, and the second detection processing results in a success. FIG. 13C illustrates a screen diagram illustrating an example of the display content of the display 26 in a case where both of the first detection processing and the second detection processing result in a failure.

As illustrated in FIG. 13A as an example, in a case where the first detection processing results in a success, the tracking frame 200B indicated by the tracking frame information included in the first detection result information is displayed on the display 26 to enclose the specific subject image 200 in a superimposed manner on the live view image as the detection result of the first detection processing under control of the controller 15.

As illustrated in FIG. 13B as an example, in the specific subject image 200, a color of the specific subject image 200 is similar to a color of the background image (in the example illustrated in FIG. 13B, the image showing the forest). Thus, a boundary between the specific subject image 200 and the background image is not detected by the first detection circuit 34D, and the first detection processing using the reduced image data 70B3 results in a failure. However, the second detection processing using the live view image data 70B2 having a higher resolution than the reduced image data 70B3 results in a success. This is because the live view image data 70B2 has a higher resolution than the reduced image data 70B3, and the boundary between the specific subject image 200 and the background image is detected by the second detection circuit 34E. In this case, the tracking frame 200B indicated by the tracking frame information included in the second detection result information is displayed on the display 26 to enclose the specific subject image 200 in a superimposed manner on the live view image as the detection result of the second detection processing under control of the controller 15.

As illustrated in FIG. 13C as an example, in a case where the first detection processing results in a failure, and the second detection processing also results in a failure, a message 202 indicating that the second detection processing results in a failure is displayed on the display 26 in a superimposed manner on the live view image as the detection result of the second detection processing. In the example illustrated in FIG. 13C, a message "subject of interest is not detected." is illustrated as the message 202. However, the technology of the present disclosure is not limited thereto. Any information that is a message and/or an image capable of notifying the user that the specific subject image 200 is not detected may be used. In addition, instead of or in addition to visible notification using the message and/or the image, audible notification using a sound reproducing device (not illustrated), visible notification of lighting or turning a light source (not illustrated) on and off, and/or sensible notification of generating vibration of a vibrator (not illustrated) in a special vibration pattern may be performed under control of the controller 15.

Figure 14:
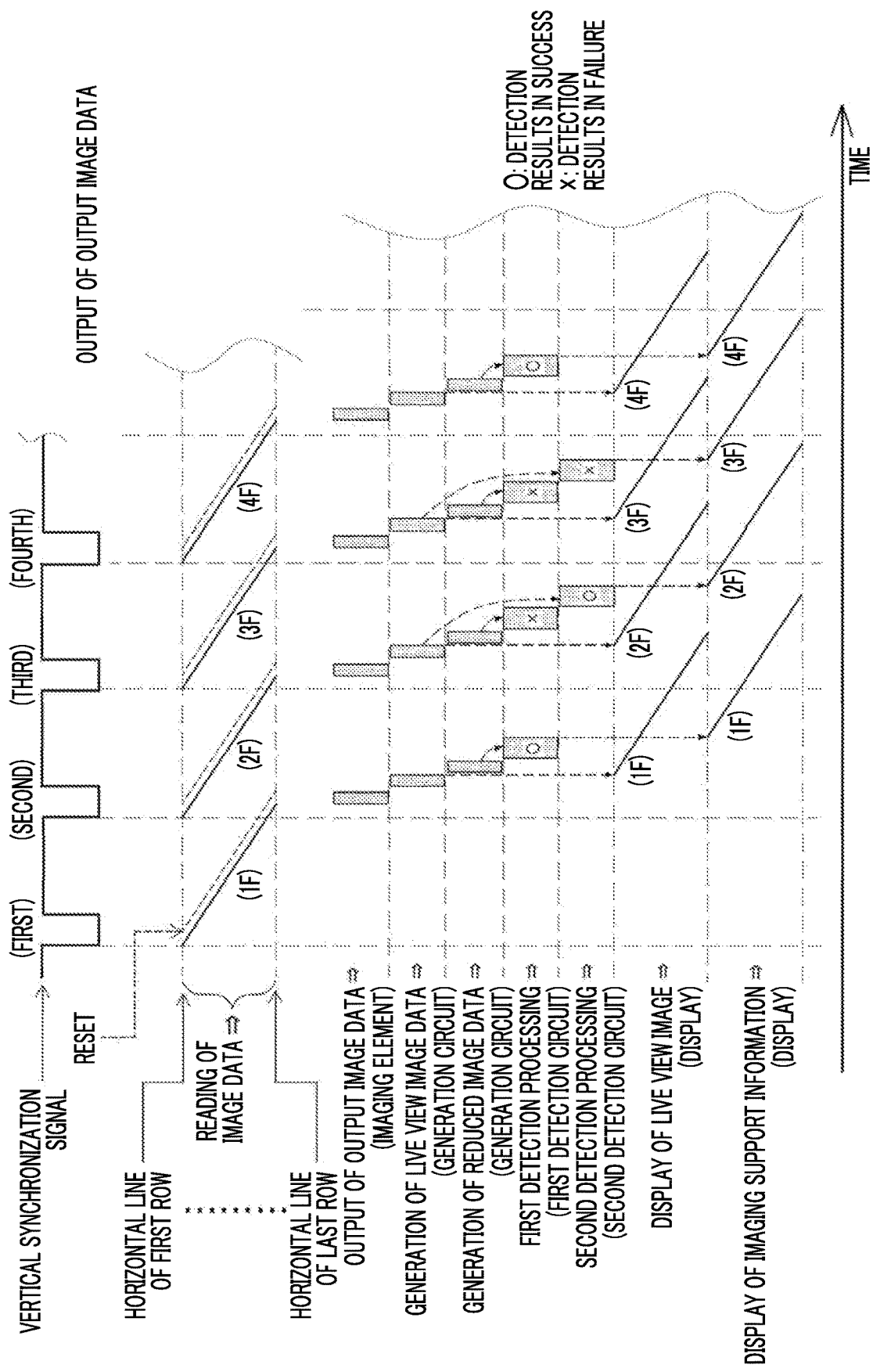
FIG. 14 is a time chart illustrating an example of a processing content in the imaging apparatus according to the first embodiment.

FIG. 14 illustrates an example of a timing of processing performed on the image data of a first frame (1F) to a fourth frame (4F). Here, "F" of 1F to 4F illustrated in FIG. 14 is the abbreviation of "Frame". Hereinafter, for convenience of description, the tracking frame 200B and the message 202 will be referred to as "imaging support information" unless otherwise necessary to distinguish therebetween.

As illustrated in FIG. 14 as an example, each time the vertical synchronization signal is received by the reception I/F 110D1, reading of the analog image data 70A of one frame from the photoelectric conversion element 42 is started. In the example illustrated in FIG. 14, first to fourth vertical synchronization signals are sequentially received by the reception I/F 110D1, and reading of the analog image data 70A of the first frame to the fourth frame is started.

Reading of the analog image data 70A is performed for each line from a horizontal line of a first row to a horizontal line of a last row of the photoelectric conversion element 42 in accordance with the horizontal synchronization signal. In a case where reading is finished for each line, each pixel of a horizontal line in which reading is finished is reset. The analog image data 70A is converted into the digital image data 70B, and the digital image data 70B is stored in the memory 112 in units of frames in a distinguishable manner in order of frames (imaging order) of the read analog image data 70A using the FIFO method.

The control circuit 110C acquires the digital image data 70B from the memory 112 in units of frames and generates the output image data 70B1 by reducing the acquired digital image data 70B. The control circuit 110C outputs the output image data 70B1 to the signal processing circuit 34 through the output I/F 110D2.

In the signal processing circuit 34, the generation circuit 34C generates the live view image data 70B2 by reducing the output image data 70B1. In each frame, in a case where the live view image data 70B2 is generated by the generation circuit 34C, the live view image indicated by the generated live view image data 70B2 is displayed on the display 26.

In addition, the generation circuit 34C generates the reduced image data 70B3 by reducing the live view image data 70B2. In each frame, in a case where the reduced image data 70B3 is generated by the generation circuit 34C, the generated reduced image data 70B3 is used in the first detection processing.

In the example illustrated in FIG. 14, the first detection processing using the reduced image data 70B3 of the first frame and the fourth frame results in a success, and the tracking frame 200B is displayed in a superimposed manner on the live view image as described above (refer to FIG. 13A).

Meanwhile, the first detection processing using the reduced image data 70B3 of the second frame and the third frame results in a failure. In this case, the live view image data 70B2 is used in the second detection processing. Since the live view image data 70B2 is image data having a higher resolution than the reduced image data 70B3, the second detection processing having higher accuracy than the first detection processing is executed in the second detection circuit 34E.

In the example illustrated in FIG. 14, the second detection processing using the live view image data 70B2 of the second frame results in a success, and the tracking frame 200B is displayed in a superimposed manner on the live view image as described above (refer to FIG. 13B). Meanwhile, the second detection processing using the live view image data 70B2 of the third frame results in a failure, and the message 202 is displayed in a superimposed manner on the live view image as described above (refer to FIG. 13C).

Figure 15B:
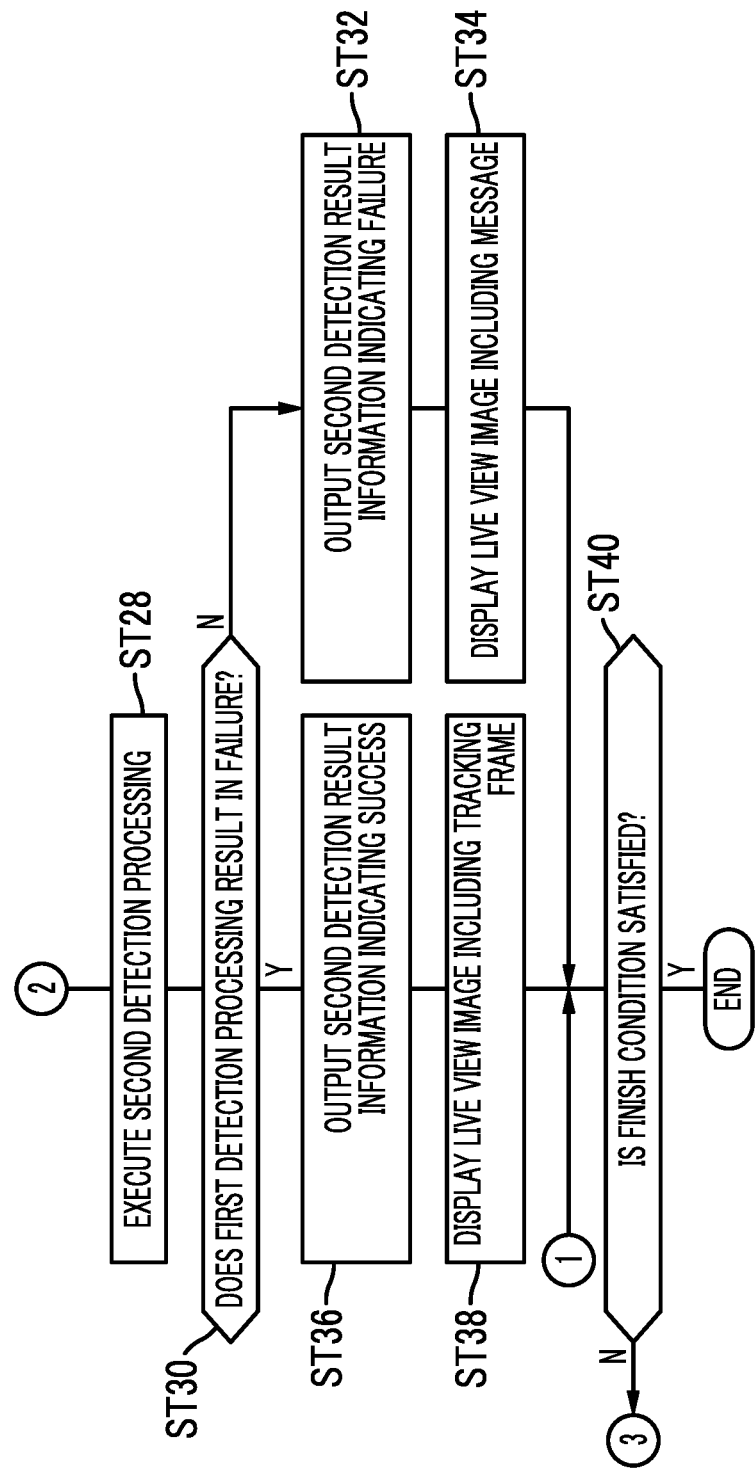
FIG. 15B is a continuation of the flowchart illustrated in FIG. 15A.

Next, an action of the imaging apparatus 10 according to the first embodiment will be described with reference to FIG. 15A and FIG. 15B. FIG. 15A and FIG. 15B illustrate an example of a flow of rear stage circuit processing executed by the rear stage circuit 13.

In the rear stage circuit processing illustrated in FIG. 15A, first, in step ST10, the generation circuit 34C determines whether or not the output image data 70B1 is received by the reception I/F 34A. In step ST10, in a case where the output image data 70B1 is not received by the reception I/F 34A, a negative determination is made, and the rear stage circuit processing transitions to step ST40 illustrated in FIG. 15B. In step ST10, in a case where the output image data 70B1 is received by the reception I/F 34A, a positive determination is made, and the rear stage circuit processing transitions to step ST11.

In step ST11, the generation circuit 34C generates the live view image data 70B2 by reducing the output image data 70B1 received by the reception I/F 34A. Then, the rear stage circuit processing transitions to step ST12.

In step ST12, the generation circuit 34C stores the live view image data 70B2 in the frame memory 34G and outputs the live view image data 70B2 to the controller 15 through the output I/F 34B. Then, the rear stage circuit processing transitions to step ST14.

In step ST14, the controller 15 displays the live view image indicated by the live view image data 70B2 on the display 26. Then, the rear stage circuit processing transitions to step ST16.

In step ST16, the generation circuit 34C generates the reduced image data 70B3 by reducing the live view image data 70B2. Then, the rear stage circuit processing transitions to step ST18.

In step ST18, the first detection circuit 34D executes the first detection processing using the reduced image data 70B3 and the detection reference information. Then, the rear stage circuit processing transitions to step ST20.

In step ST20, the first detection circuit 34D determines whether or not the first detection processing results in a failure. In step ST20, in a case where the first detection processing results in a success, a negative determination is made, and the rear stage circuit processing transitions to step ST22. In step ST20, in a case where the first detection processing results in a failure, a positive determination is made, and the rear stage circuit processing transitions to step ST26.

In step ST22, the first detection circuit 34D outputs, to the controller 15 through the output I/F 34B, the first detection result information including the first detection processing success and failure information indicating that the first detection processing results in a success. Then, the rear stage circuit processing transitions to step ST24.

In step ST24, the controller 15 displays the live view image including the tracking frame 200B indicated by the tracking frame information included in the first detection result information on the display 26. That is, as illustrated in FIG. 13A as an example, the controller 15 displays the tracking frame 200B in a superimposed manner on the live view image. Then, the rear stage circuit processing transitions to step ST40 illustrated in FIG. 15B.

In step ST26, the first detection circuit 34D outputs, to the second detection circuit 34E, the first detection result information including the first detection processing success and failure information indicating that the first detection processing results in a failure. Then, the rear stage circuit processing transitions to step ST28 illustrated in FIG. 15B.

In step ST28 illustrated in FIG. 15B, the second detection circuit 34E executes the second detection processing using the live view image data 70B2 and the detection reference information. Then, the rear stage circuit processing transitions to step ST30.

In step ST30, the second detection circuit 34E determines whether or not the second detection processing results in a success. In step ST30, in a case where the second detection processing results in a failure, a negative determination is made, and the rear stage circuit processing transitions to step ST32. In step ST30, in a case where the second detection processing results in a success, a positive determination is made, and the rear stage circuit processing transitions to step ST36.

In step ST32, the second detection circuit 34E outputs, to the controller 15 through the output I/F 34B, the second detection result information including the second detection processing success and failure information indicating that the second detection processing results in a failure. Then, the rear stage circuit processing transitions to step ST34.

In step ST34, the controller 15 displays the live view image including the message 202 on the display 26. That is, as illustrated in FIG. 13C as an example, the controller 15 displays the message 202 in a superimposed manner on the live view image. Then, the rear stage circuit processing transitions to step ST40.

In step ST36, the second detection circuit 34E outputs, to the controller 15 through the output I/F 34B, the second detection result information including the second detection processing success and failure information indicating that the second detection processing results in a success. Then, the rear stage circuit processing transitions to step ST38.

In step ST38, the controller 15 displays the live view image including the tracking frame 200B indicated by the tracking frame information included in the second detection result information on the display 26. That is, as illustrated in FIG. 13B as an example, the controller 15 displays the tracking frame 200B in a superimposed manner on the live view image. Then, the rear stage circuit processing transitions to step ST40.

In step ST40, the controller 15 determines whether or not a condition (hereinafter, referred to as a "rear stage circuit processing finish condition") under which the rear stage circuit processing is finished is satisfied. A condition that an instruction to finish the rear stage circuit processing is received by the reception device 84 (refer to FIG. 4) is exemplified as an example of the rear stage circuit processing finish condition. In step ST40, in a case where the rear stage circuit processing finish condition is not satisfied, a negative determination is made, and the rear stage circuit processing transitions to step ST10. In step ST40, in a case where the rear stage circuit processing finish condition is satisfied, a positive determination is made, and the rear stage circuit processing is finished.

As described above, in the imaging apparatus 10 according to the first embodiment, processing of reducing the digital image data 70B is performed by the generation circuit 34C. The first detection processing using the reduced image data 70B3 is performed by the first detection circuit 34D. In a case where the specific subject image 200 is not detected by the first detection processing, the second detection processing using the live view image data 70B2 stored in the frame memory 34G is executed by the second detection circuit 34E.

Here, the live view image data 70B2 used in the second detection processing is image data having a higher resolution than the reduced image data 70B3 used in the first detection processing. Thus, the second detection processing has higher accuracy than the first detection processing. In addition, a processing load exerted on the first detection circuit 34D in which the reduced image data 70B3 is used is less than a processing load on the second detection circuit 34E in which the live view image data 70B2 is used. The second detection processing in the second detection circuit 34E is not performed in a case where the first detection processing does not result in a failure. Thus, according to the present configuration, reduction of the processing load and high-accuracy detection can be implemented, compared to a case of performing the detection processing using only the reduced image data 70B3 at all times.

In addition, in the imaging apparatus 10 according to the first embodiment, the specific subject image 200 for which the instruction is issued in the live view image indicated by the live view image data 70B2 is the image showing the bird (moving object). Thus, according to the present configuration, even in a case where the specific subject image 200 is the image showing the bird (moving object), the bird (moving object) can be specified from the detection result of the detection processing.

In addition, in the imaging apparatus 10 according to the present embodiment, the second detection processing using the live view image data 70B2 is executed by the second detection circuit 34E. Thus, according to the present configuration, the processing load can be reduced, compared to a case where image data that is different from the live view image data 70B2 and is used in only the second detection processing is generated together with the live view image data 70B2.

Furthermore, in the imaging apparatus 10 according to the first embodiment, the live view image including the tracking frame 200B indicated by the tracking frame information included in the first detection result information is displayed on the display 26. In addition, the live view image including the tracking frame 200B indicated by the tracking frame information included in the second detection result information is displayed on the display 26. Furthermore, the live view image including the message 202 is displayed on the display 26. Thus, according to the present configuration, the user can perceive the detection result of the detection processing.

In the first embodiment, an example of a form of detecting the specific subject image 200 using the second detection circuit 34E in a case where the specific subject image 200 is not detected by the first detection circuit 34D (in a case where the first detection processing results in a failure) is illustratively described. However, the technology of the present disclosure is not limited thereto. For example, the second detection circuit 34E may detect an image showing a subject different from the specific subject image 200. An image that shows a smaller subject than the specific subject image 200 (for example, an image showing a specific part included in the specific subject image 200), an image showing a face of a person, and/or an image showing a pupil of the person, or the like is exemplified as the image showing the subject different from the specific subject image 200.

In addition, in the first embodiment, while the laminated imaging element is illustrated as the imaging element 38, the technology of the present disclosure is not limited thereto. The technology of the present disclosure is also established in a case where a non-laminated imaging element is used instead of the laminated imaging element.

Second Embodiment

In the first embodiment, an example of a form of detecting the image showing the bird as the specific subject image 200 is illustratively described. In a second embodiment, a case where the face and the pupil of the person are detection targets will be described. In the second embodiment, the same constituents as the first embodiment will be designated by the same reference signs and will not be described.

Figure 16:
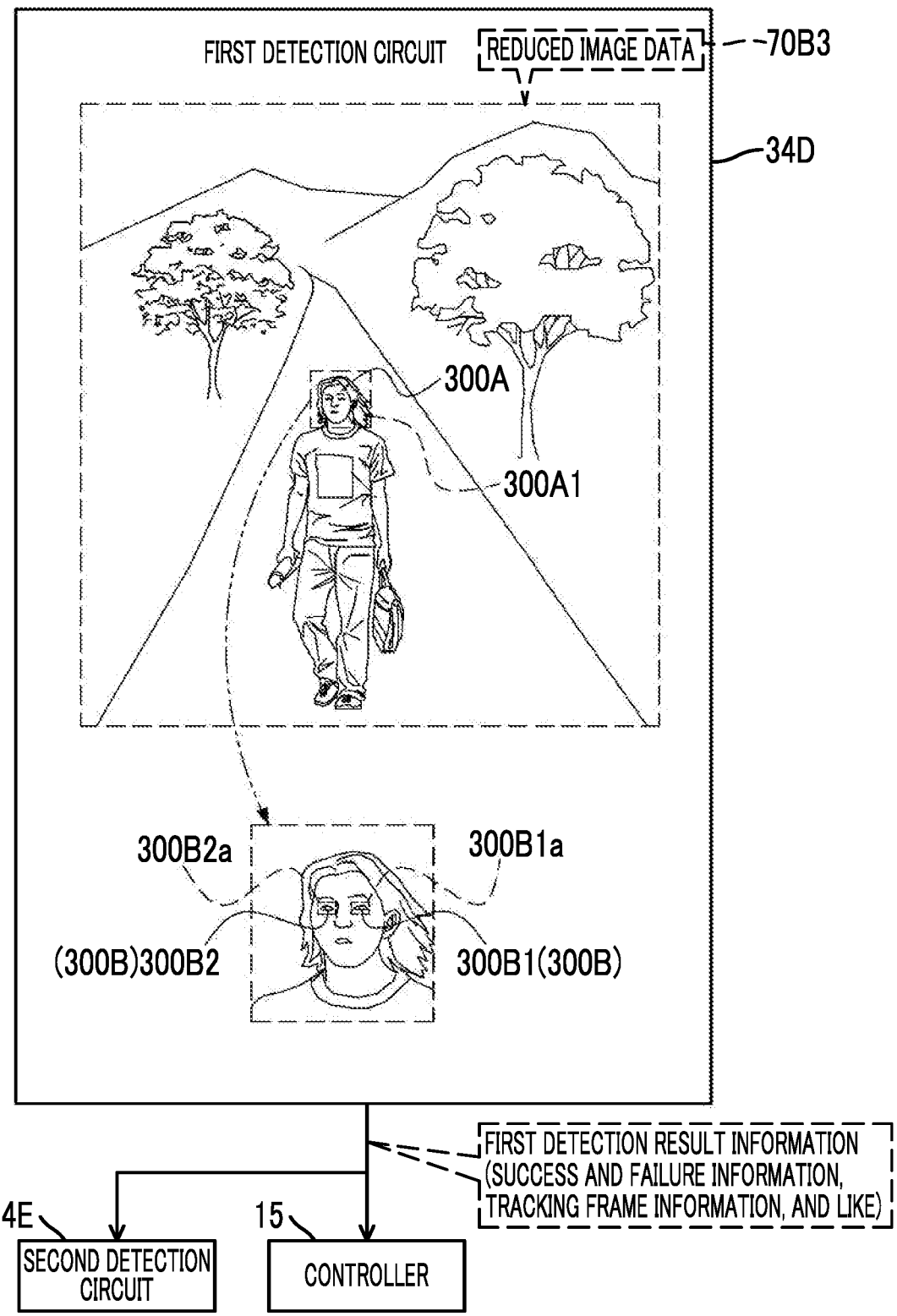
FIG. 16 is a conceptual diagram for describing an example of a processing content of a first detection circuit included in the imaging apparatus according to the second embodiment.

As illustrated in FIG. 16 as an example, the first detection processing according to the second embodiment is processing of detecting a face image 300A showing the face of the person and a pupil image 300B showing the pupil of the person as an image corresponding to the specific subject image 200 described in the first embodiment. A technology for detecting the face image 300A and the pupil image 300B is a well-known technology and thus, will not be described in detail.

The first detection circuit 34D detects the face image 300A from the reduced image indicated by the reduced image data 70B3 and detects the pupil image 300B from the detected face image 300A. In the example illustrated in FIG. 16, a left pupil and a right pupil of the person are illustrated as a smaller subject than the face of the person. In addition, in the example illustrated in FIG. 16, a left pupil image 300B1 showing the left pupil of the person and a right pupil image 300B2 showing the right pupil of the person are illustrated as the pupil image 300B.

In the second embodiment, the face of the person is an example of the "specific subject" according to the embodiments of the technology of the present disclosure. The face image 300A is an example of a "specific subject image" according to the embodiments of the technology of the present disclosure. The left pupil image 300B1 and the right pupil image 300B2 are an example of a "small subject image" according to the embodiments of the present disclosure.

The first detection circuit 34D outputs the first detection result information to the controller 15 and the second detection circuit 34E in the same manner as in the first embodiment. The first detection result information is broadly divided into first face detection result information indicating a detection result of the first detection circuit 34D for the face image 300A and first pupil detection result information indicating a detection result of the first detection circuit 34D for the pupil image 300B. Hereinafter, the first face detection result information and the first pupil detection result information will be referred to as "first detection result information" unless otherwise necessary to distinguish therebetween.

The first detection result information includes the first detection processing success and failure information and the tracking frame information. The first detection processing success and failure information included in the first detection result information according to the second embodiment is information indicating whether or not detection of the face image 300A in the first detection circuit 34D results in a success, and is information indicating whether or not detection of the pupil image 300B in the first detection circuit 34D results in a success.

The tracking frame information included in the first detection result information according to the second embodiment is information indicating frames that track the face image 300A and the pupil image 300B. In the example illustrated in FIG. 16, a rectangular frame 300A1 that defines a region of the face image 300A is illustrated as the frame tracking the face image 300A. In addition, in the example illustrated in FIG. 16, a rectangular frame 300B1a that defines a region of the left pupil image 300B1, and a rectangular frame 300B2a that defines a region of the right pupil image 300B2 are illustrated as the frame tracking the pupil image 300B. In addition, the tracking frame information included in the first detection result information according to the second embodiment includes the position specifying information (for example, coordinates) for specifying positions of the rectangular frames 300A1, 300B1a, and 300B2a in the reduced image.

As illustrated in FIG. 17 as an example, the second detection circuit 34E comprises a face image detection circuit 34E2 and a pupil image detection circuit 34E3. In a case where the first detection result information included in the first detection processing success and failure information indicating that the first detection processing results in a failure is output to the second detection circuit 34E from the first detection circuit 34D and is received by the second detection circuit 34E, the face image detection circuit 34E2 acquires the live view image data 70B2 from the frame memory 34G. The face image detection circuit 34E2 detects the face image 300A from the live view image indicated by the live view image data 70B2 acquired from the frame memory 34G. In addition, the pupil image detection circuit 34E3 detects the pupil image 300B from the face image 300A detected by the face image detection circuit 34E2.

The second detection circuit 34E outputs the second detection result information to the controller 15 in the same manner as in the first embodiment. The second detection result information is broadly divided into second face detection result information indicating a detection result of the face image detection circuit 34E2 for the face image 300A and second pupil detection result information indicating a detection result of the pupil image detection circuit 34E3 for the pupil image 300B. Hereinafter, the second face detection result information and the second pupil detection result information will be referred to as "second detection result information" unless otherwise necessary to distinguish therebetween.

The second detection result information includes the second detection processing success and failure information and the tracking frame information. The second detection processing success and failure information included in the second detection result information according to the second embodiment is information indicating whether or not detection of the face image 300A in the face image detection circuit 34E2 results in a success, and is information indicating whether or not detection of the pupil image 300B in the pupil image detection circuit 34E3 results in a success. The tracking frame information included in the second detection result information according to the second embodiment is information indicating frames that track the face image 300A and the pupil image 300B in the same manner as the tracking frame information included in the first detection result information according to the second embodiment. In addition, the tracking frame information included in the first detection result information according to the second embodiment includes the position specifying information (for example, coordinates) for specifying the positions of the rectangular frames 300A1, 300B1a, and 300B2a in the live view image.

Figure 18A:
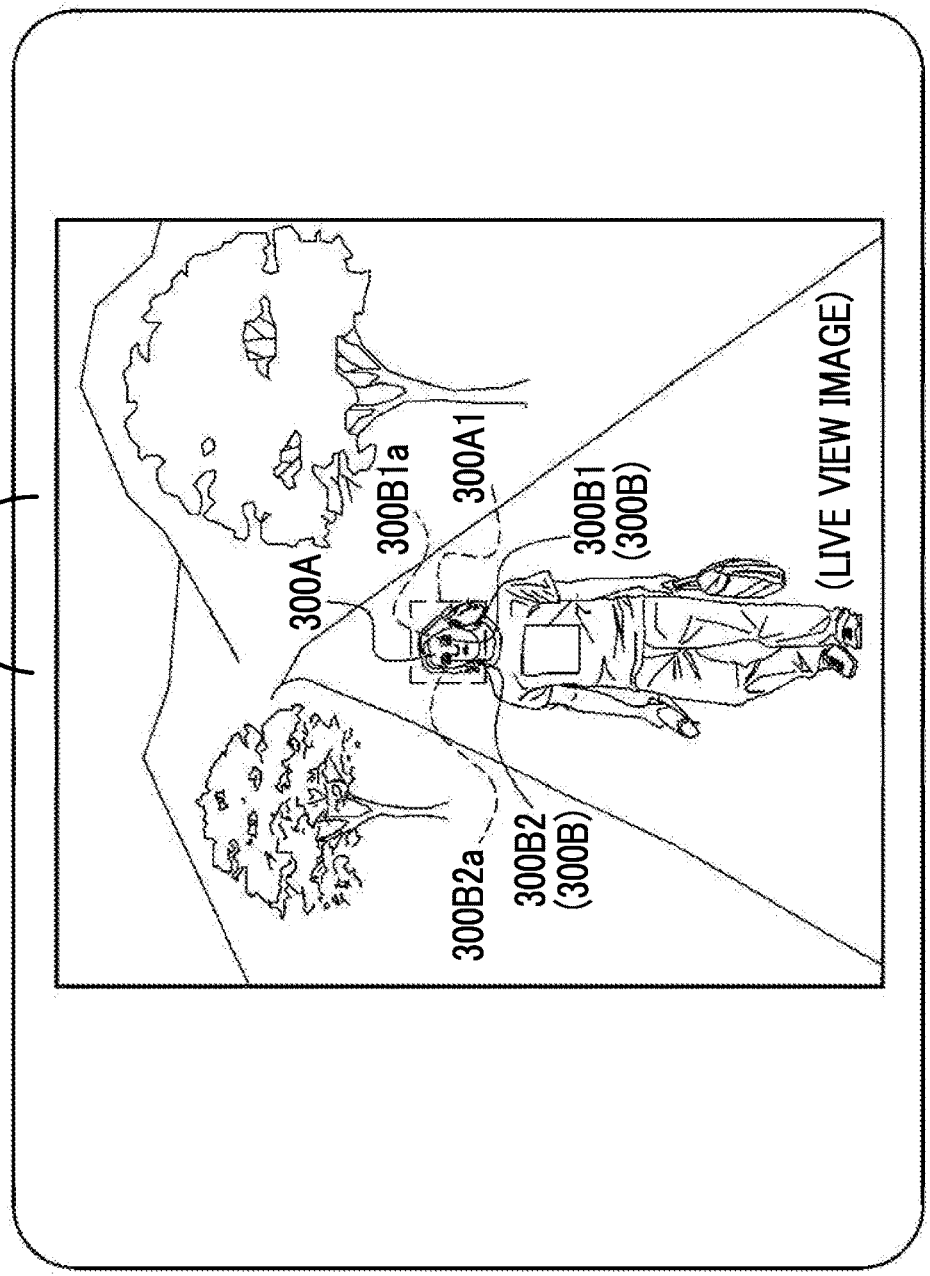
FIG. 18A is a screen diagram illustrating an example of a display aspect of the display in a case where a face image is detected from a reduced image indicated by reduced image data by the first detection circuit included in the imaging apparatus according to the second embodiment, and a pupil image is detected from the reduced image.

FIG. 18A illustrates an example of a display aspect of the display 26 in a case where the face image 300A is detected from the reduced image indicated by the reduced image data 70B3 by the first detection circuit 34D, and the pupil image 300B is detected from the reduced image. As illustrated in FIG. 18A as an example, on the display 26, the live view image is displayed, and the rectangular frame 300A1 is displayed to enclose the face image 300A in a superimposed manner on the live view image. In addition, on the display 26, the rectangular frame 300B1a is displayed to enclose the left pupil image 300B1 in a superimposed manner on the live view image, and the rectangular frame 300B2a is displayed to enclose the right pupil image 300B2 in a superimposed manner on the live view image.

Figure 18B:
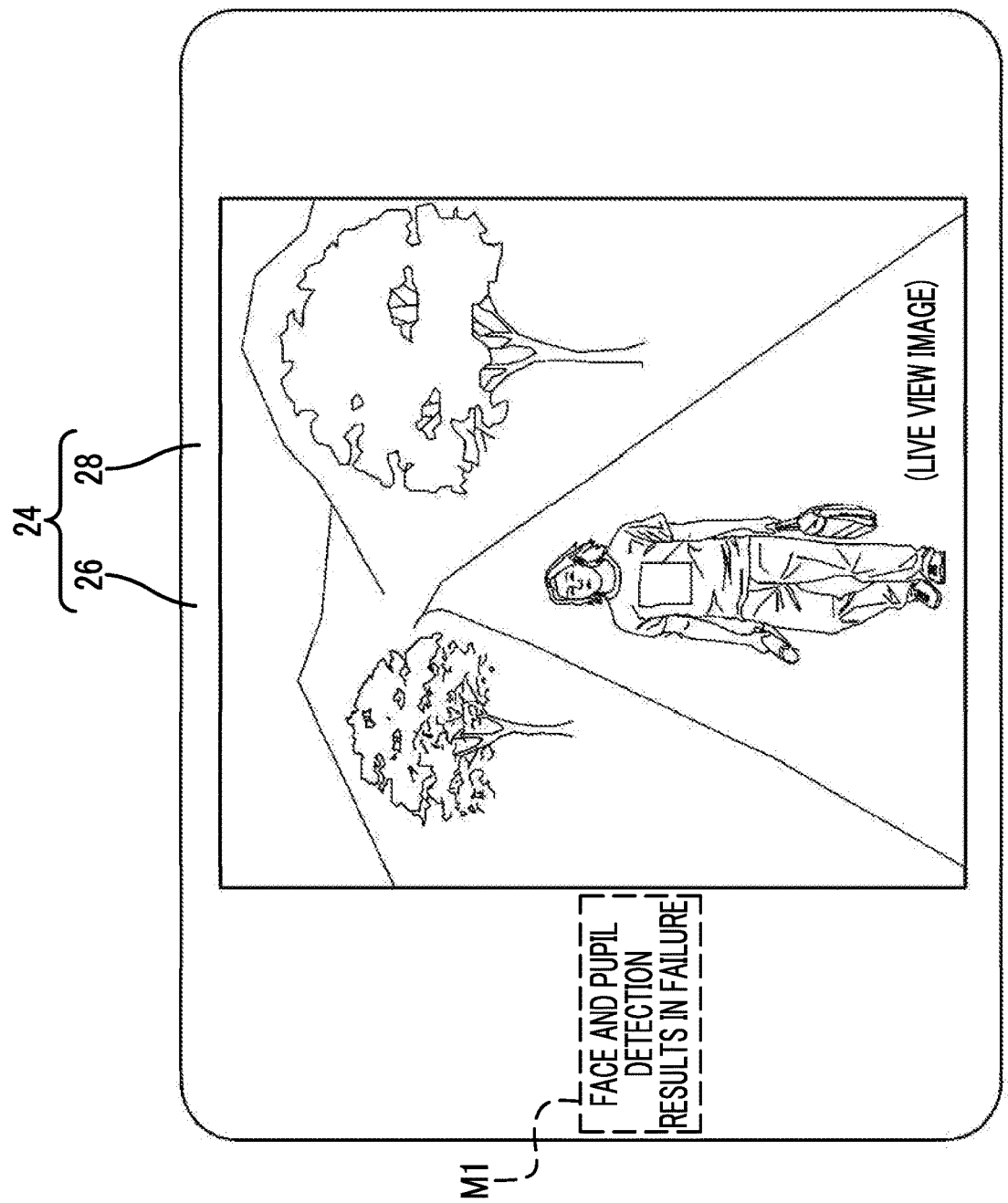
FIG. 18B is a screen diagram illustrating an example of a display aspect of the display in a case where both of the first detection processing by the first detection circuit included in the imaging apparatus according to the second embodiment and the second detection processing by the second detection circuit result in a failure.

FIG. 18B illustrates an example of the display aspect of the display 26 in a case where both of the first detection processing performed by the first detection circuit 34D and the second detection processing performed by the second detection circuit 34E result in a failure. In the second embodiment, the second detection processing refers to processing of detecting the face image 300A using the face image detection circuit 34E2 and processing of detecting the pupil image 300B using the pupil image detection circuit 34E3. As illustrated in FIG. 18B as an example, on the display 26, the live view image is displayed, and a message M1 indicating that both of detection of the face image 300A and detection of the pupil image 300B result in a failure is displayed.

In the example illustrated in FIG. 18B, while a message "face and pupil detection results in failure" is illustrated as the message M1, the message is merely an example. Any information that is a message and/or an image capable of notifying the user that both of detection of the face image 300A and detection of the pupil image 300B result in a failure may be used. In addition, instead of or in addition to visible notification using the message and/or the image, audible notification using a sound reproducing device (not illustrated), visible notification of lighting or turning a light source (not illustrated) on and off, and/or sensible notification of generating vibration of a vibrator (not illustrated) in a special vibration pattern may be performed under control of the controller 15.

FIG. 18C illustrates an example of the display aspect of the display 26 in a case where detection of the face image 300A results in a success by the first detection circuit 34D or the second detection circuit 34E, and detection of the pupil image 300B results in a failure. As illustrated in FIG. 18C as an example, on the display 26, the live view image is displayed, and the rectangular frame 300A1 is displayed to enclose the face image 300A in a superimposed manner on the live view image. In addition, on the display 26, a message M2 indicating that detection of the pupil image 300B results in a failure is displayed.

In the example illustrated in FIG. 18C, while a message "pupil detection results in failure" is illustrated as the message M2, the message is merely an example. Any information that is a message and/or an image capable of notifying the user that detection of the pupil image 300B results in a failure may be used. In addition, instead of or in addition to visible notification using the message and/or the image, audible notification using a sound reproducing device (not illustrated), visible notification of lighting or turning a light source (not illustrated) on and off, and/or sensible notification of generating vibration of a vibrator (not illustrated) in a special vibration pattern may be performed under control of the controller 15.

Figure 19:
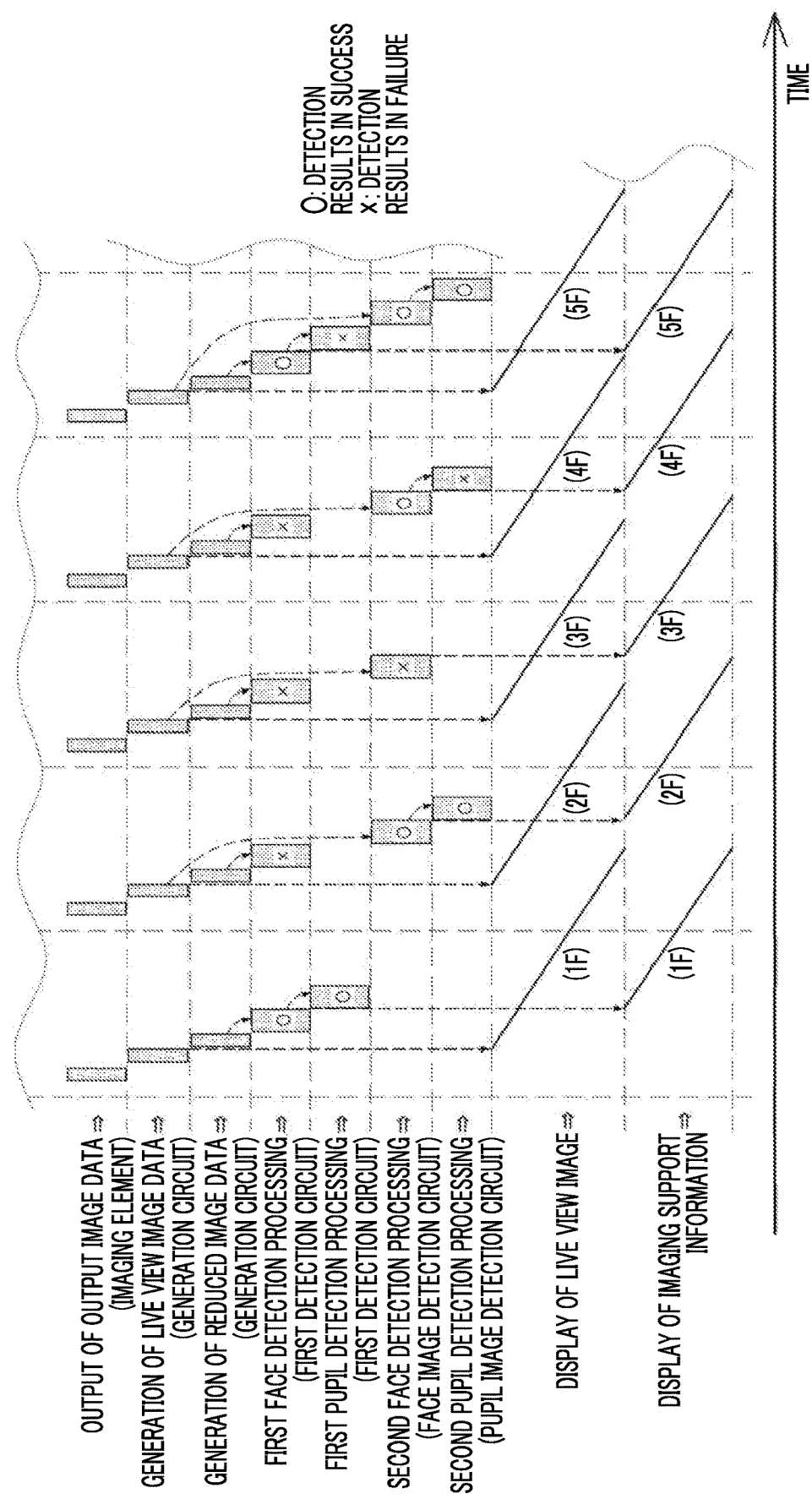
FIG. 19 is a time chart illustrating an example of a processing content in the imaging apparatus according to the second embodiment.

FIG. 19 illustrates an example of a timing of processing performed on the image data of the first frame (1F) to a fifth frame (5F). Here, "F" of 1F to 5F illustrated in FIG. 19 is the abbreviation of "Frame". In the example illustrated in FIG. 19, duplicate processing with respect to the example illustrated in FIG. 14 will not be described. In addition, hereinafter, for convenience of description, processing of detecting the face image 300A from the reduced image using the first detection circuit 34D will be referred to as "first face detection processing", and processing of detecting the pupil image 300B from the reduced image using the first detection circuit 34D will be referred to as "first pupil detection processing". In addition, hereinafter, for convenience of description, processing of detecting the face image 300A from the live view image using the face image detection circuit 34E2 will be referred to as "second face detection processing", and processing of detecting the pupil image 300B from the live view image using the pupil image detection circuit 34E3 will be referred to as "second pupil detection processing".

In the example illustrated in FIG. 19, the first face detection processing using the reduced image data 70B3 of the first frame results in a success. In this case, in the first detection circuit 34D, the first pupil detection processing using a part of the reduced image data 70B3 indicating a region corresponding to the face image 300A detected by the first face detection processing in the reduced image data 70B3 is executed. In the example illustrated in FIG. 19, the first pupil detection processing using the reduced image data 70B3 of the first frame results in a success. In this case, as illustrated in FIG. 18A as an example, the rectangular frames 300A1, 300B1a, and 300B2a are displayed in a superimposed manner on the live view image.

The first face detection processing using the reduced image data 70B3 of the second frame results in a failure. In this case, the live view image data 70B2 is used in the second face detection processing performed by the face image detection circuit 34E2. Since the live view image data 70B2 is image data having a higher resolution than the reduced image data 70B3, the second face detection processing having higher accuracy than the first face detection processing is executed in the face image detection circuit 34E2.

In the example illustrated in FIG. 19, the second face detection processing using the live view image data 70B2 of the second frame results in a success. In this case, in the pupil image detection circuit 34E3, the second pupil detection processing using a part of the live view image data 70B2 indicating a region corresponding to the face image 300A detected by the second face detection processing in the live view image data 70B2 of the second frame is executed. Since the live view image data 70B2 is image data having a higher resolution than the reduced image data 70B3, the second pupil detection processing having higher accuracy than the first pupil detection processing is executed in the pupil image detection circuit 34E3. In the example illustrated in FIG. 19, the second pupil detection processing using the live view image data 70B2 of the second frame results in a success. In such a manner, in a case where the second face detection processing and the second pupil detection processing result in a success, as illustrated in FIG. 18A as an example, the rectangular frames 300A1, 300B1a and 300B2a are displayed in a superimposed manner on the live view image.

In the example illustrated in FIG. 19, the first face detection processing using the reduced image data 70B3 of the third frame results in a failure. In this case, the live view image data 70B2 is used in the second face detection processing performed by the face image detection circuit 34E2. In the example illustrated in FIG. 19, the second face detection processing using the live view image data 70B2 of the third frame also results in a failure. In such a manner, in a case where the first face detection processing and the second face detection processing result in a failure, as illustrated in FIG. 18B as an example, the message M1 is displayed on the display 26 together with the live view image.

In the example illustrated in FIG. 19, the first face detection processing using the reduced image data 70B3 of the fourth frame results in a failure. In this case, the live view image data 70B2 is used in the second face detection processing performed by the face image detection circuit 34E2. In the example illustrated in FIG. 19, the second face detection processing using the live view image data 70B2 of the fourth frame results in a success. In this case, in the pupil image detection circuit 34E3, the second pupil detection processing using a part of the live view image data 70B2 indicating a region corresponding to the face image 300A detected by the second face detection processing in the live view image data 70B2 of the fourth frame is executed. In the example illustrated in FIG. 19, the second pupil detection processing using the live view image data 70B2 of the fourth frame results in a failure. In this case, as illustrated in FIG. 18C as an example, the message M2 is displayed on the display 26 together with the live view image.

In the example illustrated in FIG. 19, while the first face detection processing using the reduced image data 70B3 of the fifth frame results in a success, the first pupil detection processing using the reduced image data 70B3 of the fifth frame results in a failure. In this case, the live view image data 70B2 is used in the second face detection processing performed by the face image detection circuit 34E2. In the example illustrated in FIG. 19, the second face detection processing using the live view image data 70B2 of the fifth frame results in a success. In this case, a part of the live view image data 70B2 indicating a region corresponding to the face image 300A detected by the second face detection processing in the live view image data 70B2 of the fifth frame is used in the second pupil detection processing. In the example illustrated in FIG. 19, the second pupil detection processing using the live view image data 70B2 of the fifth frame results in a failure. In this case, as illustrated in FIG. 18C as an example, the message M2 is displayed on the display 26 together with the live view image.

Next, an action of the imaging apparatus 10 according to the second embodiment will be described with reference to FIG. 20A to FIG. 20D. FIG. 20A to FIG. 20D illustrate an example of a flow of rear stage circuit processing executed by the rear stage circuit 13.

Figure 20D:
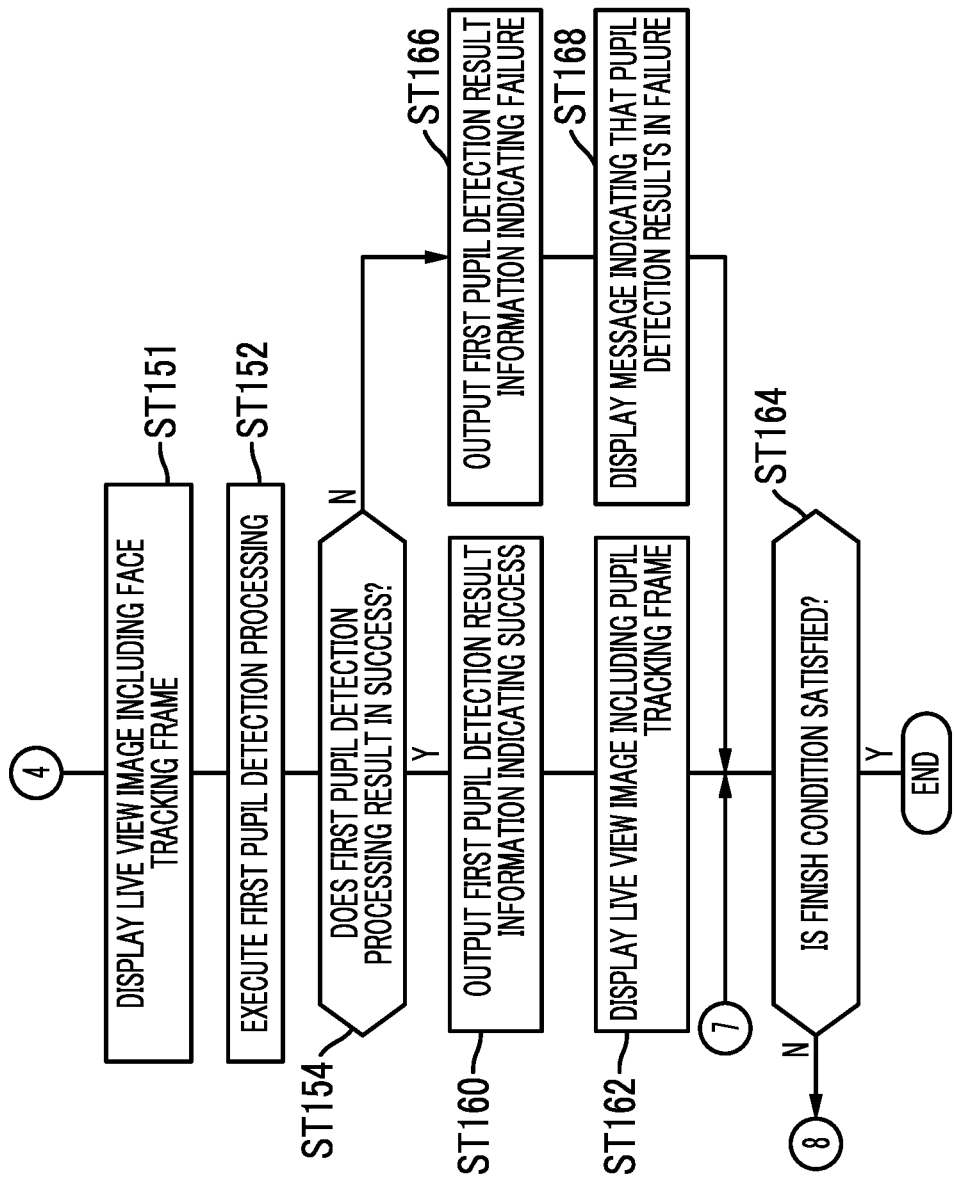
FIG. 20D is a continuation of the flowcharts illustrated in FIG. 20A to FIG. 20C.

In the rear stage circuit processing illustrated in FIG. 20A, first, in step ST100, the generation circuit 34C determines whether or not the output image data 70B1 is received by the reception I/F 34A. In step ST100, in a case where the output image data 70B1 is not received by the reception I/F 34A, a negative determination is made, and the rear stage circuit processing transitions to step ST164 illustrated in FIG. 20D. In step ST100, in a case where the output image data 70B1 is received by the reception I/F 34A, a positive determination is made, and the rear stage circuit processing transitions to step ST101.

In step ST101, the generation circuit 34C generates the live view image data 70B2 by reducing the output image data 70B1 received by the reception I/F 34A. Then, the rear stage circuit processing transitions to step ST102.

In step ST102, the generation circuit 34C stores the live view image data 70B2 in the frame memory 34G and outputs the live view image data 70B2 to the controller 15 through the output I/F 34B. Then, the rear stage circuit processing transitions to step ST104.

In step ST104, the controller 15 displays the live view image indicated by the live view image data 70B2 on the display 26. Then, the rear stage circuit processing transitions to step ST106.

In step ST106, the generation circuit 34C generates the reduced image data 70B3 by reducing the live view image data 70B2. Then, the rear stage circuit processing transitions to step ST108.

In step ST108, the first detection circuit 34D executes the first face detection processing using the reduced image data 70B3. Then, the rear stage circuit processing transitions to step ST110.

In step ST110, the first detection circuit 34D determines whether or not the first face detection processing results in a success. In step ST110, in a case where the first face detection processing results in a success, a positive determination is made, and the rear stage circuit processing transitions to step ST112. In step ST110, in a case where the first face detection processing results in a failure, a negative determination is made, and the rear stage circuit processing transitions to step ST116.

In step ST112, the first detection circuit 34D outputs, to the controller 15 through the output I/F 34B, the first face detection result information including the first detection processing success and failure information indicating that the first face detection processing results in a success. Then, the rear stage circuit processing transitions to step ST151 illustrated in FIG. 20D.

In step ST116, the first detection circuit 34D outputs, to the second detection circuit 34E and the controller 15, the first face detection result information including the first detection processing success and failure information indicating that the first face detection processing results in a failure. Then, the rear stage circuit processing transitions to step ST118 illustrated in FIG. 20B.

In step ST118 illustrated in FIG. 20B, the face image detection circuit 34E2 executes the second face detection processing using the live view image data 70B2 generated in step ST101. Then, the rear stage circuit processing transitions to step ST120.

In step ST120, the face image detection circuit 34E2 determines whether or not the second face detection processing results in a success. In step ST120, in a case where the second face detection processing results in a success, a positive determination is made, and the rear stage circuit processing transitions to step ST126. In step ST120, in a case where the second face detection processing results in a failure, a negative determination is made, and the rear stage circuit processing transitions to step ST122.

In step ST122, the face image detection circuit 34E2 outputs, to the controller 15 through the output I/F 34B, the second face detection result information including the second detection processing success and failure information indicating that the second face detection processing results in a failure. Then, the rear stage circuit processing transitions to step ST124.

In step ST124, as illustrated in FIG. 18B as an example, the controller 15 displays the message M1 on the display 26 as a message indicating that detection of the face image 300A and detection of the pupil image 300B result in a failure. Then, the rear stage circuit processing transitions to step ST164 illustrated in FIG. 20D.

In step ST126, the face image detection circuit 34E2 outputs, to the controller 15 through the output I/F 34B, the second face detection result information including the second detection processing success and failure information indicating that the second face detection processing results in a success. Then, the rear stage circuit processing transitions to step ST128.

In step ST128, the controller 15 displays the live view image including a face tracking frame on the display 26. Here, for example, the face tracking frame refers to the rectangular frame 300A1 indicated by the tracking frame information included in the first detection result information. That is, in step ST128, the controller 15 displays the rectangular frame 300A1 to enclose the face image 300A in a superimposed manner on the live view image. Then, the rear stage circuit processing transitions to step ST130 illustrated in FIG. 20C.

In step ST130 illustrated in FIG. 20C, the pupil image detection circuit 34E3 executes the second pupil detection processing using a part of the live view image data 70B2 indicating the region corresponding to the face image 300A detected by the second face detection processing in the live view image data 70B2 generated in step ST101. Then, the rear stage circuit processing transitions to step ST132.

In step ST132 the pupil image detection circuit 34E3 determines whether or not the second pupil detection processing results in a success. In step ST132, in a case where the second pupil detection processing results in a success, a positive determination is made, and the rear stage circuit processing transitions to step ST134. In step ST132, in a case where the second pupil detection processing results in a failure, a negative determination is made, and the rear stage circuit processing transitions to step ST138.

In step ST134, the pupil image detection circuit 34E3 outputs, to the controller 15 through the output I/F 34B, the second pupil detection result information including the second detection processing success and failure information indicating that the second pupil detection processing results in a success. Then, the rear stage circuit processing transitions to step ST136.

In step ST136, the controller 15 displays the live view image including a pupil tracking frame on the display 26. Here, for example, the pupil tracking frame refers to the rectangular frames 300B1*a* and 300B2*a* indicated by the tracking frame information included in the second detection result information. That is, in step ST136, the controller 15 displays the rectangular frame 300B1*a* to enclose the left pupil image 300B1 in a superimposed manner on the live view image and displays the rectangular frame 300B2*a* to enclose the right pupil image 300B2 in a superimposed manner on the live view image. Then, the rear stage circuit processing transitions to step ST164 illustrated in FIG. 20D.

In step ST138, the pupil image detection circuit 34E3 outputs, to the controller 15 through the output I/F 34B, the second pupil detection result information including the second detection processing success and failure information indicating that the second pupil detection processing results in a failure. Then, the rear stage circuit processing transitions to step ST140.

In step ST140, as illustrated in FIG. 18C as an example, the controller 15 displays the message M2 on the display 26 as a message indicating that detection of the pupil image 300B results in a failure. Then, the rear stage circuit processing transitions to step ST164 illustrated in FIG. 20D.

In step ST151 illustrated in FIG. 20D, the controller 15 displays the live view image including the face tracking frame on the display 26. That is, in step ST151, the controller 15 displays the rectangular frame 300A1 to enclose the face image 300A in a superimposed manner on the live view image. Then, the rear stage circuit processing transitions to step ST152.

In step ST152, the first detection circuit 34D executes the first pupil detection processing using a part of the reduced image data 70B3 indicating the region corresponding to the face image 300A detected by the first face detection processing in the reduced image data 70B3 generated in step ST101. Then, the rear stage circuit processing transitions to step ST154.

In step ST154, the first detection circuit 34D determines whether or not the first pupil detection processing results in a success. In step ST154, in a case where the first pupil detection processing results in a success, a positive determination is made, and the rear stage circuit processing transitions to step ST160. In step ST154, in a case where the first pupil detection processing results in a failure, a negative determination is made, and the rear stage circuit processing transitions to step ST166.

In step ST160, the first detection circuit 34D outputs, to the controller 15 through the output I/F 34B, the first pupil detection result information including the first detection processing success and failure information indicating that the first pupil detection processing results in a success. Then, the rear stage circuit processing transitions to step ST162.

In step ST162, the controller 15 displays the live view image including the pupil tracking frame on the display 26. That is, in step ST162, the controller 15 displays the rectangular frame 300B1a to enclose the left pupil image 300B1 in a superimposed manner on the live view image and displays the rectangular frame 300B2a to enclose the right pupil image 300B2 in a superimposed manner on the live view image. Then, the rear stage circuit processing transitions to step ST164.

In step ST166, the first detection circuit 34D outputs, to the controller 15 through the output I/F 34B, the first pupil detection result information including the first detection processing success and failure information indicating that the first pupil detection processing results in a failure. Then, the rear stage circuit processing transitions to step ST168.

In step ST168, as illustrated in FIG. 18C as an example, the controller 15 displays the message M2 on the display 26 as a message indicating that detection of the pupil image 300B results in a failure. Then, the rear stage circuit processing transitions to step ST164.

In step ST164, the controller 15 determines whether or not the rear stage circuit processing finish condition described in the first embodiment is satisfied. In step ST164, in a case where the rear stage circuit processing finish condition is not satisfied, a negative determination is made, and the rear stage circuit processing transitions to step ST100. In step ST164, in a case where the rear stage circuit processing finish condition is satisfied, a positive determination is made, and the rear stage circuit processing is finished.

As described above, in the imaging apparatus 10 according to the second embodiment, the face image detection circuit 34E2 detects the face image 300A from the live view image indicated by the live view image data 70B2. In addition, the pupil image detection circuit 34E3 detects the pupil image 300B that is an image smaller than the face image, from the live view image indicated by the live view image data 70B2.

Here, the live view image data 70B2 used in the second face detection processing and the second pupil detection processing is image data having a higher resolution than the reduced image data 70B3 used in the first face detection processing and the first pupil detection processing. Thus, the second face detection processing and the second pupil detection processing have higher accuracy than the first face detection processing and the first pupil detection processing. In addition, the processing load exerted on the first detection circuit 34D in which the reduced image data 70B3 is used is less than processing loads on the face image detection circuit 34E2 and the pupil image detection circuit 34E3 in which the live view image data 70B2 is used. The second face detection processing and the second pupil detection processing are not performed in a case where the first face detection processing and/or the first pupil detection processing does not result in a failure. Thus, according to the present configuration, a possibility of detecting the face image 300A and the pupil image 300B can be increased, compared to a case where the face image 300A and the pupil image 300B are detected by only the first detection processing.

In the second embodiment, the face of the person is illustrated as the "specific subject" according to the embodiments of the technology of the present disclosure, and the pupil of the person is illustrated as a "smaller subject" according to the embodiments of the technology of the present disclosure. However, the technology of the present disclosure is not limited thereto. For example, instead of the pupil of the person or together with the pupil of the person, a part such as a nose and/or a mouth or the like of the person may be applied as the "smaller subject" according to the embodiments of the technology of the present disclosure.

In addition, the "specific subject" and the "smaller subject" according to the embodiments of the technology of the present disclosure do not need to be parts of the person. For example, the second detection circuit 34E may detect a first image showing a subject other than the face of the person and a second image showing a smaller subject than the subject shown by the first image using the live view image data 70B2. For example, an image showing a bird is exemplified as the first image. In this case, for example, an image showing a smaller subject than the bird such as an insect or a plant is exemplified as the second image. In addition, besides, for example, an image showing a tree is exemplified as the first image. In this case, for example, an image showing a smaller subject than the tree such as a bird and/or an insect is exemplified as the second image. Thus, according to the present configuration, a possibility of detecting an image showing the specific subject and an image showing a smaller subject than the specific subject can be increased, compared to a case where the image showing the specific subject and the image showing the smaller subject than the specific subject are detected by only the first detection processing.

In addition, in the imaging apparatus 10 according to the second embodiment, the live view image including the face tracking frame is displayed on the display 26 (refer to FIG.

18A and FIG. 18C). In addition, the live view image including the pupil tracking frame is displayed on the display 26 (refer to FIG. 18A). In addition, the live view image including the message M1 is displayed on the display 26 (refer to FIG. 18B). Furthermore, the live view image including the message M2 is displayed on the display 26 (refer to FIG. 18C). Thus, according to the present configuration, the user can perceive the detection result of each of the first face detection processing, the first pupil detection processing, the second face detection processing, and the second pupil detection processing.

In the second embodiment, while an example of a form in which the face image detection circuit 34E2 detects the face image 300A using the live view image data 70B2 of one frame is illustratively described, the technology of the present disclosure is not limited thereto. For example, the second detection circuit 34E may perform the second face detection processing and the second pupil detection processing on partial region image data. The partial region image data is a part of the live view image data 70B2 in the live view image data 70B2 of one frame. Specifically, the partial region image data refers to image data indicating a partial region that is a partial region in the live view image indicated by the live view image data 70B2 and corresponds to a position of the face image 300A detected by the first face detection processing in a frame previous to a frame in which the second face detection processing and the second pupil detection processing are performed. In addition, here, for example, the frame previous to the frame in which the second face detection processing is performed refers to a previous frame by one or more frames.

Figure 21:
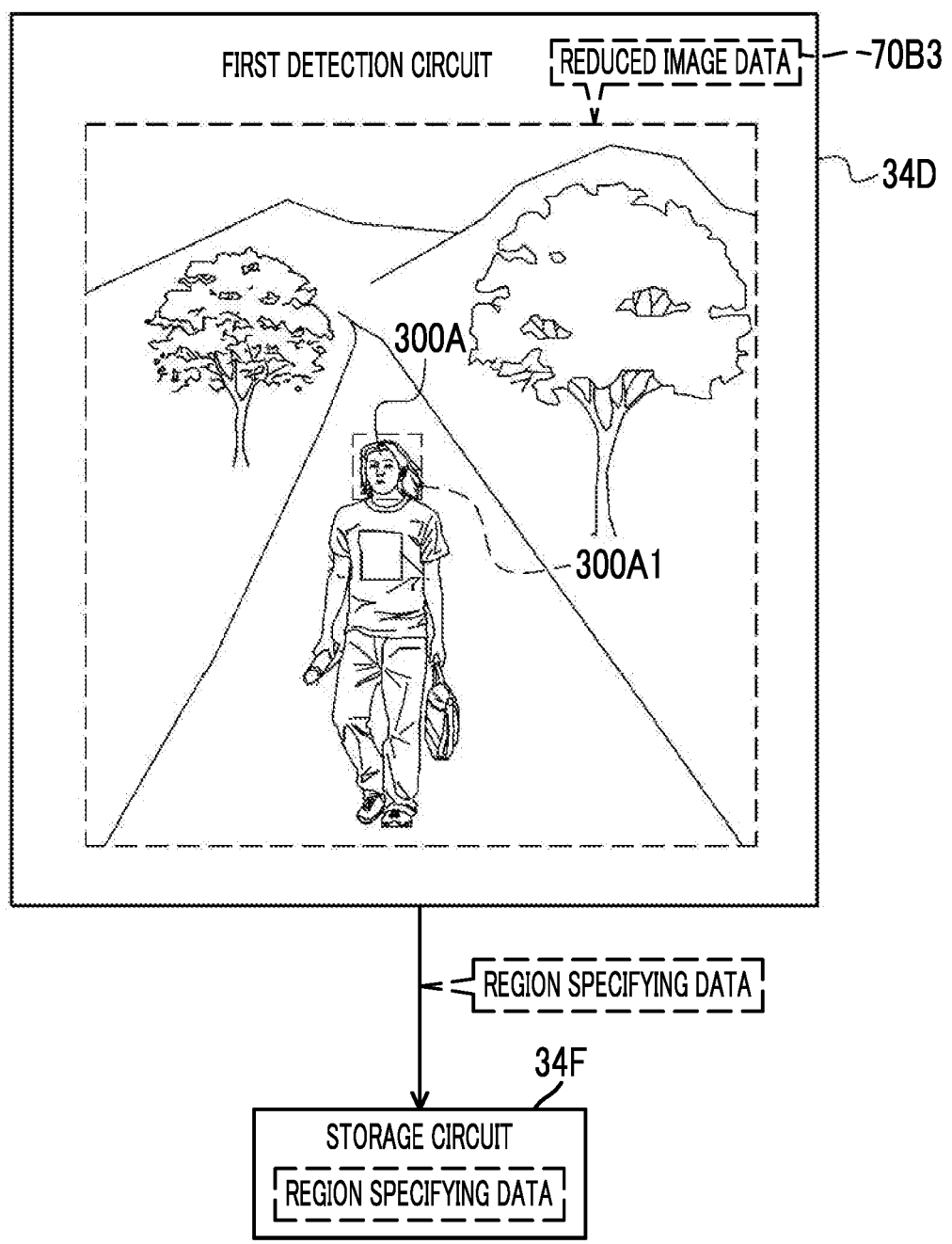
FIG. 21 is a conceptual diagram for describing a modification example of the processing content of the first detection circuit included in the imaging apparatus according to the second embodiment.

In this case, as illustrated in FIG. 21 as an example, the first detection circuit 34D acquires region specifying data (for example, coordinates) for specifying a position of the partial region corresponding to the position of the face image 300A in the reduced image indicated by the reduced image data 70B3 of the frame previous to the frame in which the second face detection processing and the second pupil detection processing are performed, and stores the acquired region specifying data in the storage circuit 34F. Here, data (for example, coordinates) for specifying the position of the rectangular frame 300A1 in the reduced image is employed as an example of the region specifying data. The region specifying data is not limited to the data for specifying the position of the rectangular frame 300A1 in the reduced image and may be, for example, data (for example, coordinates) for specifying the position of the face image 300A.

Figure 22:
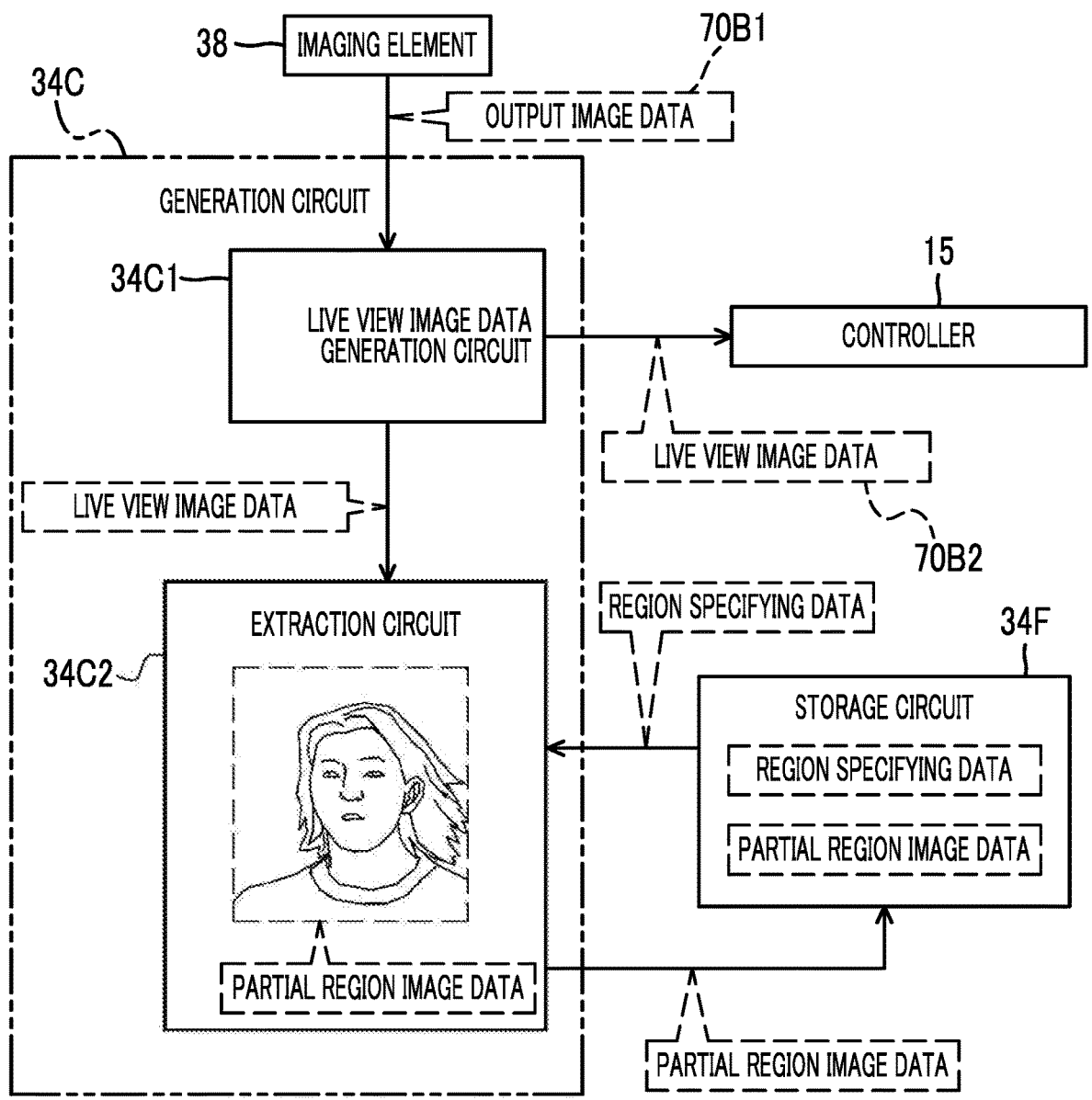
FIG. 22 is a conceptual diagram for describing a modification example of a processing content of a generation circuit included in the imaging apparatus according to the second embodiment.

As illustrated in FIG. 22 as an example, the generation circuit 34C comprises a live view image data generation circuit 34C1 and an extraction circuit 34C2. The live view image data generation circuit 34C1 acquires the output image data 70B1 from the imaging element 38 and generates the live view image data 70B2 by reducing the acquired output image data 70B1. The live view image data generation circuit 34C1 outputs the generated live view image data 70B2 to the controller 15 and the extraction circuit 34C2.

The extraction circuit 34C2 extracts the partial region image data from the live view image data 70B2 input from the live view image data generation circuit 34C1 by referring to the region specifying data stored in the storage circuit 34F. That is, the extraction circuit 34C2 extracts, as the partial region image data, a part of the live view image data 70B2 indicating a region corresponding to the position of the face image 300A detected by the first detection circuit 34D from the live view image data 70B2. The extraction circuit 34C2 stores the partial region image data extracted from the live view image data 70B2 in the storage circuit 34F. In the second embodiment, the partial region image data is an example of "specific subject image region data" according to the embodiments of the technology of the present disclosure. In addition, in the second embodiment, the storage circuit 34F is an example of the "storage portion" according to the embodiments of the technology of the present disclosure.

In the example illustrated in FIG. 22, an example of a form of storing the partial region image data in the storage circuit 34F is illustrated, but is merely an example. A partial region image data memory (not illustrated) may be disposed separately from the storage circuit 34F, and the partial region image data may be stored in the partial region image data memory. In addition, the partial region image data may be stored in the frame memory 34G (refer to FIG. 11) in units of frames, and the partial region image data may be acquired from the frame memory 34G in units of frames by the second detection circuit 34E.

Figure 23:
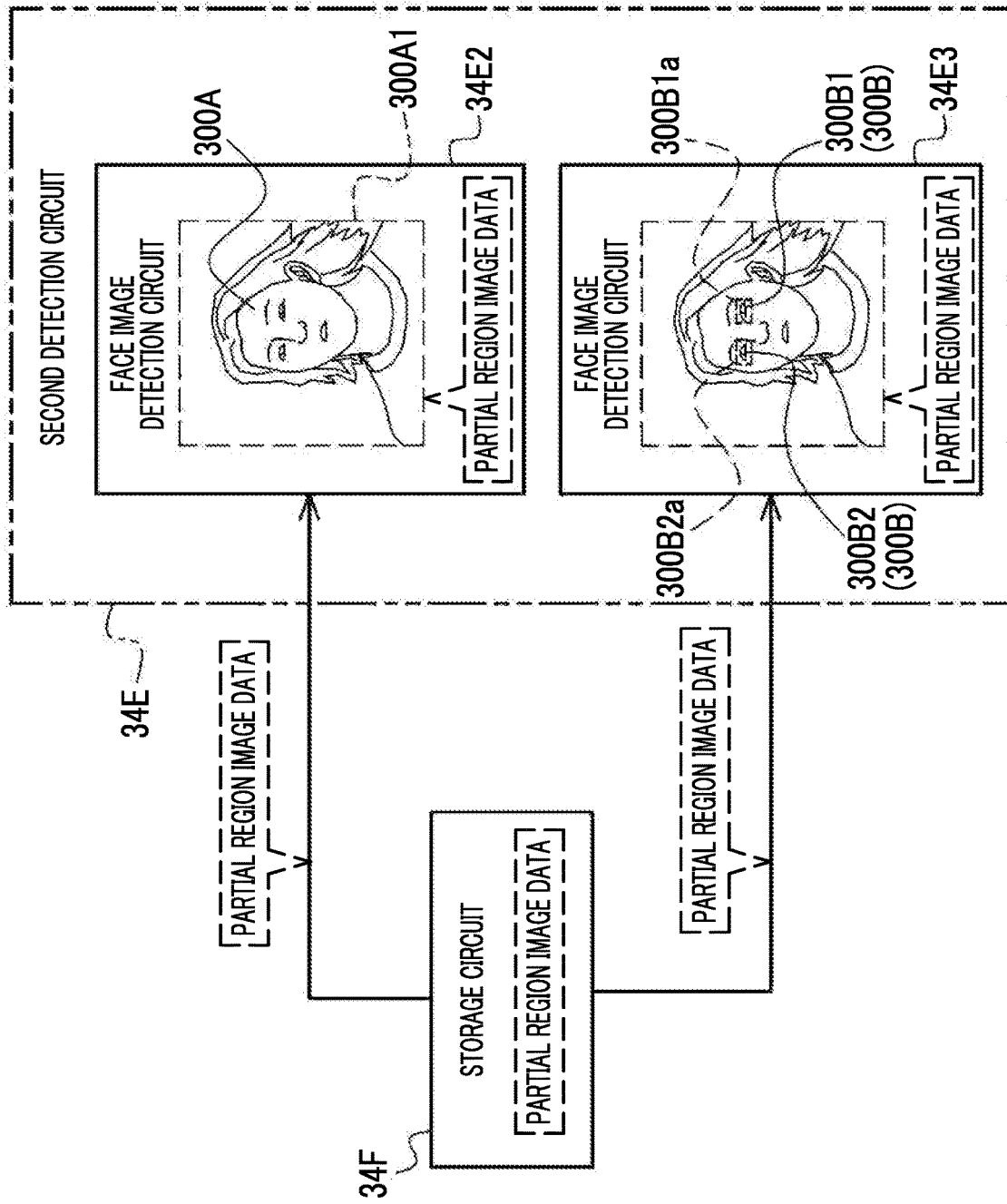
FIG. 23 is a conceptual diagram for describing a modification example of the processing content of the second detection circuit included in the imaging apparatus according to the second embodiment.

As illustrated in FIG. 23 as an example, the face image detection circuit 34E2 acquires the partial region image data from the storage circuit 34F and executes the second face detection processing on the acquired partial region image data. In addition, the pupil image detection circuit 34E3 acquires the partial region image data from the storage circuit 34F and executes the second pupil detection processing on the acquired partial region image data.

In the examples illustrated in FIG. 21 to FIG. 23, the second face detection processing and the second pupil detection processing are performed on the partial region image data by the second detection circuit 34E. The partial region image data is image data indicating a partial region that is a partial region in the live view image indicated by the live view image data 70B2 and corresponds to the position of the face image 300A detected by the first face detection processing in the frame previous to the frame in which the second face detection processing is performed. Thus, according to the present configuration, processing loads exerted on the second face detection processing and the second pupil detection processing can be reduced, compared to a case where the second face detection processing and the second pupil detection processing are performed on the live view image data 70B2 of one or more frames.

Here, while an example of a form of performing the second face detection processing and the second pupil detection processing on the partial region image data is illustratively described, the technology of the present disclosure is not limited thereto. The second face detection processing or the second pupil detection processing may be performed on the partial region image data.

In addition, here, while an example of a form in which the extraction circuit 34C2 extracts the partial region image data in accordance with the region specifying data based on the detection result of the first detection processing is exemplified, the technology of the present disclosure is not limited thereto. For example, the live view image data 70B2 corresponding to the region 200A for which the instruction is issued through the touch panel 28 by the user in the live view image data 70B2 may be extracted as the partial region image data by the extraction circuit 34C2. In this case, it is possible to contribute to performing the second detection processing on the partial region image data intended by the user.

In addition, in the examples illustrated in FIG. 21 to FIG. 23, in a case where the face image 300A is detected by the first face detection processing, the partial region image data indicating the region corresponding to the position of the face image 300A in the live view image data 70B2 is stored in the storage circuit 34F by the extraction circuit 34C2.

Thus, according to the present configuration, a data amount stored in the storage circuit 34F can be decreased, compared to a case where the live view image data 70B2 of one or more frames is stored in the storage circuit 34F.

In addition, in the examples illustrated in FIG. 21 to FIG. 23, in a case where the face image 300A is detected by the first face detection processing, the face image detection circuit 34E2 performs the second face detection processing on the partial region image data stored in the storage circuit 34F. Thus, according to the present configuration, a probability of detecting the face image 300A using the second face detection processing can be increased, compared to a case where the second face detection processing is performed on the live view image data 70B2 other than the partial region image data in the live view image data 70B2 of one frame.

Furthermore, in the examples illustrated in FIG. 21 to FIG. 23, in a case where the face image 300A is detected by the first face detection processing, the pupil image detection circuit 34E3 performs the second pupil detection processing on the partial region image data stored in the storage circuit 34F. Thus, according to the present configuration, a probability of detecting the pupil image 300B using the second pupil detection processing can be increased, compared to a case where the second pupil detection processing is performed on the live view image data 70B2 other than the partial region image data in the live view image data 70B2 of one frame.

Third Embodiment

In the second embodiment, an example of a form of executing the second face detection processing and the second pupil detection processing on the live view image data 70B2 is illustratively described. In a third embodiment, an example of a form of executing the second face detection processing and the second pupil detection processing on not only the live view image data 70B2 but also the digital image data 70B will be described. In the third embodiment, the same constituents as the second embodiment will be designated by the same reference signs and will not be described.

Figure 24:
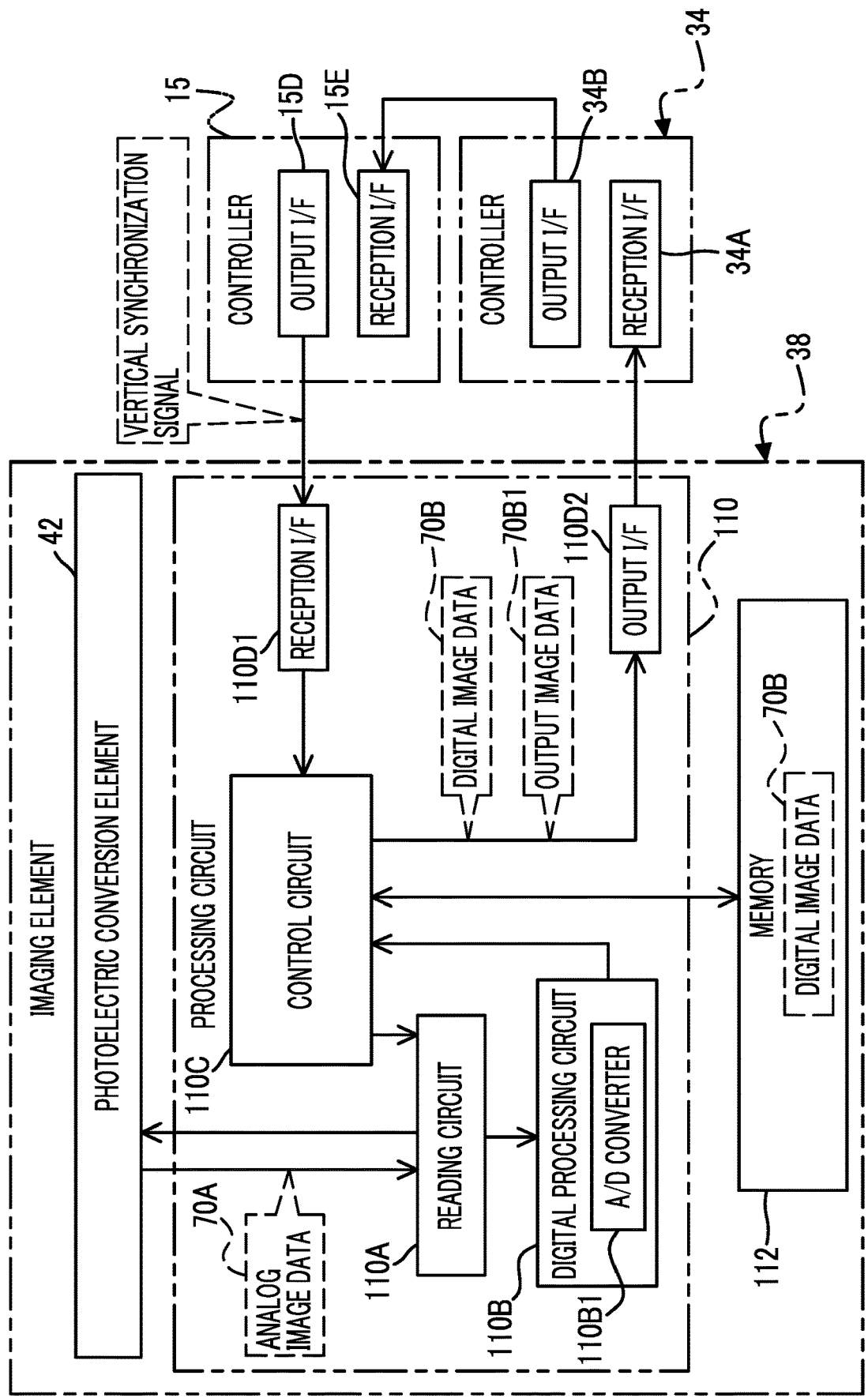
FIG. 24 is a block diagram illustrating an example of a hardware configuration of an electric system of the imaging element included in the imaging apparatus according to the third embodiment.

As illustrated in FIG. 24 as an example, in the imaging apparatus 10 according to the third embodiment, the control circuit 110C acquires the digital image data 70B from the memory 112 in accordance with the vertical synchronization signal input from the controller 15. The control circuit 110C is connected to the reception I/F 34A of the signal processing circuit 34 through the output I/F 110D2 in a parallelly communicable manner and outputs the digital image data 70B and the output image data 70B1 in synchronization to the signal processing circuit 34 in accordance with the frame rate. In the signal processing circuit 34, the digital image data 70B and the output image data 70B1 output from the imaging element 38 are received at a synchronized timing by the reception I/F 34A.

Figure 25:
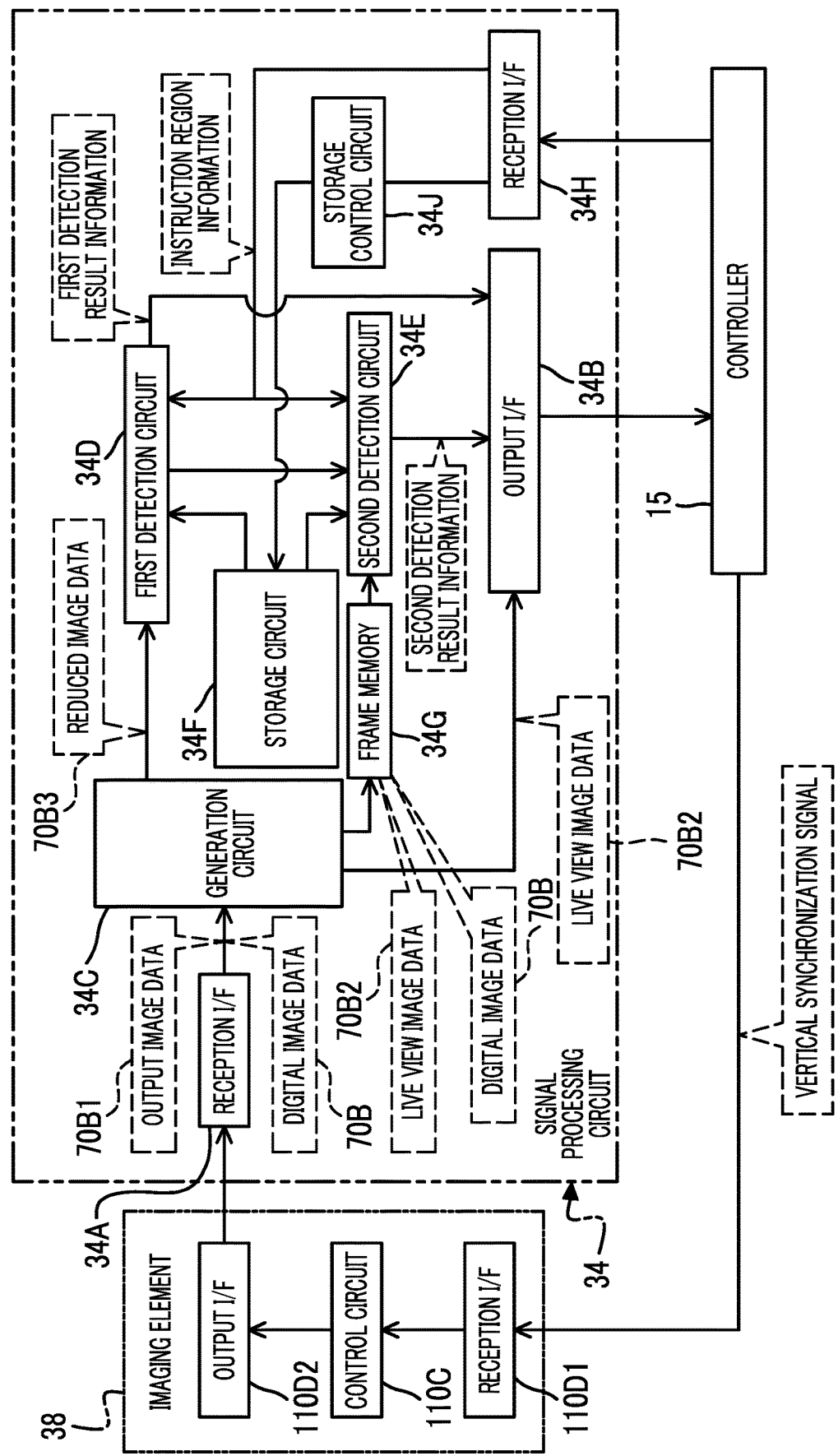
FIG. 25 is a conceptual diagram illustrating an example of a configuration of the signal processing circuit and an edge part included in the imaging apparatus according to the third embodiment.

As illustrated in FIG. 25 as an example, the generation circuit 34C stores the digital image data 70B and the live view image data 70B2 received at a synchronized timing by the reception I/F 34A in the frame memory 34G. Accordingly, two types of image data having different resolutions are stored in the frame memory 34G for each period of one frame defined by the frame rate. The second detection circuit 34E performs the second detection processing on the two types of image data having different resolutions in a stepwise manner from image data having a low resolution to image data having a high resolution. That is, the second detection circuit 34E first performs the second detection processing on the live view image data 70B2 and next, performs the second detection processing on the digital image data 70B.

Figure 26C:
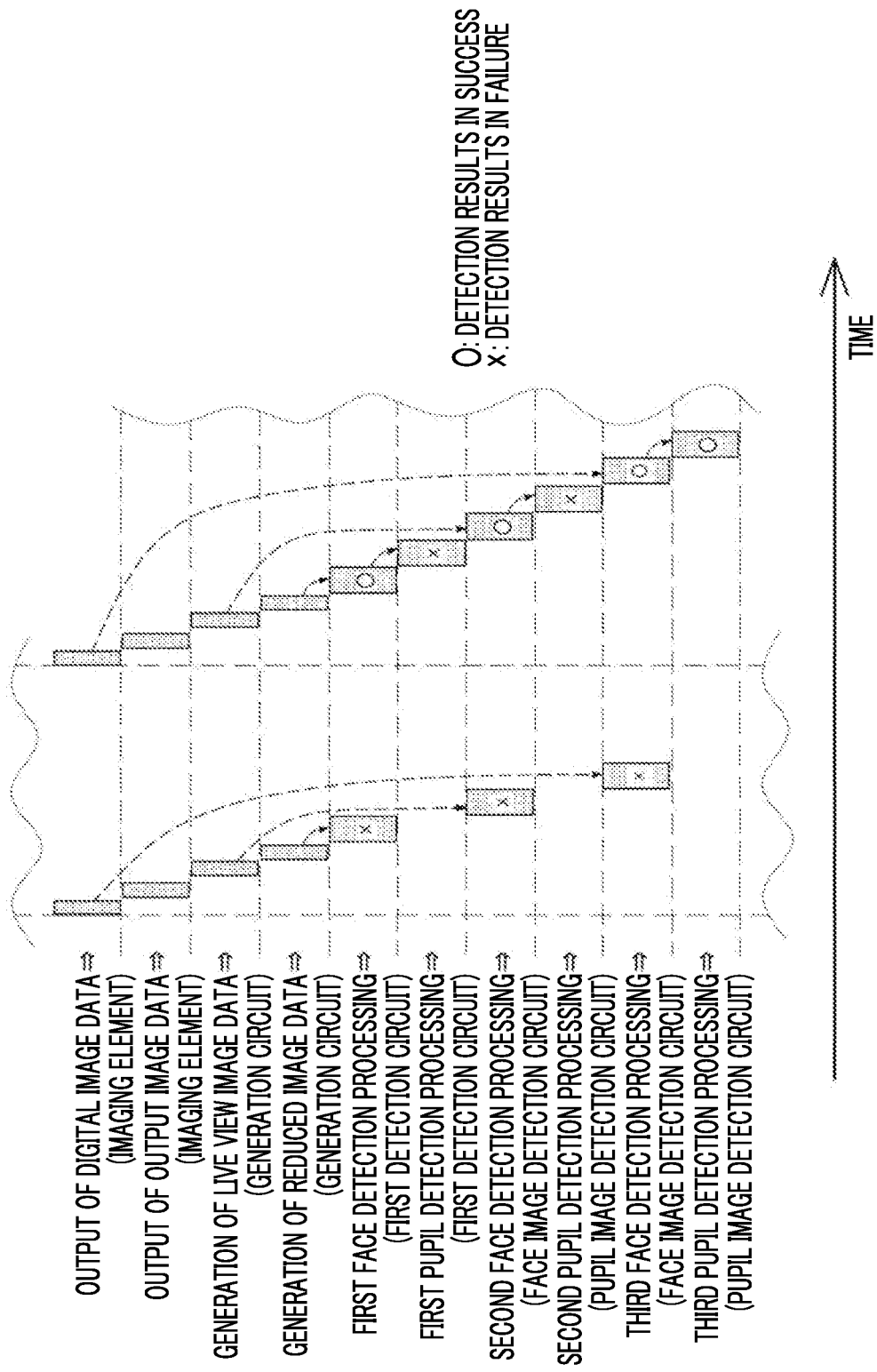
FIG. 26C is a time chart illustrating an example of the processing content in the imaging apparatus according to the third embodiment.

FIG. 26A to FIG. 26C illustrate an example of a timing of processing performed on the image data by the first detection circuit 34D and the second detection circuit 34E included in the imaging apparatus 10 according to the third embodiment. In the examples illustrated in FIG. 26A to FIG. 26C, duplicate processing with respect to the examples illustrated in FIG. 14 and FIG. 19 will not be described. In addition, hereinafter, for convenience of description, processing of detecting the face image 300A from an image indicated by the digital image data 70B using the face image detection circuit 34E2 will be referred to as "third face detection processing", and processing of detecting the pupil image 300B from the image indicated by the digital image data 70B using the pupil image detection circuit 34E3 will be referred to as "third pupil detection processing". In the third embodiment, the second face detection processing, the second pupil detection processing, the third face detection processing, and the third pupil detection processing are an example of "second detection processing" according to the embodiments of the technology of the present disclosure.

As illustrated in FIG. 26A as an example, in a case where the first face detection processing results in a failure, and the second face detection processing results in a failure, the third face detection processing using the digital image data 70B stored in the frame memory 34G is executed by the face image detection circuit 34E2. Here, in a case where the third face detection processing results in a success, as illustrated in FIG. 18A as an example, the rectangular frame 300A1 is displayed in a superimposed manner on the live view image. In addition, in a case where the third face detection processing results in a success, the third pupil detection processing using a part of the digital image data 70B indicating a region corresponding to the face image 300A detected by the third face detection processing in the digital image data 70B stored in the frame memory 34G is executed in the pupil image detection circuit 34E3. In a case where the third pupil detection processing results in a success, as illustrated in FIG. 18A as an example, the rectangular frames 300B1a and 300B2a are displayed in a superimposed manner on the live view image.

As illustrated in FIG. 26A as an example, in a case where the first face detection processing results in a failure, and the second face detection processing results in a success, the second pupil detection processing using the live view image data 70B2 stored in the frame memory 34G is executed by the face image detection circuit 34E2. Here, in a case where the second pupil detection processing results in a failure, the third face detection processing using the digital image data 70B stored in the frame memory 34G is executed by the face image detection circuit 34E2. Here, in a case where the third face detection processing results in a success, as illustrated in FIG. 18A as an example, the rectangular frame 300A1 is displayed in a superimposed manner on the live view image. In addition, in a case where the third face detection processing results in a success, the third pupil detection processing using a part of the digital image data 70B indicating the region corresponding to the face image 300A detected by the third face detection processing in the digital image data 70B stored in the frame memory 34G is executed in the pupil image detection circuit 34E3. In a case where the third pupil detection processing results in a success, as illustrated in FIG. 18A as an example, the rectangular frames 300B1a and 300B2a are displayed in a superimposed manner on the live view image.

As illustrated in FIG. 26B as an example, in a case where the first face detection processing results in a failure, and the second face detection processing results in a failure, the third face detection processing using the digital image data 70B stored in the frame memory 34G is executed by the face image detection circuit 34E2. Here, in a case where the third face detection processing results in a success, as illustrated in FIG. 18C as an example, the rectangular frame 300A1 is displayed in a superimposed manner on the live view image. In addition, in a case where the third face detection processing results in a success, the third pupil detection processing using a part of the digital image data 70B indicating a region corresponding to the face image 300A detected by the third face detection processing in the digital image data 70B stored in the frame memory 34G is executed in the pupil image detection circuit 34E3. In a case where the third pupil detection processing results in a failure, as illustrated in FIG. 18C as an example, the message M2 is displayed on the display 26 together with the live view image.

As illustrated in FIG. 26B as an example, in a case where the first face detection processing results in a failure, and the second face detection processing results in a success, the second pupil detection processing using the live view image data 70B2 stored in the frame memory 34G is executed by the face image detection circuit 34E2. Here, in a case where the second pupil detection processing results in a failure, the third face detection processing using the digital image data 70B stored in the frame memory 34G is executed by the face image detection circuit 34E2. Here, in a case where the third face detection processing results in a success, as illustrated in FIG. 18C as an example, the rectangular frame 300A1 is displayed in a superimposed manner on the live view image. In addition, in a case where the third face detection processing results in a success, the third pupil detection processing using a part of the digital image data 70B indicating the region corresponding to the face image 300A detected by the third face detection processing in the digital image data 70B stored in the frame memory 34G is executed in the pupil image detection circuit 34E3. In a case where the third pupil detection processing results in a failure, as illustrated in FIG. 18C as an example, the message M2 is displayed on the display 26 together with the live view image.

As illustrated in FIG. 26C as an example, in a case where the first face detection processing results in a failure, and the second face detection processing results in a failure, the third face detection processing using the digital image data 70B stored in the frame memory 34G is executed by the face image detection circuit 34E2. Here, in a case where the third face detection processing results in a failure, as illustrated in FIG. 18C as an example, the rectangular frame 300A1 is displayed in a superimposed manner on the live view image. In addition, in a case where the third face detection processing results in a success, the third pupil detection processing using a part of the digital image data 70B indicating the region corresponding to the face image 300A detected by the third face detection processing in the digital image data 70B stored in the frame memory 34G is executed in the pupil image detection circuit 34E3. In a case where the third pupil detection processing results in a failure, as illustrated in FIG. 18B as an example, the message M1 is displayed on the display 26 together with the live view image.

As illustrated in FIG. 26C as an example, in a case where the first face detection processing results in a success, and the first pupil detection processing result in a failure, as illustrated in FIG. 18A as an example, the rectangular frame 300A1 is displayed in a superimposed manner on the live view image. The second face detection processing using the live view image data 70B2 stored in the frame memory 34G is executed by the face image detection circuit 34E2. In a case where the first face detection processing results in a success, the second pupil detection processing using a part of the live view image data 70B2 indicating the region corresponding to the face image 300A detected by the second face detection processing in the live view image data 70B2 stored in the frame memory 34G is executed in the pupil image detection circuit 34E3. In a case where the second pupil detection processing results in a failure, the third face detection processing using the digital image data 70B stored in the frame memory 34G is executed by the face image detection circuit 34E2. In a case where the third face detection processing results in a success, the third pupil detection processing using a part of the digital image data 70B2 indicating the region corresponding to the face image 300A detected by the second face detection processing in the digital image data 70B stored in the frame memory 34G is executed in the pupil image detection circuit 34E3. In a case where the third pupil detection processing results in a success, as illustrated in FIG. 18A as an example, the rectangular frames 300B1*a* and 300B2*a* are displayed in a superimposed manner on the live view image.

As described above, in the imaging apparatus 10 according to the third embodiment, processing of reducing the digital image data 70B is performed by the generation circuit 34C. The first detection processing using the reduced image data 70B3 is performed by the first detection circuit 34D. In a case where the specific subject image 200 is not detected by the first detection processing, the second detection processing using the live view image data 70B2 and the digital image data 70B stored in the frame memory 34G in a stepwise manner is executed by the second detection circuit 34E. That is, in a case where the second face detection processing and the second pupil detection processing using the live view image data 70B2 are executed, and the detection processing of the second face detection processing and/or the second pupil detection processing results in a failure, the third face detection processing and the third pupil detection processing using the digital image data 70B having a higher resolution than the live view image data 70B2 are executed. Thus, according to the present configuration, high-accuracy detection can be implemented, compared to a case of performing the second detection processing using only the live view image data 70B2 at all times.

In the third embodiment, in a case where the second pupil detection processing results in a failure, the third face detection processing is executed by the face image detection circuit 34E2, and then, the third pupil detection processing is executed by the pupil image detection circuit 34E3. However, the technology of the present disclosure is not limited thereto. For example, as illustrated in FIG. 27, in a case where the second pupil detection processing results in a failure, the third pupil detection processing using the digital image data 70B stored in the frame memory 34G may be executed by the pupil image detection circuit 34E3 without executing the third face detection processing. In this case, as in the examples illustrated in FIG. 21 to FIG. 23, the third pupil detection processing using a part of the digital image data 70B indicating the region corresponding to the position of the face image 300A in the digital image data 70B may be executed by the pupil image detection circuit 34E3 by referring to the region specifying data.

In addition, in the examples illustrated in FIG. 26A to FIG. 26C, an example of a form in which the face image detection circuit 34E2 executes the third face detection processing using the digital image data 70B, and the pupil image detection circuit 34E3 executes the third pupil detection processing using the digital image data 70B is illustratively described. However, the technology of the present disclosure is not limited thereto. For example, as illustrated in FIG. 28, the third face detection processing and fourth face detection processing may be executed by the face image detection circuit 34E2, and the third pupil detection processing and fourth pupil detection processing may be executed by the pupil image detection circuit 34E3.

Figure 28:
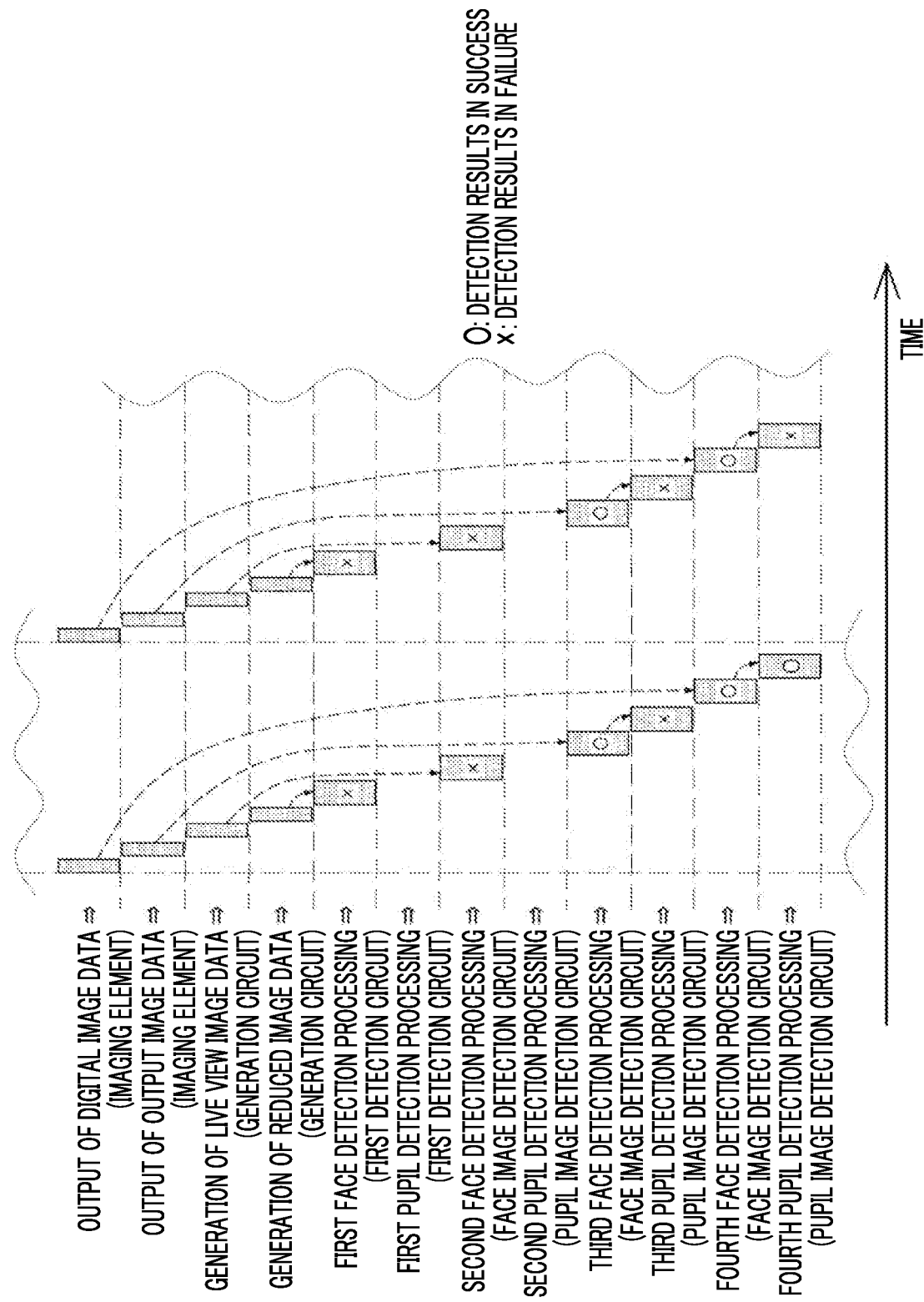
FIG. 28 is a time chart illustrating a second modification example of the processing content in the imaging apparatus according to the third embodiment.

In the example illustrated in FIG. 28, the third face detection processing using the output image data 70B1 is executed by the face image detection circuit 34E2 as the third face detection processing, and the third pupil detection processing using the output image data 70B1 is executed by the pupil image detection circuit 34E3 as the third pupil detection processing. In addition, in a case where the third pupil detection processing results in a failure, the face image detection circuit 34E2 executes the fourth face detection processing. The fourth face detection processing refers to processing of detecting the face image 300A from the digital image data 70B. In addition, in a case where the fourth face detection processing results in a success, the pupil image detection circuit 34E3 executes the fourth pupil detection processing. The fourth pupil detection processing refers to processing of detecting the pupil image 300B using a part of the digital image data 70B indicating the region corresponding to the position of the face image 300A detected by the fourth face detection processing in the digital image data 70B.

In the example illustrated in FIG. 28, in a case where the third pupil detection processing results in a failure, the fourth face detection processing is executed by the face image detection circuit 34E2, and then, the fourth pupil detection processing is executed. However, the technology of the present disclosure is not limited thereto. For example, in a case where the third pupil detection processing results in a failure, the fourth pupil detection processing using the digital image data 70B stored in the frame memory 34G may be executed by the pupil image detection circuit 34E3 without executing the fourth face detection processing. In this case, as in the examples illustrated in FIG. 21 to FIG. 23, the fourth pupil detection processing using a part of the digital image data 70B indicating the region corresponding to the position of the face image 300A in the digital image data 70B may be executed by the pupil image detection circuit 34E3 by referring to the region specifying data.

Fourth Embodiment

In the first embodiment, an example of a form of storing only one type of image data in the frame memory 34G is illustratively described. In a fourth embodiment, an example of a form of storing a plurality of types of image data in the frame memory 34G will be described. In the fourth embodiment, the same constituents as the first to third embodiments will be designated by the same reference signs and will not be described.

As illustrated in FIG. 29 as an example, the signal processing circuit 34 included in the imaging apparatus 10 according to the fourth embodiment is different from the signal processing circuit 34 described in the first to third embodiments in that an analysis circuit 34K is included, and the instruction region information is input into the analysis circuit 34K.

The output image data 70B1 is input into the analysis circuit 34K from the generation circuit 34C. In addition, the generation circuit 34C generates first pre-reduction image data and second pre-reduction image data from the output image data and stores the generated first pre-reduction image data and the second pre-reduction image data in the frame memory 34G for each predetermined period. A period corresponding to a transfer period of one frame defined by the frame rate is employed as the predetermined period. The predetermined period is not limited thereto. For example, in a case where N denotes an integer greater than or equal to 1, a period corresponding to a transfer period of 2N or more frames defined by the frame rate may be employed as the predetermined period.

The first pre-reduction image data and the second pre-reduction image data are image data used in the second detection circuit 34E. Specifically, the first pre-reduction image data and the second pre-reduction image data are second detection processing target image data used in the second detection processing in the second detection circuit 34E. The first pre-reduction image data and the second pre-reduction image data are image data having resolutions different from each other. Both of the first pre-reduction image data and the second pre-reduction image data have higher resolutions than the output image data 70B1 and have lower resolutions than the live view image data 70B2. In addition, the first pre-reduction image data has a lower resolution than the second pre-reduction image data. Hereinafter, for convenience of description, the first pre-reduction image data and the second pre-reduction image data will be referred to as the "second detection processing target image data" unless otherwise necessary to distinguish therebetween.

The analysis circuit 34K analyzes the output image data 70B1 for each predetermined period before the second detection processing is performed by the second detection circuit 34E. The second detection circuit 34E performs the second detection processing on the second detection processing target image data that is decided in accordance with an analysis result of the analysis circuit 34K for each predetermined period out of the first pre-reduction image data and the second pre-reduction image data. The analysis circuit 34K analyzes region-of-interest image data that is a part of the output image data 70B1 indicating a region corresponding to a position of the region 200A for which the instruction is issued using the instruction region information in the output image data 70B1.

Figure 30A:
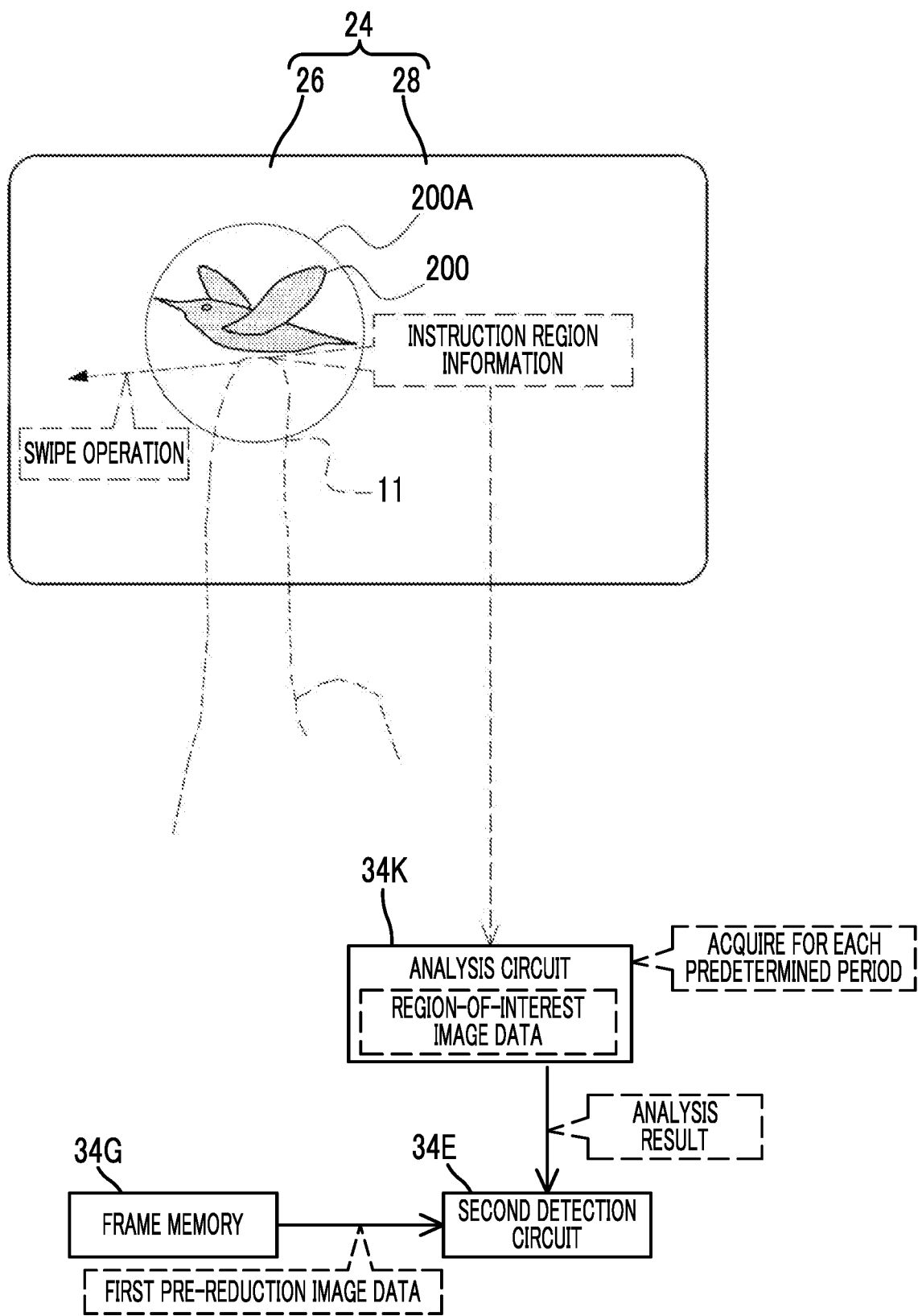
FIG. 30A is a conceptual diagram illustrating an example of a processing content in a case where first pre-reduction image data stored in a frame memory included in the imaging apparatus according to the fourth embodiment is acquired by the second detection circuit as second detection processing target image data.

As illustrated in FIG. 30A as an example, the analysis circuit 34K acquires the instruction region information from the touch panel 28 for each predetermined period. The instruction region information is updated by performing a swipe operation on the touch panel 28 with the finger 11 of the user. That is, the position of the region 200A is changed by performing a swipe operation on the touch panel 28 with the finger 11 of the user. While the swipe operation is illustrated here, the technology of the present disclosure is not limited thereto. Other operations such as a flick operation may be used.

Figure 30B:
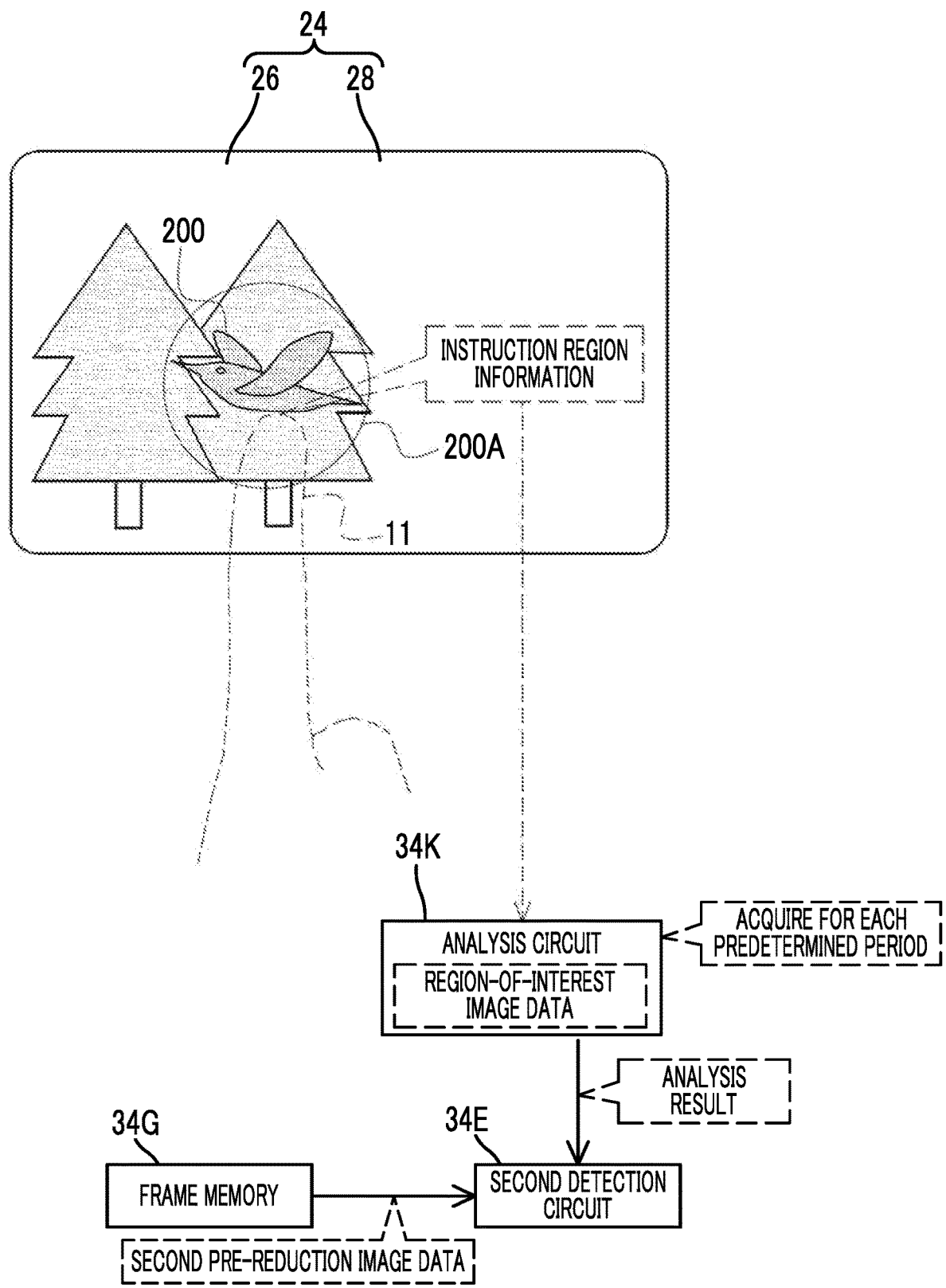
FIG. 30B is a conceptual diagram illustrating an example of a processing content in a case where second pre-reduction image data stored in the frame memory included in the imaging apparatus according to the fourth embodiment is acquired by the second detection circuit as the second detection processing target image data.

The analysis circuit 34K acquires the region-of-interest image data from the output image data 70B1 in accordance with the instruction region information and analyzes a contrast of an image (hereinafter, referred to as an "instruction region image") indicated by the acquired region-of-interest image data. The analysis circuit 34K determines whether or not the contrast of the instruction region image is greater than or equal to a threshold value, and outputs a determination result to the second detection circuit 34E as the analysis result. In a case where the contrast of the instruction region image is greater than or equal to the threshold value, the second detection circuit 34E acquires the first pre-reduction image data as the second detection processing target image data and performs the second detection processing on the acquired second detection processing target image data. In addition, as illustrated in FIG. 30B as an example, in a case where the contrast of the instruction region image is less than the threshold value, the second detection circuit 34E acquires the second pre-reduction image data as the second detection processing target image data and performs the second detection processing on the acquired second detection processing target image data.

While an example of a form of analyzing the contrast using the analysis circuit 34K is illustratively described here, the technology of the present disclosure is not limited thereto. Contours, a degree of blurriness, a distribution of brightness, and/or a distribution of color or the like may be analyzed by the analysis circuit 34K.

As described above, in the imaging apparatus 10 according to the fourth embodiment, the generation circuit 34C generates the first pre-reduction image data and the second pre-reduction image data from the output image data, and the generated first pre-reduction image data and the second pre-reduction image data are stored in the frame memory 34G for each predetermined period. Thus, according to the present configuration, the number of options for the second detection processing target image data used in the second detection processing for each predetermined period can be increased, compared to a case where one type of second detection processing target image data is stored in the frame memory 34G for each predetermined period.

In addition, in the imaging apparatus 10 according to the fourth embodiment, the analysis circuit 34K analyzes the output image data 70B1 for each predetermined period before the second detection processing is performed by the second detection circuit 34E. The second detection circuit 34E performs the second detection processing on the second detection processing target image data that is decided in accordance with the analysis result of the analysis circuit 34K for each predetermined period out of the first pre-reduction image data and the second pre-reduction image data stored in the frame memory 34G. Thus, according to the present configuration, the second detection processing can be performed on the second detection processing target image data of a type corresponding to the current situation.

In addition, while the colors of the specific subject image 200 and the background image are similar in the region 200A illustrated in FIG. 30B, the colors of the specific subject image 200 and the background image are not similar in the region 200A illustrated in FIG. 30A. That is, the contrast in the region 200A illustrated in FIG. 30B is lower than the contrast in the region 200A illustrated in FIG. 30A. Thus, in a case of the example illustrated in FIG. 30B, the second detection circuit 34E acquires the second pre-reduction image data having a higher resolution than the first pre-reduction image data as the second detection processing target image data and performs the second detection processing on the acquired second detection processing target image data. Accordingly, a possibility of detecting the specific subject image 200 can be increased, compared to a case of performing the second detection processing on the first pre-reduction image data.

In the fourth embodiment, while the two types of image data of the first pre-reduction image data and the second pre-reduction image data are illustrated, the technology of the present disclosure is not limited thereto. Three or more types of image data may be used. For example, 4K image data, FHD image data, and VGA image data are exemplified as the three or more types of image data.

Figure 31:
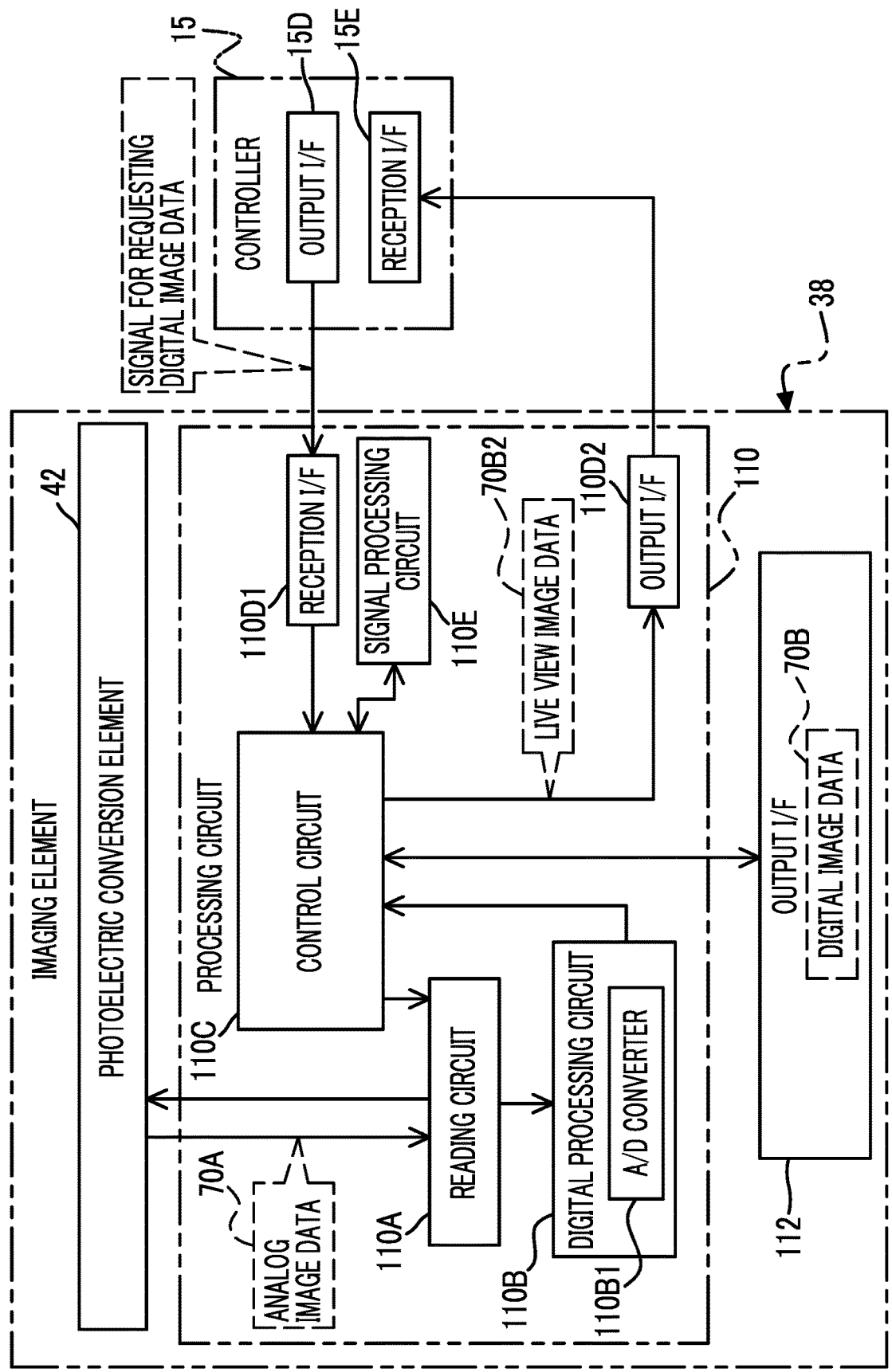
FIG. 31 is a block diagram illustrating a modification example of the hardware configuration of the electric system of the imaging element.

In addition, in the first to fourth embodiments, while an example of a form of performing processing of reducing the output image data, the first detection processing, and the second detection processing using the signal processing circuit 34 positioned on the rear stage of the imaging element 38 is illustratively described, the technology of the present disclosure is not limited thereto. For example, the processing circuit 110 of the imaging element 38 may be used as an example of the "processing portion" according to the embodiments of the technology of the present disclosure. In this case, for example, as illustrated in FIG. 31, the imaging element 38 may incorporate a signal processing circuit 110E corresponding to the signal processing circuit 34. Accordingly, since the signal processing circuit 34 is not necessary, the output I/F 110D2 is connected to the reception I/F 15E of the controller 15. In the example illustrated in FIG. 31, the signal processing circuit 110E is connected to the control circuit 110C, and various types of information are exchanged between the control circuit 110C and the signal processing circuit 110E. According to the present configuration, the image data can be processed at a high speed, compared to a case where a processing portion (for example, the controller 15) other than the imaging element 38 processes the image data.

In addition, the memory 112 may be used as an example of the "storage portion" according to the embodiments of the technology of the present disclosure. For example, at least one of a storage circuit corresponding to the storage circuit 34F included in the signal processing circuit 34 or a frame memory corresponding to the frame memory 34G among a plurality of constituents included in the signal processing circuit 110E illustrated in FIG. 31 may be replaced with the memory 112 incorporated in the imaging element 38. According to the present configuration, high-speed access to the image data can be implemented, compared to a case where the image data is stored in a storage device outside the imaging element 38.

In addition, in the imaging apparatus 10, the imaging element in which the photoelectric conversion element 42, the processing circuit 110, and the memory 112 are formed in one chip is employed as the imaging element 38. Accordingly, portability of the imaging element 38 is increased, compared to an imaging element in which the photoelectric conversion element 42, the processing circuit 110, and the memory 112 are not formed in one chip. In addition, a degree of design freedom can be increased, compared to a case of the imaging element in which the photoelectric conversion element 42, the processing circuit 110, and the memory 112 are not formed in one chip. Furthermore, it is possible to contribute to size reduction of the imaging apparatus 10, compared to a case of the imaging element in which the photoelectric conversion element 42, the processing circuit 110, and the memory 112 are not formed in one chip.

In addition, in the imaging apparatus 10, the laminated imaging element in which the photoelectric conversion element 42 is laminated with the memory 112 is employed as the imaging element 38. Accordingly, since a wire that connects the photoelectric conversion element 42 to the memory 112 can be shortened, a wire delay can be reduced. Consequently, a transfer speed of the image data from the photoelectric conversion element 42 to the memory 112 can be increased, compared to a case where the photoelectric conversion element 42 and the memory 112 are not laminated. Improving the transfer speed contributes to high-speed processing in the entire processing circuit 110. In addition, the degree of design freedom can be increased, compared to a case of not laminating the photoelectric conversion element 42 and the memory 112. Furthermore, it is possible to contribute to size reduction of the imaging apparatus 10, compared to a case of not laminating the photoelectric conversion element 42 and the memory 112.

In addition, in the imaging apparatus 10, while the imaging element in which the photoelectric conversion element 42, the processing circuit 110, and the memory 112 are formed in one chip is illustrated as the imaging element 38, the technology of the present disclosure is not limited thereto. For example, at least the photoelectric conversion element 42 and the memory 112 among the photoelectric conversion element 42, the processing circuit 110, and the memory 112 may be formed in one chip.

In addition, in the imaging apparatus 10, while an example of a form in a case of detecting the face image 300A and detecting the pupil image 300B using the second detection processing is illustratively described, the technology of the present disclosure is not limited thereto. For example, the face image 300A or the pupil image 300B may be detected by the second detection processing.

While the imaging apparatus 10 of the interchangeable lens type is illustrated in each of the embodiments, the technology of the present disclosure is not limited thereto. For example, as illustrated in FIG. 32, an imaging apparatus main body 414 having configurations and functions corresponding to the imaging apparatus main body 12 described in each of the embodiments may be mounted in a smart device 400.

Figure 32:
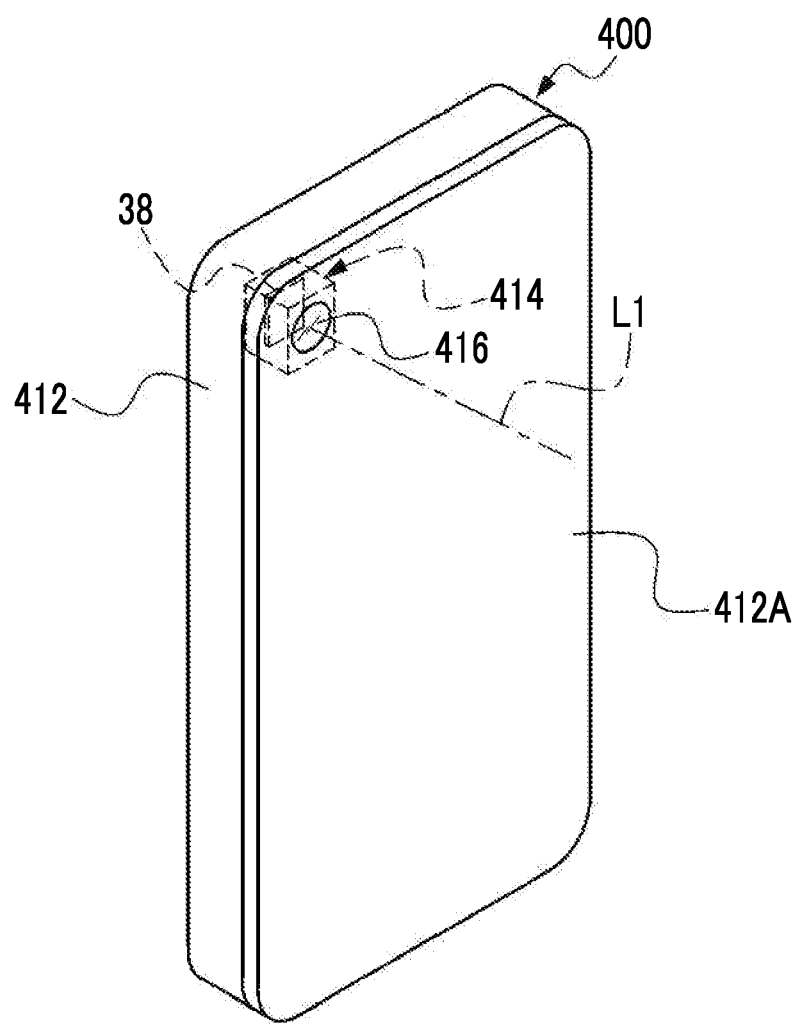
FIG. 32 is a perspective rear view illustrating an example of an exterior on a rear surface side of a smart device.

As illustrated in FIG. 32 as an example, the smart device 400 comprises a housing 412, and the imaging apparatus main body 414 is accommodated in the housing 412. For example, a smartphone or a tablet terminal that is an electronic apparatus having an imaging function is exemplified as an example of the smart device 400.

An imaging lens 416 is attached to the housing 412. In the example illustrated in FIG. 32, the imaging lens 416 is exposed from a rear surface 412A in an upper left portion of the rear surface 412A of the housing 412 in a case where the smart device 400 is in a vertically placed state. A center of the imaging lens 416 is positioned on the optical axis L1. The imaging apparatus main body 414 incorporates the imaging element 38. The imaging apparatus main body 414 acquires the subject light from the imaging lens 416. The image of the subject light acquired in the imaging apparatus main body 414 is formed on the imaging element 38.

While an example of a form of incorporating only the imaging apparatus main body 414 in the smart device 400 is illustrated in the example illustrated in FIG. 32, the technology of the present disclosure is not limited thereto. A plurality of digital cameras may be incorporated in the smart device 400. In this case, the imaging apparatus main body 414 may be mounted in at least one digital camera.

In addition, in each of the embodiments, while the communication I/Fs are connected in accordance with the PCIe connection standard, the technology of the present disclosure is not limited thereto. Instead of the PCIe connection standard, other connection standards such as LVDS, SATA, SLVS-EC, or MIPI may be employed as a high-speed communication standard.

In addition, in each of the embodiments, all of communication between the imaging element 38 and the signal processing circuit 34, communication between the controller 15 and the imaging element 38, and communication between the signal processing circuit 34 and the controller 15 are wired communication. However, the technology of the present disclosure is not limited thereto. Communication between the imaging element 38 and the signal processing circuit 34, communication between the controller 15 and the imaging element 38, and/or communication between the signal processing circuit 34 and the controller 15 may be wireless communication.

In addition, in each of the embodiments, while an example of a form of incorporating the UI system device 17 in the imaging apparatus main body 12 is illustratively described, at least a part of a plurality of constituents included in the UI system device 17 may be externally attached to the imaging apparatus main body 12. In addition, at least a part of the plurality of constituents included in the UI system device 17 may be used as being connected to the external I/F 104 as a separate body.

In addition, in the embodiment, while 120 fps is illustrated as the frame rate, the technology of the present disclosure is not limited thereto. An imaging frame rate (for example, the frame rate applied to the imaging processing illustrated in FIG. 8) and an output frame rate (for example, the frame rate applied to the output processing illustrated in FIG. 8) may be different frame rates. The imaging frame rate and/or the output frame rate may be a fixed frame rate or may be a variable frame rate. In a case of the variable frame rate, for example, the frame rate may be changed in a case where a predetermined condition (for example, a condition that an instruction to change the frame rate is received by the reception device 84, and/or a condition that a timing decided in advance as a timing for changing the frame rate is reached) is satisfied. In a case of the variable frame rate, for example, a specific numerical value of the frame rate may be changed in accordance with the instruction received by the reception device 84 or may be changed in accordance with an operation rate of the rear stage circuit 13 and/or the imaging element 38.

In addition, while the signal processing circuit 34 is illustrated in each of the embodiments, the technology of the present disclosure is not limited thereto. One or more signal processing circuits may be used in addition to the signal processing circuit 34. In this case, the imaging element 38 may be directly connected to each of a plurality of signal processing circuits.

In addition, while an example of a form of implementing the signal processing circuit 34 by the device including the ASIC and the FPGA is illustratively described in each of the embodiments, the technology of the present disclosure is not limited thereto. For example, the signal processing circuit 34 may be implemented by a software configuration using a computer.

Figure 33:
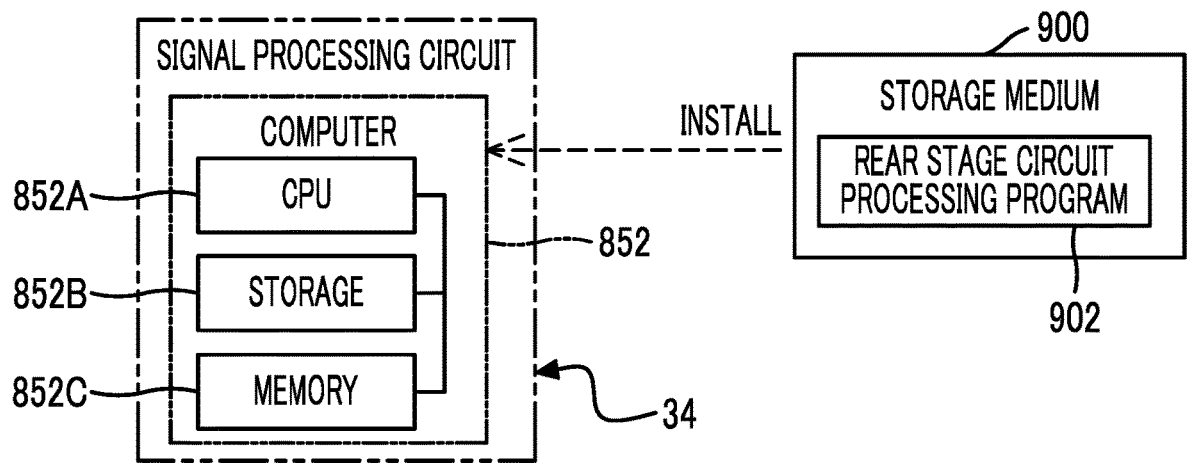
FIG. 33 is a conceptual diagram illustrating an example of an aspect in which a rear stage circuit processing program is installed on a computer in the signal processing circuit from a storage medium storing the rear stage circuit processing program.

In this case, for example, as illustrated in FIG. 33, a computer 852 is incorporated in the signal processing circuit 34, and a rear stage circuit processing program 902 causing the computer 852 to execute the rear stage circuit processing according to each of the embodiments is stored in a storage medium 900. Any portable storage medium such as an SSD or a USB memory that is a non-temporary storage medium is exemplified as an example of the storage medium 900. The computer 852 comprises a CPU 852A, a storage 852B, and a memory 852C. The storage 852B is a non-volatile storage device such as an EEPROM, and the memory 852C is a storage device such as a RAM. The rear stage circuit processing program 902 stored in the storage medium 900 is installed on the computer 852. The CPU 852A executes the rear stage circuit processing in accordance with the rear stage circuit processing program 902. The rear stage circuit processing program 902 may be stored in the storage 852B instead of the storage medium 900.

In addition, the rear stage circuit processing program 902 may be stored in a storage (for example, a non-volatile storage device) of another computer, a server apparatus, or the like connected to the computer 852 through a communication network (not illustrated), and the rear stage circuit processing program 902 may be downloaded to the computer 852 in response to a request from the imaging apparatus 10 or the smart device 400 and be installed on the computer 852.

The entire rear stage circuit processing program 902 does not need to be stored in the storage of the other computer, the server apparatus, or the like connected to the computer 852. A part of the rear stage circuit processing program 902 may be stored.

In the example illustrated in FIG. 33, while an example of a form of incorporating the computer 852 in the signal processing circuit 34 is illustrated, the technology of the present disclosure is not limited thereto. For example, the computer 852 may be disposed on an outside of the signal processing circuit 34.

In the example illustrated in FIG. 33, the CPU 852A may be a single CPU or include a plurality of CPUs. In addition, a GPU may be applied instead of the CPU 852A.

In the example illustrated in FIG. 33, while the computer 852 is illustrated, the technology of the present disclosure is not limited thereto. A device including an ASIC, an FPGA, and/or a PLD may be applied instead of the computer 852. In addition, a combination of a hardware configuration and a software configuration may be used instead of the computer 852.

In addition, while an example of a form of implementing the processing circuit 110 by the device including the ASIC and the FPGA is illustratively described in each of the embodiments, the technology of the present disclosure is not limited thereto. For example, at least the control circuit 110C of a plurality of devices included in the processing circuit 110 may be implemented by a software configuration using a computer. In addition, in the example illustrated in FIG. 31, at least the signal processing circuit 110E of a plurality of devices included in the processing circuit 110 may be implemented by a software configuration using a computer.

Figure 34:
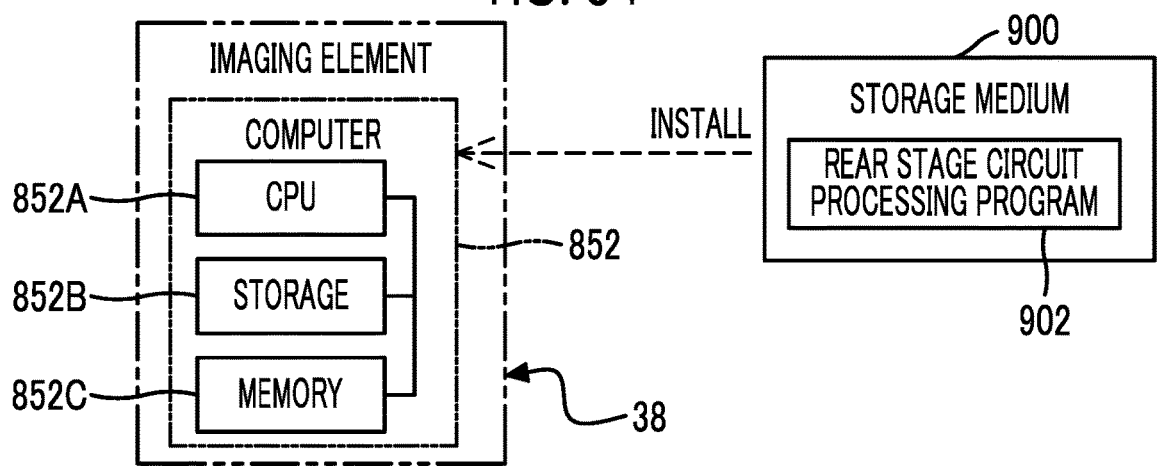
FIG. 34 is a conceptual diagram illustrating an example of an aspect in which the rear stage circuit processing program is installed on a computer in the imaging element from the storage medium storing the rear stage circuit processing program.

In this case, for example, as illustrated in FIG. 34, the computer 852 is incorporated in the imaging element 38, and the rear stage circuit processing program 902 causing the computer 852 to execute the rear stage circuit processing according to each of the embodiments is stored in the storage medium 900. The rear stage circuit processing program 902 stored in the storage medium 900 is installed on the computer 852. In addition, the rear stage circuit processing program 902 may be stored in the storage (for example, a non-volatile storage device) of the other computer, the server apparatus, or the like connected to the computer 852 through the communication network (not illustrated), and the rear stage circuit processing program 902 may be downloaded to the computer 852 in response to a request from the imaging element 38 and be installed on the computer 852.

In the example illustrated in FIG. 34, while an example of a form of incorporating the computer 852 in the imaging element 38 is illustrated, the technology of the present disclosure is not limited thereto. For example, the computer 852 may be disposed on the outside of the imaging element 38. In addition, in the example illustrated in FIG. 34, the CPU 852A may be a single CPU or include a plurality of CPUs. In addition, a GPU may be applied instead of the CPU 852A. In addition, in the example illustrated in FIG. 34, while the computer 852 is illustrated, the technology of the present disclosure is not limited thereto. A device including an ASIC, an FPGA, and/or a PLD may be applied instead of the computer 852. In addition, a combination of a hardware configuration and a software configuration may be used instead of the computer 852.

Various processors illustrated below can be used as a hardware resource for executing the rear stage circuit processing described in each of the embodiments. For example, as described above, a CPU that is a general-purpose processor functioning as the hardware resource for executing the rear stage circuit processing by executing software, that is, the programs, is exemplified as a processor. In addition, a dedicated electric circuit such as an FPGA, a PLD, or an ASIC that is a processor having a circuit configuration dedicatedly designed to execute a specific type of processing is exemplified as a processor. A memory is incorporated in or connected to any of the processors, and any of the processors executes the rear stage circuit processing using the memory.

The hardware resource for executing the rear stage circuit processing may be configured with one of those various processors or may be configured with a combination of two or more processors of the same type or different types (for example, a combination of a plurality of FPGAs or a combination of a CPU and an FPGA). In addition, the hardware resource for executing the rear stage circuit processing may be one processor.

As an example of a configuration with one processor, first, as represented by a computer such as a client and a server, a form in which one processor is configured with a combination of one or more CPUs and software, and in which this processor functions as a hardware resource for executing the rear stage circuit processing is available. Second, as represented by an SoC or the like, a form of using a processor that implements, by one IC chip, a function of the entire system including a plurality of hardware resources for executing the rear stage circuit processing is available. In such a manner, the rear stage circuit processing is implemented using one or more of the various processors as the hardware resource.

Furthermore, as a hardware structure of those various processors, more specifically, an electric circuit in which circuit elements such as semiconductor elements are combined can be used.

In addition, the various types of processing are merely an example. Accordingly, unnecessary steps may be deleted, new steps may be added, or a processing order may be rearranged without departing from a gist of the technology of the present disclosure.

In addition, while the imaging apparatus 10 is illustrated in the example illustrated in FIG. 1, and the smart device 400 is illustrated in the example illustrated in FIG. 32, the technology of the present disclosure is not limited thereto. That is, the technology of the present disclosure can be applied to various electronic apparatuses (for example, a fixed lens camera, a personal computer, a wearable terminal apparatus or the like) incorporating the imaging apparatus having configurations and functions corresponding to the imaging apparatus main body 12 described in each of the embodiments. Even with these electronic apparatuses, the same actions and effects as the imaging apparatus 10 and the smart device 400 are obtained.

In addition, while the display 26 is illustrated in each of the embodiments, the technology of the present disclosure is not limited thereto. For example, a separate display that is retrofit into the imaging apparatus may be used as the "display device" according to the embodiments of the technology of the present disclosure.

Above-described contents and illustrated contents are detailed description for parts according to the embodiments of the technology of the present disclosure and are merely an example of the technology of the present disclosure. For example, description related to the above configurations, functions, actions, and effects is description related to an example of configurations, functions, actions, and effects of the parts according to the embodiments of the technology of the present disclosure. Thus, unnecessary parts may be removed, new elements may be added, or parts may be replaced in the above-described contents and the illustrated contents without departing from the gist of the technology of the present disclosure. In addition, particularly, description related to common technical knowledge or the like that does not need to be described in terms of embodying the technology of the present disclosure is omitted in the above-described contents and the illustrated contents in order to avoid complication and facilitate understanding of the parts according to the embodiments of the technology of the present disclosure.

In the present specification, "A and/or B" has the same meaning as "at least one of A or B". This means that "A and/or B" may be only A, only B, or a combination of A and B. In addition, in the present specification, the same approach as "A and/or B" is applied to a case where three or more matters are represented by connecting the matters with "and/or".

All documents, patent applications, and technical standards disclosed in the present specification are incorporated in the present specification by reference to the same extent as in a case where each of the documents, patent applications, technical standards are specifically and individually indicated to be incorporated by reference.

The following appendices are further disclosed with respect to the embodiments.

(Appendix 1)
An imaging apparatus including a memory that stores image data obtained by imaging, and a signal processing circuit that processes the image data, in which the signal processing circuit performs processing of reducing the image data, performs first detection processing of detecting a specific subject image showing a specific subject from a reduced image indicated by reduced image data obtained by reducing the image data, and in a case where the specific subject image is not detected by the first detection processing, performs second detection processing on pre-reduction image data that is the image data before reduction stored in the memory.

(Appendix 2)
An imaging element including a memory that is incorporated in the imaging element and stores image data obtained by imaging, and a signal processing circuit that is incorporated in the imaging element and processes the image data, in which the signal processing circuit performs processing of reducing the image data, performs first detection processing of detecting a specific subject image showing a specific subject from a reduced image indicated by reduced image data obtained by reducing the image data, and in a case where the specific subject image is not detected by the first detection processing, performs second detection processing on pre-reduction image data that is the image data before reduction stored in the memory.

(Appendix 3)
An imaging element including a storage portion (memory) that is incorporated in the imaging element and stores image data obtained by imaging, and a processing portion (signal processing circuit) that is incorporated in the imaging element and processes the image data, in which the processing portion performs processing of reducing the image data, performs first detection processing of detecting a specific subject image showing a specific subject from a reduced image indicated by reduced image data obtained by reducing the image data, and in a case where the specific subject image is not detected by the first detection processing, performs second detection processing on pre-reduction image data that is the image data before reduction stored in the storage portion.

(Appendix 4)
The imaging element according to Appendix 3, in which the processing portion performs the second detection processing on partial region image data indicating a partial region that is a partial region in an image indicated by the pre-reduction image data and corresponds to a position of the specific subject image detected by the first detection processing in a frame previous to a frame in which the second detection processing is performed.

(Appendix 5)
The imaging element according to Appendix 4, in which the partial region is a region of the specific subject for which an instruction is issued, in the image indicated by the pre-reduction image data.

(Appendix 6)
The imaging element according to any one of Appendixes 3 to 5, in which in a case where the specific subject image is detected by the first detection processing, the processing portion stores specific subject image region data indicating a region corresponding to a position of the specific subject image in the pre-reduction image data in the storage portion.

(Appendix 7)
The imaging element according to Appendix 6, in which in a case where the specific subject image is detected by the first detection processing, the processing portion performs the second detection processing on the specific subject image region data stored in the storage portion.

(Appendix 8)
The imaging element according to any one of Appendixes 3 to 7, in which the processing portion generates a plurality of types of the pre-reduction image data from the image data and stores the generated plurality of types of pre-reduction image data in the storage portion for each predetermined period.

(Appendix 9)
The imaging element according to Appendix 8, in which the processing portion analyzes the image data for each predetermined period before performing the second detection processing and performs the second detection processing on the pre-reduction image data that is decided for each predetermined period in accordance with an analysis result among the plurality of types of pre-reduction image data stored in the storage portion.

(Appendix 10)
The imaging element according to Appendix 9, in which the processing portion analyzes a contrast of an instruction region image from the image data for each predetermined period before performing the second detection processing and performs the second detection processing on the pre-reduction image data that is decided for each predetermined period in accordance with the analysis result among the plurality of types of pre-reduction image data stored in the storage portion.

(Appendix 11)
The imaging element according to any one of Appendixes 3 to 10, in which the second detection processing is processing of detecting at least one of the specific subject image or a small subject image showing a smaller subject than the specific subject from an image indicated by the pre-reduction image data.

(Appendix 12)

The imaging element according to Appendix 11, in which the specific subject image is a face image showing a face, and the small subject image is a pupil image showing a pupil.

(Appendix 13)

The imaging element according to any one of Appendixes 3 to 12, in which the specific subject image is a moving object image showing a moving object for which an instruction is issued, in an image indicated by the image data.

(Appendix 14)

The imaging element according to any one of Appendixes 3 to 13, in which the pre-reduction image data is display image data.

(Appendix 15)

The imaging element according to any one of Appendixes 3 to 14, in which the processing portion performs the second detection processing on a plurality of pieces of the pre-reduction image data having different resolutions in a stepwise manner from the pre-reduction image data having a low resolution to the pre-reduction image data having a high resolution.

What is claimed is:

1. An imaging apparatus comprising:
a memory that stores image data obtained by imaging; and
a signal processing circuit that processes the image data,
wherein the signal processing circuit
performs processing of reducing the image data and performs first detection processing of detecting a specific subject image showing a specific subject from a reduced image indicated by reduced image data obtained by reducing the image data,
in a case where the specific subject image is not detected by the first detection processing, performs second detection processing on pre-reduction image data that is the image data before reduction stored in the memory, and
performs the second detection processing on partial region image data indicating a partial region that is a partial region in an image indicated by the pre-reduction image data and corresponds to a position of the specific subject image detected by the first detection processing in a frame previous to a frame in which the second detection processing is performed.

2. The imaging apparatus according to claim 1,
wherein the partial region is a region of the specific subject for which an instruction is issued, in the image indicated by the pre-reduction image data.

3. The imaging apparatus according to claim 1,
wherein in a case where the specific subject image is detected by the first detection processing, the signal processing circuit stores specific subject image region data indicating a region corresponding to a position of the specific subject image in the pre-reduction image data in the memory.

4. The imaging apparatus according to claim 3,
wherein in a case where the specific subject image is detected by the first detection processing, the signal processing circuit performs the second detection processing on the specific subject image region data stored in the memory.

5. The imaging apparatus according to claim 1,
wherein the signal processing circuit
generates a plurality of types of the pre-reduction image data from the image data, and
stores the generated plurality of types of pre-reduction image data in the memory for each predetermined period.

6. The imaging apparatus according to claim 5,
wherein the signal processing circuit
analyzes the image data for each predetermined period before performing the second detection processing, and
performs the second detection processing on the pre-reduction image data that is decided for each predetermined period in accordance with an analysis result among the plurality of types of pre-reduction image data stored in the memory.

7. The imaging apparatus according to claim 6,
wherein the signal processing circuit
analyzes a contrast of an instruction region image from the image data for each predetermined period before performing the second detection processing, and
performs the second detection processing on the pre-reduction image data that is decided for each predetermined period in accordance with the analysis result among the plurality of types of pre-reduction image data stored in the memory.

8. The imaging apparatus according to claim 1,
wherein the second detection processing is processing of detecting at least one of the specific subject image or a small subject image showing a smaller subject than the specific subject from an image indicated by the pre-reduction image data.

9. The imaging apparatus according to claim 8,
wherein the specific subject image is a face image showing a face, and
the small subject image is a pupil image showing a pupil.

10. The imaging apparatus according to claim 1,
wherein the specific subject image is a moving object image showing a moving object for which an instruction is issued, in an image indicated by the image data.

11. The imaging apparatus according to claim 1,
wherein the pre-reduction image data is display image data.

12. The imaging apparatus according to claim 1, further comprising:
an imaging element,
wherein the imaging element incorporates the memory.

13. The imaging apparatus according to claim 12,
wherein the imaging element incorporates the signal processing circuit.

14. The imaging apparatus according to claim 12,
wherein the imaging element is an imaging element in which at least a photoelectric conversion element and the memory are formed in one chip.

15. The imaging apparatus according to claim 14,
wherein the imaging element is a laminated imaging element in which the photoelectric conversion element is laminated with the memory.

16. The imaging apparatus according to claim 1, further comprising:
a processor configured to perform a control for displaying at least one of a detection result of the first detection processing or a detection result of the second detection processing on a display device.

17. The imaging apparatus according to claim 1,
wherein the signal processing circuit performs the second detection processing on a plurality of pieces of the pre-reduction image data having different resolutions in a stepwise manner from the pre-reduction image data having a low resolution to the pre-reduction image data having a high resolution.

18. An operation method of an imaging apparatus, the operation method comprising:
storing image data obtained by imaging in a memory;
performing processing of reducing the image data;
performing first detection processing of detecting a specific subject image showing a specific subject from a reduced image indicated by reduced image data obtained by reducing the image data;
performing, in a case where the specific subject image is not detected by the first detection processing, second detection processing on pre-reduction image data that is the image data before reduction stored in the memory; and
performing the second detection processing on partial region image data indicating a partial region that is a partial region in an image indicated by the pre-reduction image data and corresponds to a position of the specific subject image detected by the first detection processing in a frame previous to a frame in which the second detection processing is performed.

19. A non-transitory computer-readable storage medium storing a program for causing a computer to execute a process comprising:
storing image data obtained by imaging in a memory;
performing processing of reducing the image data;
performing first detection processing of detecting a specific subject image showing a specific subject from a reduced image indicated by reduced image data obtained by reducing the image data;
performing, in a case where the specific subject image is not detected by the first detection processing, second detection processing on pre-reduction image data that is the image data before reduction stored in the memory; and
performing the second detection processing on partial region image data indicating a partial region that is a partial region in an image indicated by the pre-reduction image data and corresponds to a position of the specific subject image detected by the first detection processing in a frame previous to a frame in which the second detection processing is performed.

* * * * *